US011933800B2

(12) United States Patent
Yamashita et al.

(10) Patent No.: US 11,933,800 B2
(45) Date of Patent: Mar. 19, 2024

(54) AUTOMATED ANALYZING DEVICE

(71) Applicant: Hitachi High-Technologies Corporation, Tokyo (JP)

(72) Inventors: Taichiro Yamashita, Tokyo (JP); Takenori Okusa, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 421 days.

(21) Appl. No.: 16/644,753

(22) PCT Filed: Jun. 26, 2018

(86) PCT No.: PCT/JP2018/024172
§ 371 (c)(1),
(2) Date: Mar. 5, 2020

(87) PCT Pub. No.: WO2019/054002
PCT Pub. Date: Mar. 21, 2019

(65) Prior Publication Data
US 2021/0063423 A1  Mar. 4, 2021

(30) Foreign Application Priority Data
Sep. 13, 2017  (JP) ................ 2017-175332

(51) Int. Cl.
*G01N 35/04* (2006.01)
*B01L 3/02* (2006.01)
(Continued)

(52) U.S. Cl.
CPC ............. *G01N 35/04* (2013.01); *B01L 3/02* (2013.01); *B01L 9/00* (2013.01); *G01N 35/02* (2013.01);
(Continued)

(58) Field of Classification Search
CPC ........ G01N 35/04; G01N 35/02; G01N 35/10; G01N 2035/0422; G01N 2035/0465;
(Continued)

(56) References Cited

U.S. PATENT DOCUMENTS 7,360,984 B1 * 4/2008 Sugiyama ............. G01N 35/04
422/65
2001/0048899 A1 * 12/2001 Marouiss ............ B01L 3/50853
422/63
(Continued)

FOREIGN PATENT DOCUMENTS

EP   2 803 412 A2   11/2014
JP   2002-333451 A  11/2002
(Continued)

OTHER PUBLICATIONS

International Preliminary Report on Patentability (PCT/IB/338 & PCT/IB/373) issued in PCT Application No. PCT/JP2018/024172 dated Mar. 26, 2020, including English translation of document C2 (Japanese-language Written Opinion (PCT/ISA/237) previously filed on Mar. 5, 2020) (nine (9) pages).

(Continued)

*Primary Examiner* — Benjamin R Whatley
*Assistant Examiner* — Curtis A Thompson
(74) *Attorney, Agent, or Firm* — Crowell & Moring LLP

(57) ABSTRACT

The present invention provides: a drawer that is supported so as to be horizontally movable in the front-rear direction between an open position and a closed position through a front-face opening; a table that allows an expendable or a processing unit used for analysis to be mounted in the drawer; and a moving-direction transforming means that, while the drawer is moved toward the rear side from the open position to the closed position, moves horizontally until the expendable or the processing unit mounted on the (Continued)

table passes through the front-face opening from the front side to the rear side and moves the table toward the upper side in synchronization with the horizontal movement of the drawer toward the rear side after the expendable or the processing unit mounted on the table passes through the front-face opening. This makes it possible to easily and reliably perform the work of replacing a chip rack.

6 Claims, 31 Drawing Sheets

(51) Int. Cl.
    *B01L 9/00*         (2006.01)
    *G01N 35/02*      (2006.01)
    *G01N 35/10*      (2006.01)

(52) U.S. Cl.
    CPC ............... *G01N 2035/0422* (2013.01); *G01N 2035/0465* (2013.01); *G01N 2035/0498* (2013.01); *G01N 35/10* (2013.01)

(58) Field of Classification Search
    CPC .. G01N 2035/0498; G01N 35/00; B01L 3/02; B01L 9/00
    See application file for complete search history.

(56) References Cited

U.S. PATENT DOCUMENTS

| 2011/0143947 | A1 | | 6/2011 | Chamberlin et al. |
| 2011/0269239 | A1 | * | 11/2011 | Diessel ................ G01N 35/028 |
| | | | | 422/63 |
| 2018/0272343 | A1 | * | 9/2018 | Buse .................... B01L 3/50853 |
| 2018/0292126 | A1 | * | 10/2018 | Meyer ................... F25D 31/006 |

FOREIGN PATENT DOCUMENTS

| JP | 2003-83997 A | | 3/2003 | |
| JP | 2009036430 A | * | 2/2009 | ........... A47B 88/493 |
| JP | 2013-500496 A | | 1/2013 | |
| WO | WO 01/69263 A1 | | 9/2001 | |
| WO | WO-2011122562 A1 | * | 10/2011 | ............. G01N 35/04 |

OTHER PUBLICATIONS

International Search Report (PCT/ISA/210) issued in PCT Application No. PCT/JP2018/024172 dated Aug. 7, 2018 with English translation (eight pages).
Japanese-language Written Opinion (PCT/ISA/237) issued in PCT Application No. PCT/JP2018/024172 dated Aug. 7, 2018 (five pages).
Extended European Search Report issued in European Application No. 22211830.9 dated Apr. 14, 2023 (8 pages).

* cited by examiner

AUTOMATED ANALYZING DEVICE

TECHNICAL FIELD

The present invention relates to an automated analyzing device for analyzing blood, urine, and the like.

BACKGROUND ART

Automated analyzing devices are devices that automatically analyze blood and other biological samples and output the results, and are essential in hospitals and medical examination facilities.

These automated analyzing devices are required to perform a wider variety of tests in a shorter time.

The automated analyzing device alerts an operator that there is a shortage of reagents, which are loaded in the device, and expendables in a case where there is a shortage of reagents or expendables such as sample dispensing tips and reaction containers, and urges the operator to replace new reagents and to load a tip rack on which a plurality of sample dispensing tips and reaction containers are mounted.

When performing the replacement of the reagent, the operator temporarily stops the automated analyzing device and opens a safety cover to perform the operation. Therefore, it is desirable that the reagent replacement operation is simple and reliable, and can be replaced in a short time.

Further, since sample dispensing tips and reaction containers, which are expendable items, are frequently consumed, it is necessary to load the tip rack frequently. Therefore, it is not desirable to stop the automated analyzing device and open the safety cover every time the tip rack is loaded, as this will cause a reduction in processing capacity, and the tip rack can be loaded while the automated analyzing device is driven with the safety cover closed.

An automated analyzer (automated analyzing device) described in PTL 1 is configured such that "a disposable pipetting tips are stored and disposed of in the tip compartment, shown in FIG. 7. The tip compartment includes a housing (510) for one or more individual drawers (520) that can accommodate a standard disposable tip box (530) (available from Axygen, Qiagen or Raininn) and a removable waste container (540) for used pipetting tips (Paragraph 0075)".

An automated analyzer (automated analyzing device) described in PTL 2 is configured such that "a plurality of rows of stacked racks 13 can be mounted on a transfer conveyor 40, and the transfer conveyor 40 is a rack transfer means for transferring the racks 13 supplied in a stacked state from an input port 9b to an elevating mechanism 43 described below, and is also a rack stop portion for stacking the racks 13 in a section from the input port 9b to the elevating mechanism 43. (Paragraph 0032)", and "at the transfer end of the transfer conveyor 40, the elevating mechanism 43 equipped with a lifter 44 is disposed. The lifter 44 is moved up and down below a tip mounting stage 16 by the elevating mechanism 43, and the rack 13 transferred to a predetermined position by the transfer conveyor 40 is supported from below by the lifter 44 below the tip mounting stage 16, and rises toward the tip mounting stage 16 (Paragraph 0033)".

CITATION LIST

Patent Literature

PTL 1: JP 2013-500496 A
PTL 2: JP 2002-333451 A

SUMMARY OF INVENTION

Technical Problem

In the configuration disclosed in PTL 1, the tip box can be set in the housing by opening and closing the drawer, but the configuration for raising and lowering the tip box in conjunction with the drawer is not disclosed.

The configuration disclosed in PTL 2 includes the elevating mechanism that includes the lifter for electrically ascending and lowering the rack, and a configuration that moves the rack up and down in conjunction with the opening/closing operation of the drawer is not disclosed.

An object of the present invention is to provide an automated analyzing device which is simple in structure and small in size, and in which a tip rack can be pulled out through a front-face opening only by opening and closing a drawer forward and backward without stopping the device with a safety cover closed, so that the tip rack is easily and reliably replaced.

Solution to Problem

According to the invention to achieve the object, there is provided a drawer that is supported so as to be horizontally movable in a front-rear direction between an open position and a closed position through a front-face opening, a table that allows an expendable or a processing unit used for analysis to be mounted in the drawer, and a moving-direction transforming means that, while the drawer is moved toward a rear side from the open position to the closed position, moves horizontally until the expendable or the processing unit mounted on the table passes through the front-face opening from a front side to the rear side and moves the table toward an upper side in synchronization with horizontal movement of the drawer toward the rear side after the expendable or the processing unit mounted on the table passes through the front-face opening.

Advantageous Effects of Invention

According to the present invention, it is possible to provide an automated analyzing device which is simple in structure and small in size, and in which a tip rack can be pulled out through a front-face opening only by opening and closing a drawer forward and backward without stopping the device with a safety cover closed, so that the tip rack is easily and reliably replaced.

DESCRIPTION OF EMBODIMENTS

Hereinafter, embodiments will be described with reference to the drawings.

Figure 1:
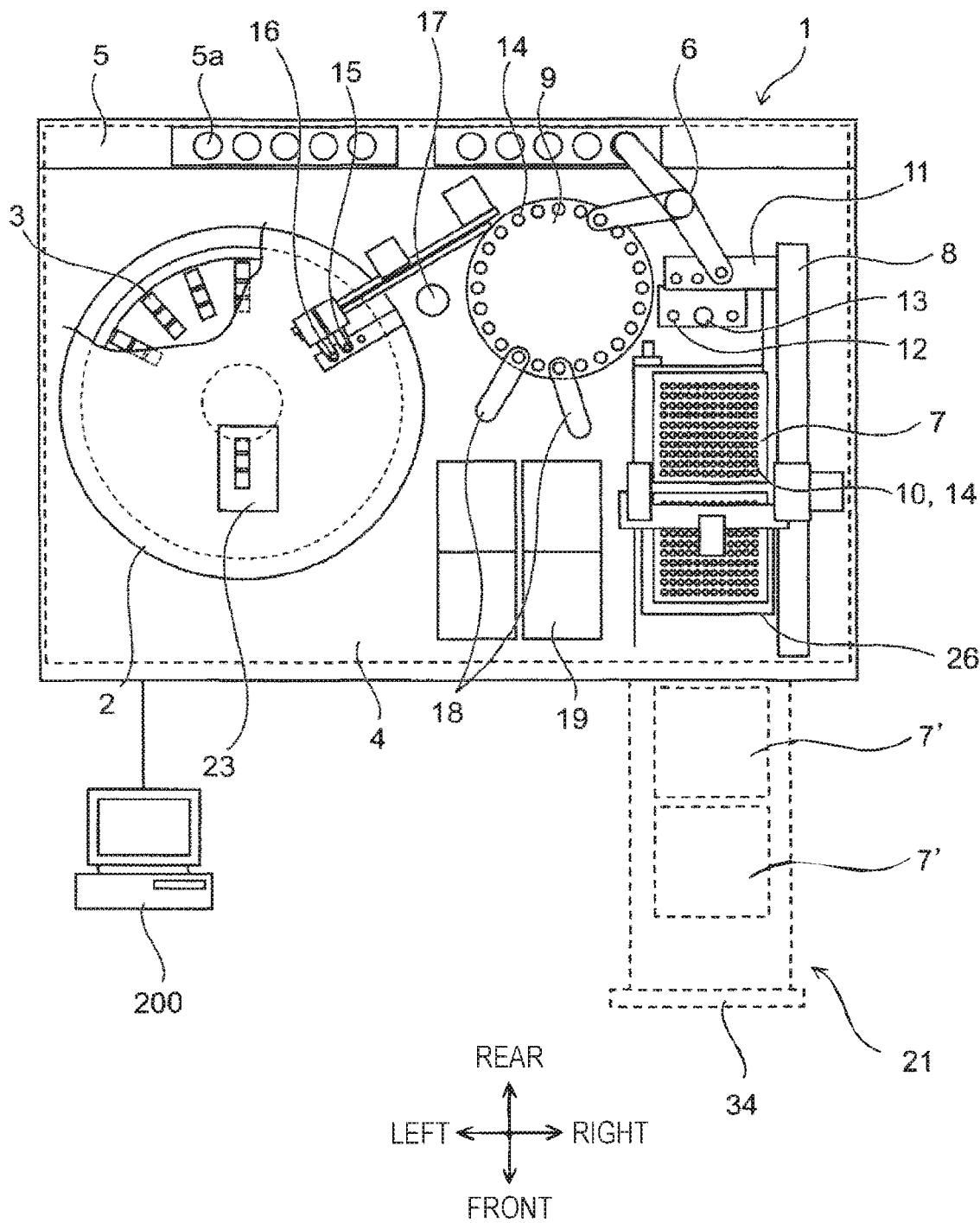
FIG. 1 is a configuration diagram of an automated analyzing device according to a first embodiment.
Figure 2:
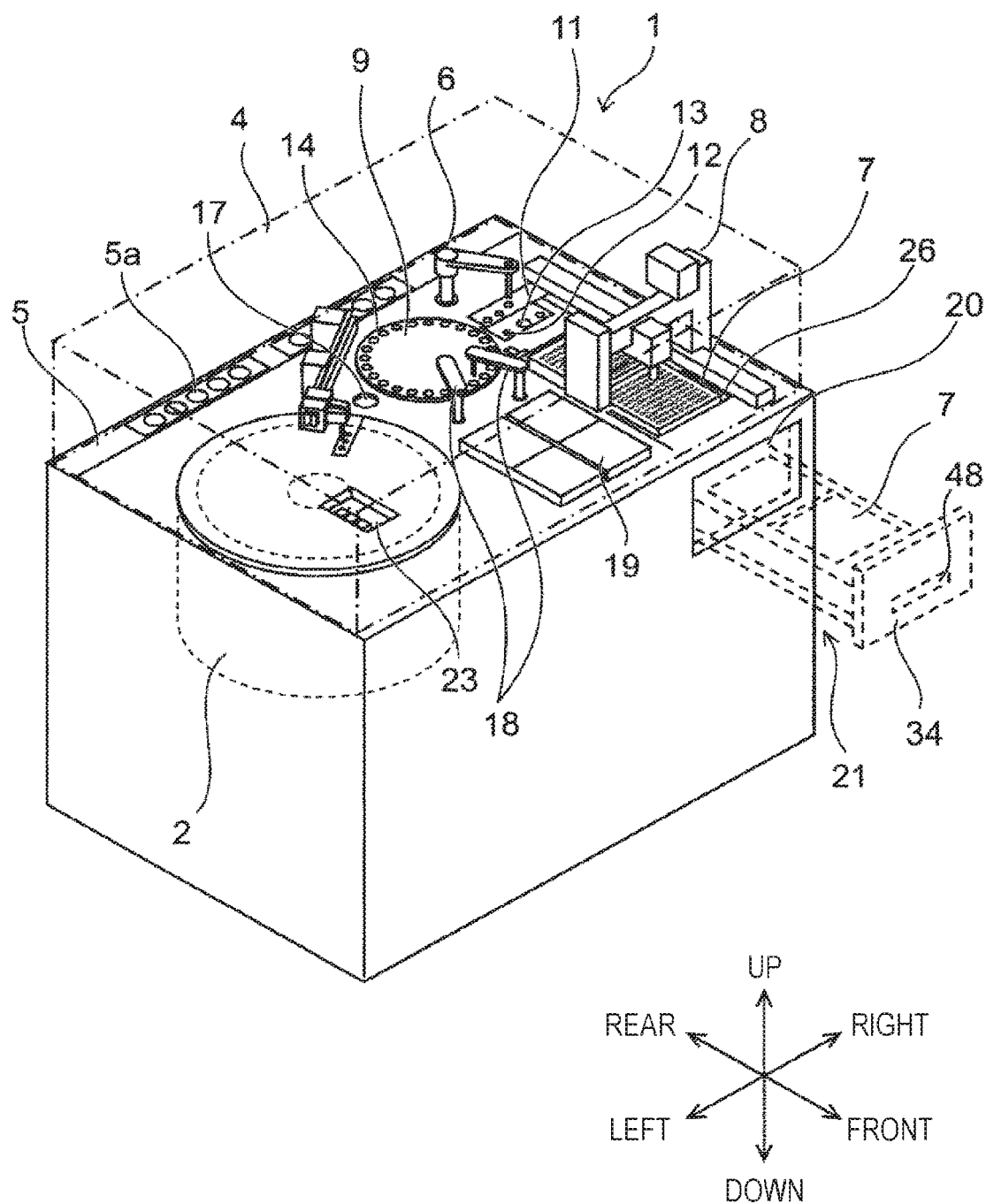
FIG. 2 is a perspective view of the automated analyzing device according to the first embodiment.

FIG. 1 to FIGS. 22A to 22C relate to a first embodiment, FIG. 1 is a plan view of an automated analyzing device including a reagent disk (hereinafter, sometimes referred to as a reagent vessel holder or a drum), and FIG. 2 is a perspective view of the automated analyzing device.

Figure 3:
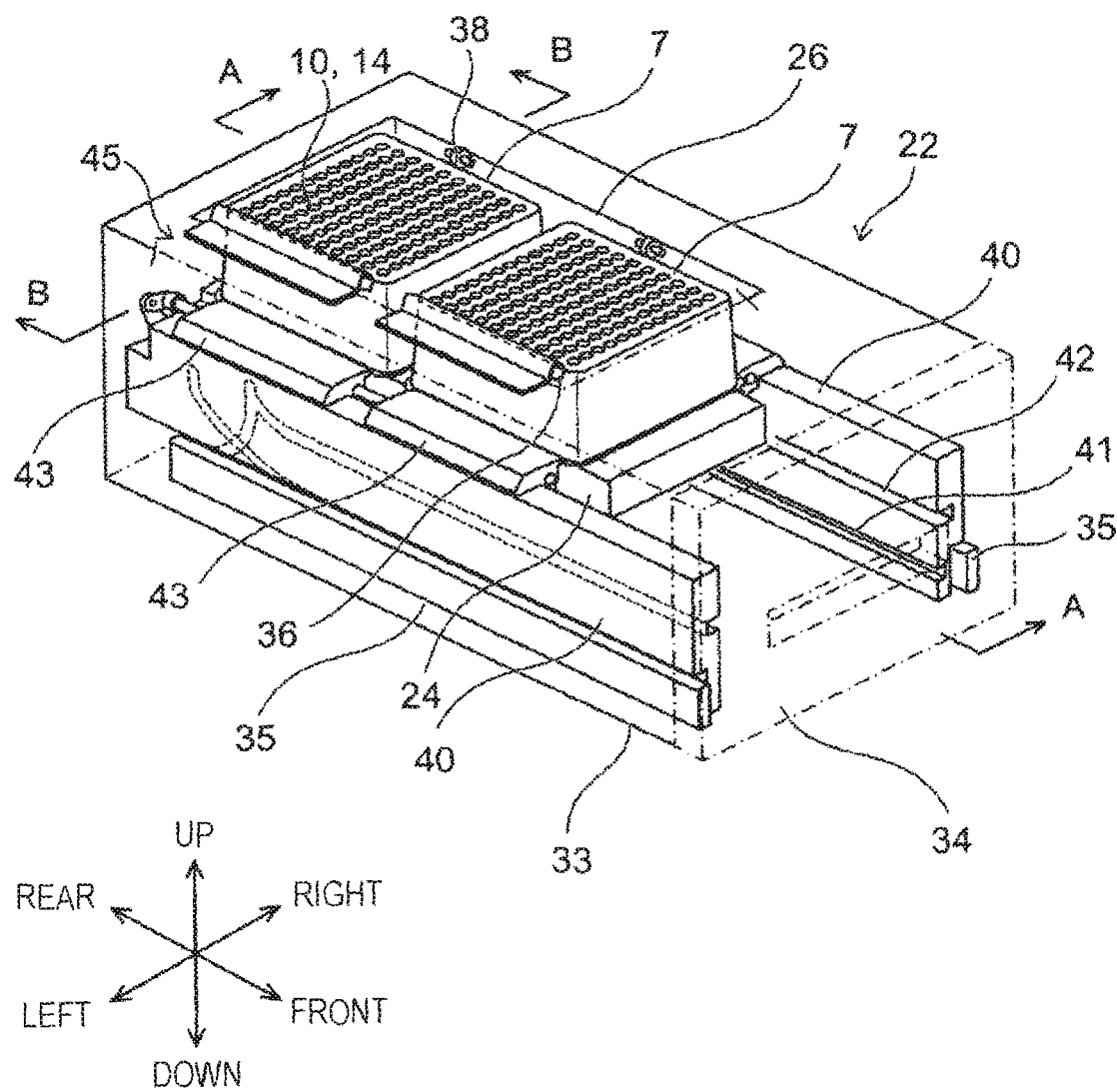
FIG. 3 is a perspective view of a tip rack loading means in the automated analyzing device according to the first embodiment (a state where a drawer is closed).
Figure 4:
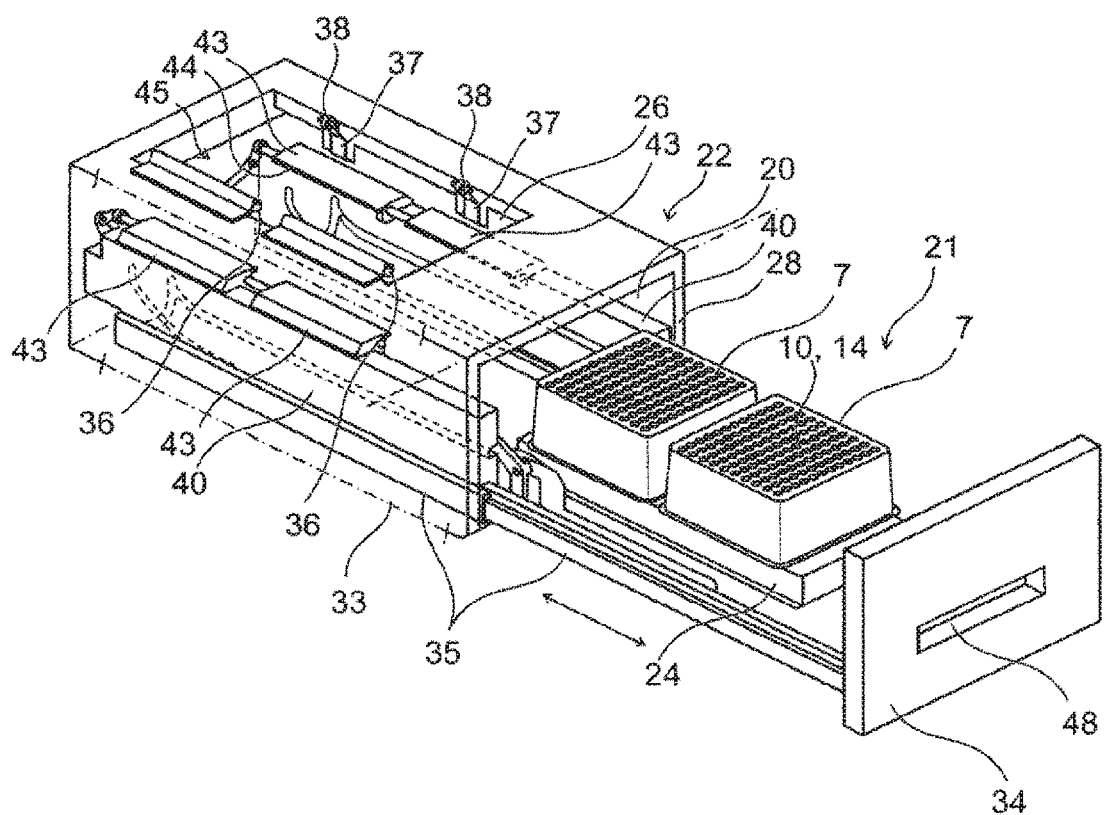
FIG. 4 is a perspective view of the tip rack loading means in the automated analyzing device according to the first embodiment (a state where the drawer is opened).
Figure 4:
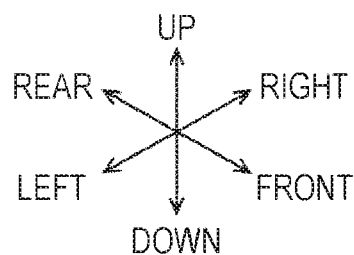
Figure 5:
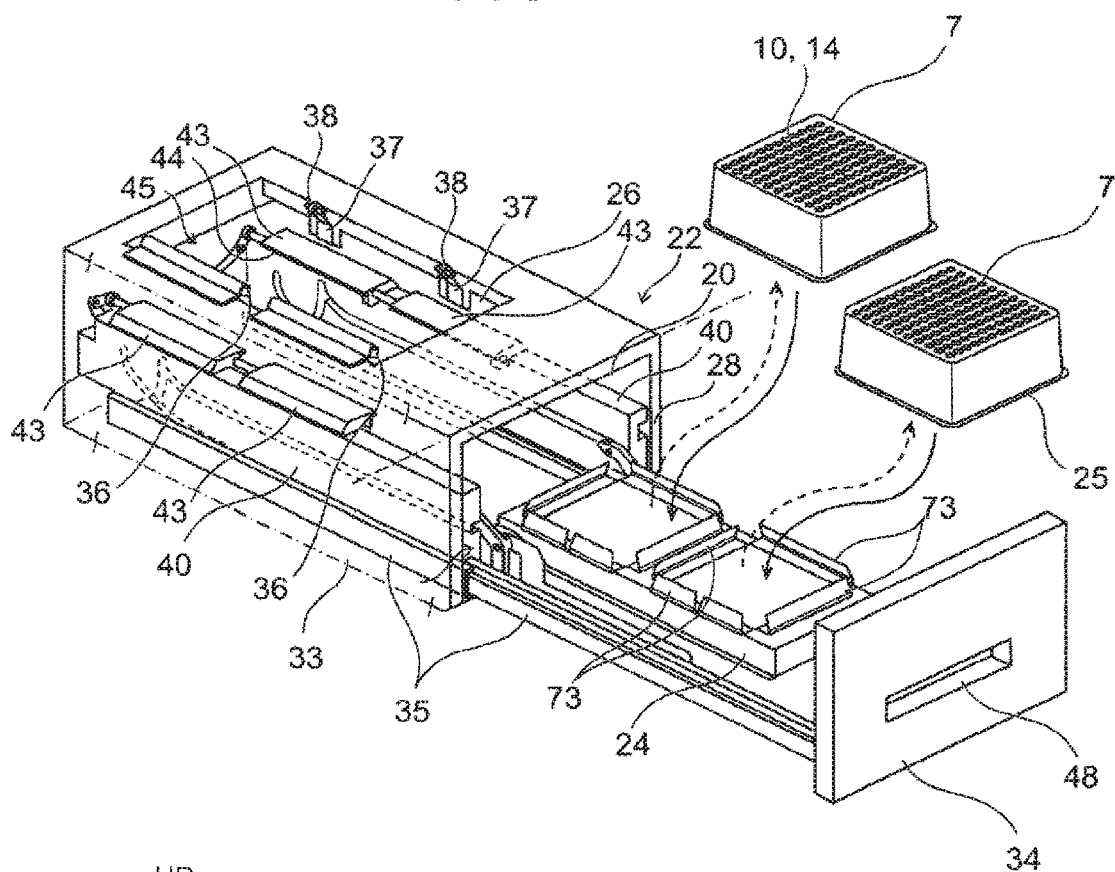
FIG. 5 is a perspective view of the tip rack loading means in the automated analyzing device according to the first embodiment (a state where a tip rack is removed).
Figure 5:
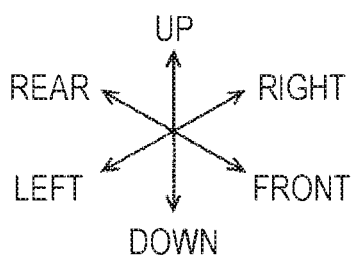
Figure 6:
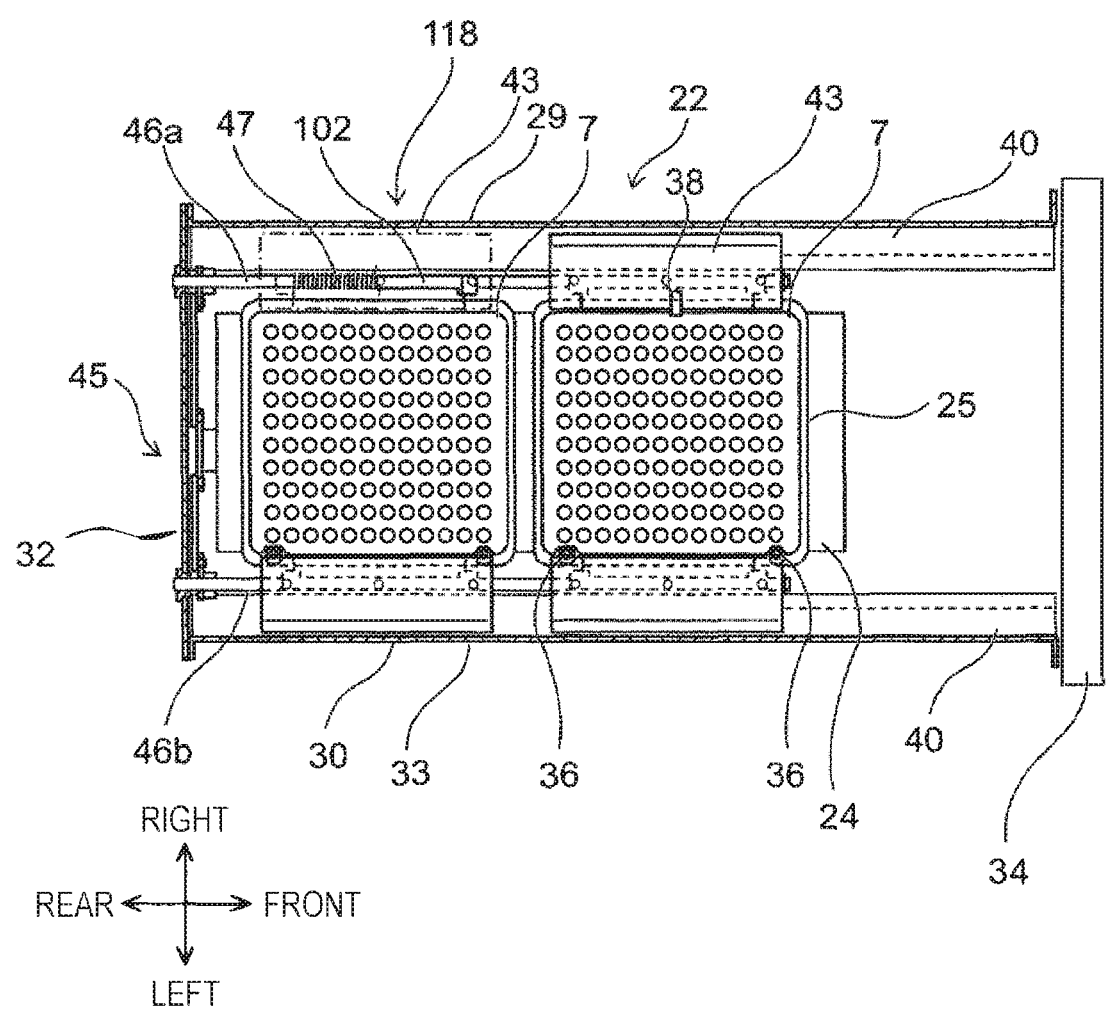
FIG. 6 is a plan view of the tip rack loading means in the automated analyzing device according to the first embodiment.
Figure 7:
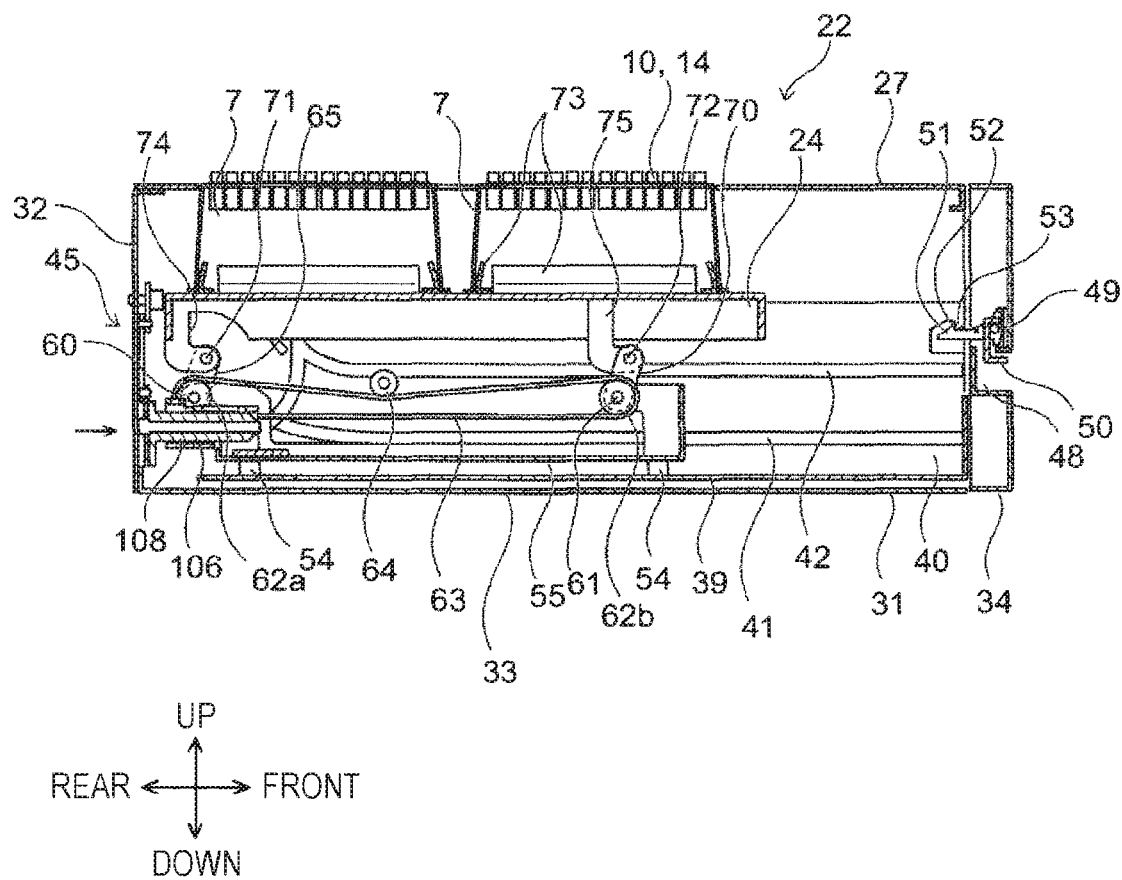
FIG. 7 is a cross-sectional view taken along line A-A of the tip rack loading means in the automated analyzing device according to the first embodiment.
Figure 8:
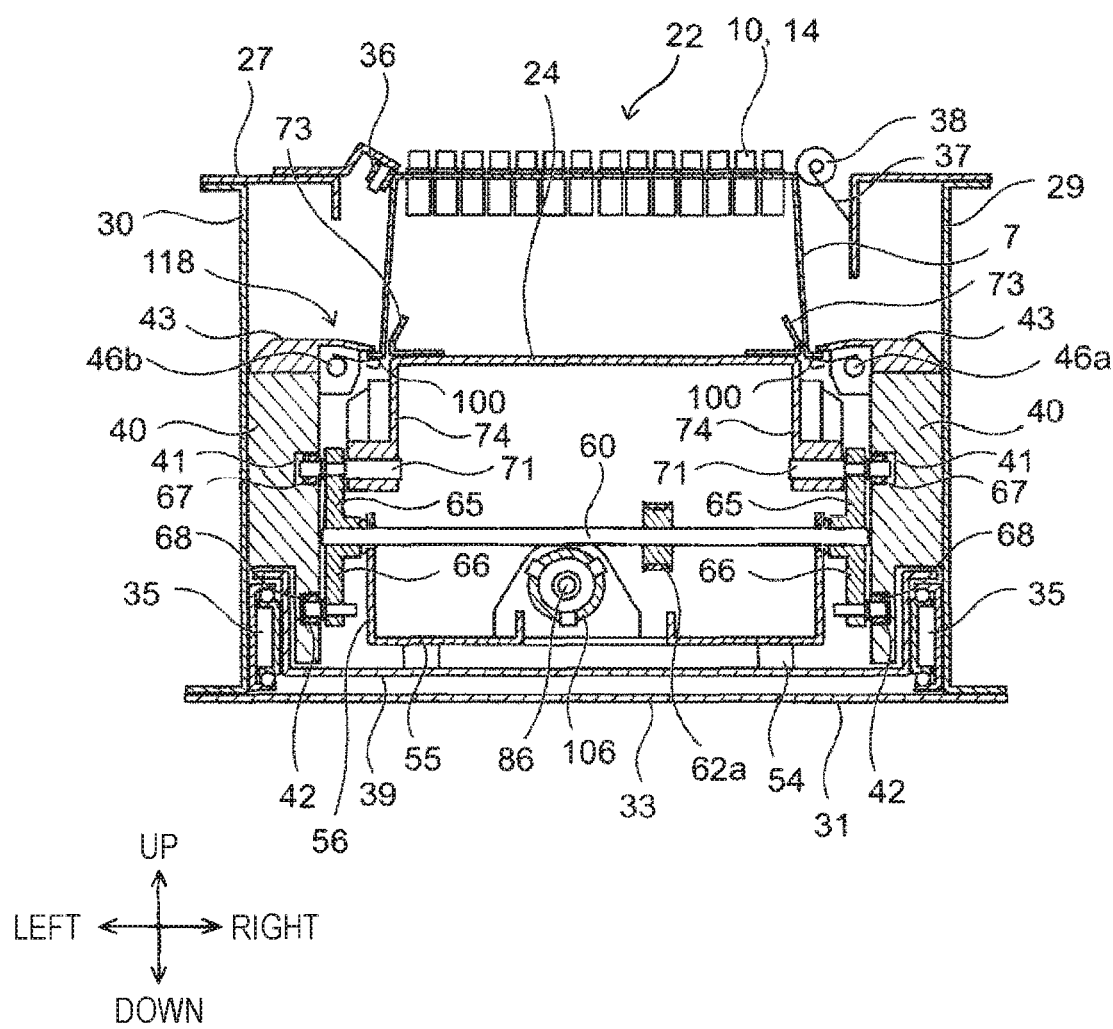
FIG. 8 is a cross-sectional view taken along line B-B of the tip rack loading means in the automated analyzing device according to the first embodiment.
Figure 9:
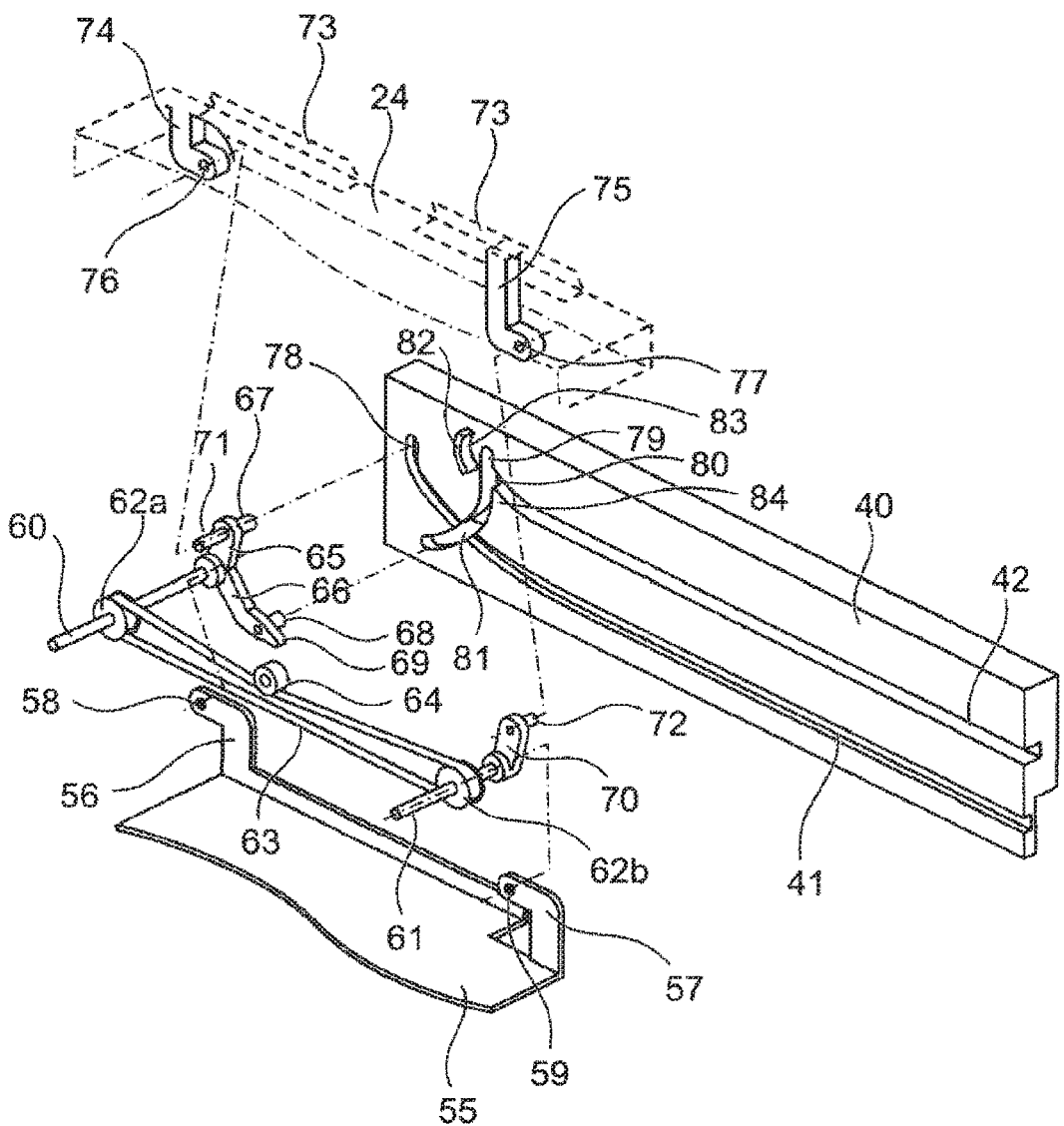
FIG. 9 is an exploded perspective view illustrating the configuration of a tip rack moving direction changing means provided in the tip rack loading means in the automated analyzing device according to the first embodiment.

FIGS. 3, 4, and 5 are perspective views of a tip rack loading means, FIG. 6 is a plan view of the tip rack loading means, and FIG. 7 is a cross-sectional view taken along line A-A in FIG. 3. FIG. 8 is a cross-sectional view taken along line B-B in FIG. 3, FIG. 9 is an exploded perspective view illustrating the configuration of a tip rack moving direction changing means provided in the tip rack loading means, and FIGS. 10A to 10C, FIGS. 11A to 11C, and FIGS. 12A to 12C are schematic cross-sectional views taken along line A-A for describing the operation of the tip rack loading means.

In addition, in the following description, vertical and horizontal directions are based on vertical and horizontal directions illustrated in FIGS. 1 and 2.

In an automated analyzing device 1 according to this embodiment illustrated in FIGS. 1 and 2, a plurality of reagent vessels (hereinafter, sometimes referred to as reagent containers, reagent bottles, or simply referred to as bottles) are stored along the inner side of the outer peripheral wall of a cylindrical reagent disk 2 supported rotatably around a vertical axis. Only a predetermined amount of a predetermined reagent is sucked by a dispensing pipette from each reagent bottle 3, and is supplied to a biological sample such as blood and urine dispensed into a reaction container and is analyzed.

The automated analyzing device 1 is provided with a safety cover 4 that covers a movable portion supported by a hinge that can be opened and closed backward for example. The safety cover 4 is provided with a so-called interlock (not illustrated) such as a solenoid, and is configured to hold the safety cover 4 closed by energizing the solenoid while the automated analyzing device 1 is in operation. While the automated analyzing device 1 is stopped, the safety cover 4 can be opened by releasing the energization of the solenoid, so that an operator can replace the reagent bottle 3.

First, a conveyance path of a sample for analysis will be described.

A sample 5a to be analyzed is moved through the automated analyzing device 1 by a sample conveyance means 5 such as a belt conveyor or rack handler, and is conveyed to a sample dispensing means 6 equipped with a dispensing pipette for dispensing the sample.

A plurality of sample dispensing tips and reaction containers are supplied into the automated analyzing device 1 in a state of being mounted on a sample dispensing tip/reaction container supply means 7 (hereinafter, sometimes referred to as a tip rack).

The automated analyzing device 1 includes a tip rack loading means 22 equipped with a drawer 21 that is supported to be horizontally moved from a closed position to a fully open position through a front-face opening 20 provided on the front surface, and on which one or a plurality of tip racks 7 can be mounted.

After mounting the tip rack 7 on a tip rack mounting table 24 in the fully open position of the drawer 21, the tip rack 7 can be supplied to the automated analyzing device 1 through the front-face opening 20 by pushing the drawer 21 backward to close. Herein, an opening amount from the closed position to the fully open position is, for example, about 400 mm to 500 mm. When the drawer 21 is fully opened, the mounted tip rack 7 can be easily taken out and attached.

The reaction containers are gripped one by one by a sample dispensing tip/reaction container conveyance means 8 from the tip rack 7, and then lifted up and moved to an incubator 9 (sometimes referred to as a culture disk). Sample dispensing tips 10 are gripped one by one by the sample dispensing tip/reaction container conveyance means 8 from the tip rack 7, and then lifted up and moved to a sample dispensing tip buffer 11.

In order to enable such movement, the sample dispensing tip/reaction container conveyance means 8 is configured to be movable in X-axis (left-right direction), Y-axis (front-rear direction) and Z-axis (vertical direction) directions. The moving range is configured to be movable in a range above a reaction container discard hole 12, the sample dispensing tip buffer 11, a reaction solution stirring means 13, the tip rack 7, and a part of the incubator 9.

The sample dispensing tip buffer 11 is a buffer for temporarily mounting a plurality of sample dispensing tips 10. The sample dispensing means 6 moves to an upper portion of the sample dispensing tip buffer 11, and grips anyone of the sample dispensing tips 10.

The disk-shaped incubator 9 rotatably supported around a vertical central axis is configured to lock a plurality of reaction containers 14 on the circumference in the vicinity of the outer periphery. With the rotation of the incubator 9, the reaction container 14 can be moved to a predetermined position.

Next, the sample dispensing means 6 moves to an upper region of the sample, sucks the sample into the sample dispensing tip 10, and then moves to an upper region of the reaction container 14 on the incubator 9 to discharge the sample from the sample dispensing tip 10 into the reaction container 14. Thereafter, the sample dispensing means 6 moves to an upper region of the sample dispensing tip/reaction container discard hole 12, and drops and discards the sample dispensing tip 10 into a hole.

Next, a conveyance path of the reagent added to the sample in the reaction container 14 will be described.

The cylindrical reagent disk 2 that is rotatably supported around a vertical central axis and has a hollow inside forms a slot that holds the plurality of reagent bottles 3 radially along the outer peripheral wall of the hollow inside. Each reagent bottle 3 is moved to a predetermined position on the circumference by rotating the reagent disk 2. Further, a part of the reagent bottle 3 includes a reagent containing a large number of magnetic particles for stirring. In order to control the reagent bottle 3 to a constant temperature, the reagent disk 2 has a heat insulating function.

On an upper surface of the reagent disk 2, a reagent bottle loading port 23 for setting the reagent bottle 3 in the reagent disk 2 and taking out the reagent bottle 3 from the reagent disk 2 is provided. In addition, the reagent bottle loading port 23 is provided with an openable/closable reagent bottle loading port lid (not illustrated) and an interlock using a solenoid (not illustrated). Similarly to the safety cover 4, it is configured to be locked and closed during the operation of the automated analyzing device 1, and to be opened and closed when the automated analyzing device 1 is stopped.

A reagent dispensing pipette 15 is configured to be movable so that the reagent in the reagent bottle 3 can be sucked and moved to a predetermined position. First, the reagent dispensing pipette 15 moves to the upper region of a predetermined type of reagent on the reagent disk 2 to suck a predetermined amount of reagent, and then moves to the upper region of the predetermined reaction container 14 on the incubator 9 to discharge the reagent into the reaction container 14.

A reagent stirring means 16 is provided on the upper portion of the reagent disk 2. The stirring means 16 is provided with a magnetic particle stirring arm (also referred to as a stirrer) that can rotate around a vertical axis. This magnetic particle stirring arm moves to the upper region of the reagent bottle 3 containing the reagent to be stirred containing the magnetic particles, and lowers a paddle-shaped or spiral magnetic particle stirring means provided at the lower end of the magnetic particle stirring arm into the reagent. The magnetic particle solution is stirred by rotating the magnetic particle stirring means. In order to prevent spontaneous precipitation of the magnetic particles in the solution, the magnetic particle stirring arm stirs the magnetic particles immediately before the reagent is dispensed. After stirring, the magnetic particle stirring arm moves up to the upper portion of the reagent bottle 3 and then moves to the upper region of a cleaning means 17 containing cleaning liquid. After lowering into the cleaning liquid, the magnetic particle stirring means rotates and the magnetic particles adhering to the stirring means are removed.

A reaction solution is formed after a predetermined reaction time has elapsed after dispensing a sample and a predetermined reagent. This reaction solution is sucked from the reaction container 14 by a reaction solution suction nozzle 18 and further supplied to a detection means 19. This detection means 19 analyzes the reaction solution.

Next, the analyzed reaction solution is moved to the upper region of the sample dispensing tip/reaction container discard hole 12 by the sample dispensing tip/reaction container conveyance means 8, and the sample dispensing tip 10 is discarded into the sample dispensing tip/reaction container discard hole 12.

A series of these operations of the device are controlled by a host computer 200 which is a control means.

This automated analyzing device can efficiently analyze a plurality of samples for a plurality of analysis items by combining or repeating the above operations.

First Embodiment

FIGS. 3 to 5 are perspective views of the tip rack loading means 22.

<Shape of Tip Rack>

The tip rack 7 is a substantially cuboid and has a thin wall structure with an open bottom surface, and a plurality of sample dispensing tips and small holes on which reaction containers can be mounted at predetermined positions are provided on the upper surface. The sample dispensing tip and the reaction container can be removed upward one by one. Around the four sides of the open bottom surface of the tip rack 7 is a flange portion 25 with a thin-walled edge projecting outward.

The left surface, right surface, front surface, and rear surface provided between the upper surface and the flange portion 25 are tapered to be narrow as approaching the upper surface, and become an extracting taper when the tip rack 7 is molded with resin.

The tip rack loading means 22 includes a housing 33 which includes a top plate 27 having an top-face opening 26, a front plate 28 having a front-face opening 20, a right plate 29, a left plate 30, a bottom plate 31, and a rear plate 32. The front surface of the tip rack loading means 22 is a door 34 forming the front surface of the drawer 21 that can be opened and closed in the front-rear direction, and is configured as a single module as a whole.

The drawer 21 is supported by a pair of extendable drawer rails 35 provided inside the left and right surfaces of the housing 33, and is supported so as to be movable in the front-rear direction between the fully open position and the fully closed position.

The door 34 is provided with a so-called interlock (not illustrated) such as a solenoid. During the operation of the sample dispensing tip/reaction container conveyance means 8, the door 34 is closed by energizing the solenoid.

The drawer 21 is provided with the tip rack mounting table 24 on which the tip rack 7 is mounted. Although the details will be described below, the tip rack mounting table 24 is supported so as to be movable in the front-rear direction and the vertical direction with respect to the drawer 21, and moves up and down in conjunction with movement in the front-rear direction of the drawer 21.

FIG. 3 illustrates a state in which the tip rack 7 is loaded. FIG. 4 illustrates a state where the door 34 is pulled forward from the tip rack loading means 22 and the drawer 21 is fully opened. As illustrated in FIG. 4, when the door 34 is pulled out, the tip rack 7 is pulled out from the front-face opening 20 provided in the front surface of the housing 33 through the tip rack mounting table 24 provided in the drawer 21. As illustrated in FIG. 5, the tip rack 7 can be replaced by the user. Further, in this embodiment, two types of tip racks 7 can be mounted in the front-rear direction on the tip rack mounting table 24 provided in the drawer 21.

When the drawer 21 is opened forward from a state where the drawer 21 illustrated in FIG. 3 is closed, the tip rack 7 is lowered from the top-face opening 26 in conjunction with the opening operation of the drawer 21. After being lowered to a position lower than the upper end of the front-face opening 20, a plurality of sample dispensing tips mounted on the tip rack 7 and the upper end of the reaction container are pulled out forward together with the drawer 21 from the front-face opening 20 to reach the fully opened state illustrated in FIG. 4.

When the drawer 21 illustrated in FIG. 4 is closed backward from the fully opened state, the tip rack 7 is pushed into the housing 33 from the front-face opening 20 together with the drawer 21.

Thereafter, the tip rack 7 rises in conjunction with the backward closing operation of the drawer 21, and the plurality of sample dispensing tips mounted on the upper surface of the tip rack 7 and the upper ends of the reaction containers are exposed from the top-face opening 26, or raised and positioned to a position higher than the top-face opening 26 and set.

Therefore, the sample dispensing tip or the reaction container can be reliably gripped by the sample dispensing tip/reaction container conveyance means 8 and easily conveyed upward, thereby providing the automated analyzing device with high reliability.

In other words, in conjunction with the opening/closing operation of manually moving the drawer 21 in the front-rear direction, the tip rack 7 also moves in the vertical direction, and thus the operator only needs to move the drawer 21 in the front-rear direction. No special operation is required to move the tip rack 7 up and down, and no special moving mechanism is required to move the tip rack 7 in the vertical direction. Therefore, it is possible to provide the automated analyzing device of which the structure is simple and operability is good.

Since the drawer 21 is configured to enter and exit from the front-face opening 20, the safety cover 4 may be kept closed in order to open and close the drawer 21 to replace the tip rack 7, and the automated analyzing device 1 may be in operation if the sample dispensing tip/reaction container conveyance means 8 is not in operation.

Herein, the sample dispensing tip and the reaction container are lightweight, made of resin with a diameter of about 5 to 6 mm as an example. If an impact is applied when the drawer is closed and the tip rack 7 is set, the sample dispensing tip and the reaction container may jump up and jump out of the tip rack 7. Therefore, when the drawer 21 is closed, it is desirable to have a movement characteristic that does not close suddenly but stops smoothly while gradually decelerating both in the front-rear direction and in the vertical direction.

Further, when the tip rack 7 is supplied, the drawer 21 is opened, the tip rack 7 is mounted on the tip rack mounting table 24, and then the drawer 21 is closed. Further, even when the drawer 21 is fully opened, it is desirable that the impact is reduced by decelerating.

However, even when the drawer 21 is closed and the tip rack 7 is positioned at a predetermined position, if the tip rack 7 remains mounted on the tip rack mounting table 24, a user tries to operate the drawer 21 during operation and vibration is applied by pushing and pulling the door 34, the vibration is transmitted to the tip rack 7 through the tip rack mounting table 24. Therefore, when the tip rack 7 is positioned at a predetermined position, the tip rack 7 is desirably separated from the tip rack mounting table 24 provided on the drawer 21 and supported by a positioning means provided on the housing 33.

The housing 33 attached to a main body of the automated analyzing device 1 includes the bottom plate 31, the left plate 30 and the right plate 29 fixed to the left and right sides of the bottom plate 31, the rear plate 32 fixed to the rear sides of the bottom plate 31, the left plate 30, and the right plate 29, the front plate 28 fixed to the front sides of the bottom plate 31, the left plate 30, and the right plate 29, and the top plate 27 which is fixed to the upper surfaces of the left plate 30, the right plate 29, the rear plate 32, and the front plate 28, and forms the upper surface of the housing 33.

The front plate 28 is provided with the front-face opening 20 through which the drawer 21 on which the tip rack 7 is mounted moves in the front-rear direction. The front-face opening 20 is provided at a position lower than the top-face opening 26 provided on the upper surface of the main body of the automated analyzing device 1.

The top plate 27 is provided with the top-face opening 26, which is an opening for picking up a plurality of sample dispensing tips and reaction containers mounted on the upper surface of the tip rack 7 at the fully closed position of the drawer 21.

A pair of positioning bearings 36 is provided in the front-rear direction for each tip rack 7 along the left side of the top-face opening 26, and comes into contact with the left side of the tip rack 7 when the drawer 21 is closed and the tip rack 7 is disposed at a predetermined height, so that a predetermined position accuracy can be obtained.

A positioning facing bearing 38 supported by a leaf spring 37 is provided along the right side of the top-face opening 26 to press the center of the right side to the left, that is, the positioning bearing 36 for each tip rack 7.

By positioning the tip rack 7 at a predetermined height, the tip rack 7 is accurately positioned at a predetermined position in the front-rear and left-right directions through the positioning bearing 36.

Inside the left plate 30 and the right plate 29, the pair of drawer rails 35 provided with a fixed portion and a movable portion capable of moving in the front-rear direction with respect to the fixed portion is provided in the vicinity of the bottom plate 31. By fixing the fixed portion of the drawer rail 35 to the left plate 30 or the right plate 29 and fixing the movable portion to a drawer bottom plate 39 of the drawer 21, the drawer 21 can be moved in the front-rear direction by a predetermined amount of movement.

Inside the left plate 30 and the right plate 29, a pair of left and right guide rails 40 and 40 extending in the front-rear direction is provided along the inside of the drawer rail 35 and the upper portion of the drawer rail 35. A first guide groove 41 and a second guide groove 42, which are grooves extending substantially in the front-rear direction, are provided on the inner surfaces of the guide rails 40 and 40 facing each other.

A pair of left and right positioning members 43 is provided for each tip rack 7 on the upper portion of the guide rails 40 and 40. The positioning member 43 includes a height reference side 44 which is a contact portion for setting the tip rack 7 at a predetermined height by coming into contact with the flange portions 25 of two tip racks 7 at the fully closed position of the drawer 21. Further, the details will be described below.

A positioning drive means 45 described later in detail is provided between the rear side of the tip rack mounting table 24 and the rear plate 32. The positioning drive means 45 drives a pair of left and right positioning drive shafts 46 that rotates through the height positioning member 43 in the front-rear direction, and the tip rack 7 is brought into contact with the height reference side 44 of the positioning member 43 from the lower side through a positioning spring 47. Further, the details will be described below.

Next, the configuration and operation of the drawer 21 will be described with reference to FIG. 3 to FIGS. 15A to 15C.

The movable sides of the pair of drawer rails 35 provided in the housing 33 are connected by the drawer bottom plate 39, and the door 34 is provided on the front surface of the drawer bottom plate 39.

The door 34 is supported by the drawer bottom plate 39 through the drawer rail 35 so as to be openable and closable with respect to the housing 33 in the front-rear direction, and closes the front-face opening 20 of the housing 33 when the drawer 21 is closed. On the front surface of the door 34, a grip 48, which is a recess for the operator to insert a finger when the drawer 21 is opened, is provided.

On the inner upper portion of the grip 48, there are provided a handle shaft 49 swingably and pivotally supported over substantially the entire width of the door 34 in the left-right direction, a handle 50 provided integrally with the handle shaft 49, and a pair of lock levers 51 which swings integrally with the handle shaft 49 at both left and right ends of the handle shaft 49.

On the rear side of each of the pair of left and right lock levers 51, a lock claw 52 that is a claw directed upward is provided.

On the other hand, the pair of guide rails 40 provided on the left and right sides of the housing 33 is provided with a claw receiving portion 53 that engages with the lock claw 52 of the lock lever 51 when the drawer 21 is fully closed. In other words, when the drawer 21 is fully closed, the door 34 is locked to the housing 33 through the lock lever 51 and does not open.

Herein, when a finger is inserted into the grip 48 and the handle 50 is pulled forward, the lock lever 51 and the handle 50 rotate around the handle shaft 49 so that the lock claw 52 and the claw receiving portion 53 are disengaged. Therefore, the drawer bottom plate 39 together with the door 34 can be opened forward along the drawer rail 35.

On the other hand, when the door 34 is closed from the open state of the drawer 21, the lock claw 52 and the claw receiving portion 53 are engaged at the fully closed position, so that the drawer 21 is locked to the housing 33 through the door 34.

Further, by operating a solenoid (not illustrated) in a state where the lock claw 52 and the claw receiving portion 53 are engaged at the fully closed position, it is possible to operate so as to prevent the drawer 21 from being opened by applying a so-called interlock.

With the above configuration, the drawer 21 is opened from the front-face opening 20 provided on the front surface of the automated analyzing device 1 by simply pulling the handle 50 provided on the door 34 forward. The tip rack mounting table 24 on which the tip rack 7 can be mounted can be easily pulled out from the automated analyzing device 1. After mounting the tip rack 7 on which expendables are mounted on the tip rack mounting table 24, the expendables can be supplied into the automated analyzing device 1 by closing the drawer 21.

Alternatively, the tip rack 7 in which the expendables are emptied can be taken out.

In addition, since the lock claw 52 and the claw receiving portion 53 are engaged when the drawer 21 is closed, the drawer 21 can be reliably closed at a predetermined position.

Further, since the interlock can be applied, the opening operation of the drawer 21 can be prohibited during a period when the sample dispensing tip/reaction container conveyance means 8 is operating and the tip rack 7 cannot be removed.

A drawer base 55 is fixed to the upper surface of the drawer bottom plate 39 through a spacer 54 and moves in the front-rear direction integrally with the drawer bottom plate 39. The drawer base 55 is generally provided in a range below the tip rack mounting table 24 on which the tip rack 7 is mounted. The width of the drawer base 55 in the left-right direction is smaller than that of the drawer bottom plate 39. The left side and the right side of the drawer base 55 are partly bent in the vicinity of the front end and the vicinity of the rear end. A first drawer arm 56 and a second drawer arm 57 having a substantially L shape of which the upper end extends backward in a side view are formed. A first spindle hole 58 and a second spindle hole 59 are provided at the substantially L-shaped tip portions of the first drawer arm 56 and the second drawer arm 57, respectively.

A first connecting shaft 60 passes through the first spindle hole 58 in a rotatable manner, and a second connecting shaft 61 passes through the second spindle hole 59 in a rotatable manner. The left and right widths of the first connecting shaft 60 and the second connecting shaft 61 are set to be smaller than the distance between the inner surfaces of the left and right guide rails 40 and 40 facing each other.

A toothed pulley 62a is fixed to the first connecting shaft 60 and rotates together with the first connecting shaft 60. A toothed pulley 62b having the same number of teeth as the toothed pulley 62a is fixed to the second connecting shaft 61, and rotates together with the second connecting shaft 61. A toothed belt 63 is stretched between the toothed pulley 62a and the toothed pulley 62*b*. The first connecting shaft 60 and the second connecting shaft 61 rotate in the same direction by the same angle in synchronization with each other through the toothed pulley 62*a*, the toothed belt 63, and the toothed pulley 62*b*. A cylindrical idler 64 that is rotatably supported is in contact with one surface of the toothed belt 63 in order to apply an appropriate tension to the toothed belt 63.

At both ends of the first connecting shaft 60, a pair of first rotating arm 65 and second rotating arm 66 that rotates together with the first connecting shaft 60 is provided bisymmetrically. One end of the first rotating arm 65 is rotationally fixed to the first connecting shaft 60. A rotatable first guide roller 67 is provided on the side close to the guide rail 40 at the other end. On the side away from the guide rail 40 at the other end, a third spindle 71 is provided coaxially with the first guide roller 67. One end of the second rotating arm 66 is rotationally fixed to the first connecting shaft 60, and the other end is provided with a second guide roller 68 that is rotatable on the side close to the guide rail 40.

The other end of the second rotating arm 66 is further extended to the opposite side of the first connecting shaft 60, and a guide end 69 will be described in detail below.

The first rotating arm 65 and the second rotating arm 66 are substantially L-shaped with a slight angle to each other when viewed from the side in the left-right direction. The first rotating arm 65 and the second rotating arm 66 may be integrated.

At both ends of the second connecting shaft 61, a pair of third rotating arms 70 that rotates integrally with the second connecting shaft 61 is provided bisymmetrically.

One end of the third rotating arm 70 is rotationally fixed to the second connecting shaft 61, and the other end is provided with a fourth spindle 72 protruding to the side close to the guide rail 40.

The first rotating arm 65 that is rotationally fixed to the first connecting shaft 60 and the third rotating arm 70 that is rotationally fixed to the second connecting shaft 61 are parallel to each other and face in the same direction. The toothed belt 63 is stretched and connected through the toothed pulleys 62*a* and 62*b*. Since the first connecting shaft 60 and the second connecting shaft 61 are configured to rotate by the same angle in synchronization with each other, the first rotating arm 65 and the third rotating arm 70 rotate in synchronization with each other to be parallel and face in the same direction.

The tip rack mounting table 24 can stably mount the tip rack 7 by making the upper surface horizontal. As a guide member for positioning when each tip rack 7 is mounted, a tip rack guide 73 having a convex and substantially L-shaped cross section is provided in the vicinity of the inner front side, the rear side, the left side, and the right side of the tip rack 7 facing upward.

The substantially L-shaped cross section of the tip rack guide 73 is bent at an acute angle so that the upper end faces the inside of the tip rack 7 rather than the lower side, and the tip rack 7 is guided when being set on the tip rack mounting table 24 from above. When the tip rack 7 is set on the tip rack mounting table 24, the inside of the tip rack 7 and the tip rack guide 73 have a backlash of about 1 mm in the front-rear direction and the left-right direction, for example.

A first support arm 74 and a second support arm 75 are formed in a substantially L shape in which a part near the front end and the vicinity of the rear end of the tip rack mounting table 24 is extended downward and the lower end is extended forward in a side view. The first support arm 74 and the second support arm 75 are provided bisymmetrically near the left side and the right side.

A third spindle hole 76 and a fourth spindle hole 77 are provided at the substantially L-shaped tip portions of the first support arm 74 and the second support arm 75, respectively.

The third spindle 71 provided on the first rotating arm 65 is rotatably fitted to the third spindle hole 76.

The fourth spindle 72 provided on the third rotating arm 70 is rotatably fitted to the fourth spindle hole 77.

The distance between the third spindle hole 76 and the fourth spindle hole 77 provided in the tip rack mounting table 24 in the front-rear direction is equal to the distance between the first spindle hole 58 provided in the drawer base 55 and the second spindle hole in the front-rear direction. When the first rotating arm 65 or the second rotating arm 66 rotates around the first spindle hole 58, the third rotating arm 70 rotates in synchronization with the first rotating arm 65 while keeping in parallel through the first connecting shaft 60, the toothed pulley 62*a*, the toothed belt 63, and the toothed pulley 62*b*, and the second connecting shaft 61. Therefore, the tip rack mounting table 24 is configured to be movable along an arc trajectory of the third spindle 71 or the fourth spindle 72 while keeping the upper surface horizontal.

The first drawer arm 56 provided on the drawer base 55 and the first support arm of the tip rack mounting table 24 are formed in a substantially L shape not to interfere even when the third spindle 71 is located directly below the first connecting shaft 60.

The second drawer arm 57 provided on the drawer base 55 and the second support arm of the tip rack mounting table 24 are formed in a substantially L shape not to interfere even when the fourth spindle 72 is located directly below the second connecting shaft 61.

Next, the first guide roller 67 provided on the first rotating arm 65, the second guide roller 68 provided on the second rotating arm 66, the first guide groove 41 and the second guide groove 42 provided in the guide rail 40, and the opening/closing operation of the drawer 21 will be described with reference to FIGS. 10A to 10C, 11A to 11C, and 12A to 12C also with reference to FIGS. 8 and 9.

As illustrated in FIGS. 8 and 9, a pair of guide rails 40 and 40 is provided bisymmetrically inside the left plate 30 and the right plate 29. In the inner surfaces of the pair of guide rails 40 and 40 facing each other, the first guide groove 41 and the second guide groove 42 are provided respectively which extend horizontally from the front end of the guide rails 40 and 40 toward the rear side, and are bend in the vicinity of the rear ends of the guide rails 40 and 40.

The second guide groove 42 is provided above and parallel to the first guide groove 41 in a range extending horizontally from the front ends of the guide rails 40 and 40 toward the rear side.

The first guide groove 41 is a vertical groove portion 78 that gradually curves upward near the rear ends of the guide rails 40 and 40, and changes its direction vertically upward at the rear ends.

The second guide groove 42 is provided with a reverse portion 79 that curves upward from the horizontal and changes its direction upward, and then changes its direction substantially vertically downward, and further curves from the reverse portion 79 downward to the rear side.

Further, a branch portion 80 where the second guide groove 42 branches is provided immediately below the reverse portion 79. Further, an intersection portion 81 where the first guide groove 41 and the second guide groove 42 intersect is provided on the rear side from the reverse portion 79 or the branch portion 80.

The first guide roller 67 is slidably fitted to the first guide groove 41, and the second guide roller 68 is slidably fitted to the second guide groove 42. When the drawer base 55 moves in the front-rear direction by opening and closing the drawer 21, the first guide roller 67 slides along the first guide groove 41, and the second guide roller 68 slides along the second guide groove 42.

A curved guide protrusion 82 extending substantially in the vertical direction is provided in the vicinity of the reverse portion 79 and on the rear side of the reverse portion 79, and a surface close to the reverse portion 79 is a concave guide surface 83. The operation of this guide surface 83 will be described below.

Next, the operation when the drawer 21 is closed will be described with reference to FIGS. 10A to 10C, FIGS. 11A to 11C, and FIGS. 12A to 12C. Herein, the state in which the tip rack 7 is mounted on the tip rack mounting table 24 is indicated by a chain line, the door 34 and the drawer bottom plate 39 are indicated by a broken line, and the outline of the housing 33 is also indicated by a chain line.

Figure 10A:
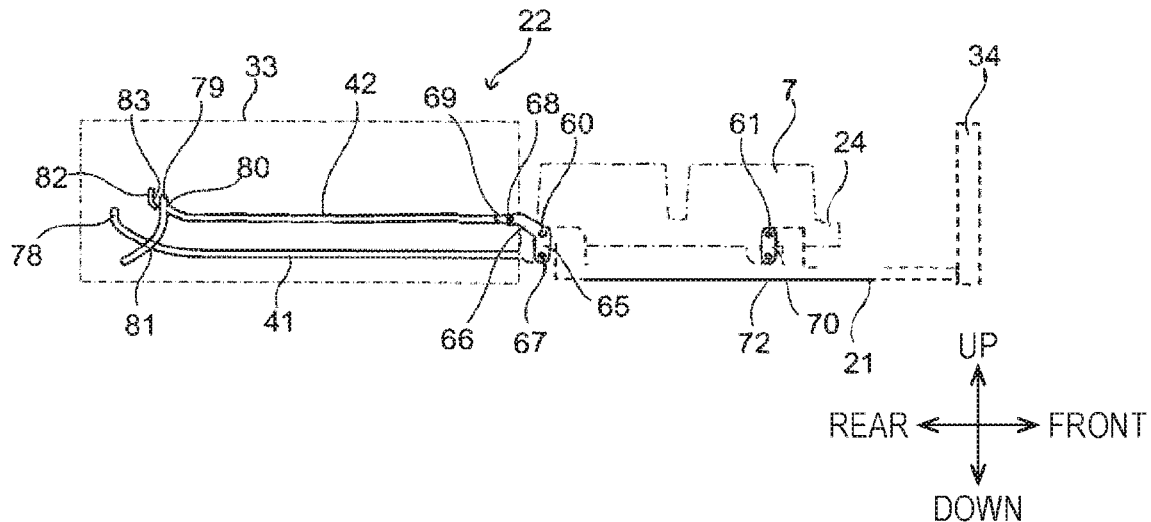
FIG. 10A is a schematic cross-sectional view taken along line A-A of the automated analyzing device according to the first embodiment (a fully opened state of the drawer).

FIG. 10A is a schematic view illustrating the drawer 21 in a fully opened state. In FIG. 10A, the drawer 21 is opened up to a maximum opening amount of the drawer rail 35. From the fully closed state to the fully opened state, the first connecting shaft 60 and the second connecting shaft 61 move only horizontally in the front-rear direction together with the drawer 21.

The second guide roller 68 is located in the vicinity of the front end of the second guide groove 42, and the first guide roller 67 is located in front of the front end of the first guide groove 41 and is in a disengaged state. Herein, since the second rotating arm 66 is supported by the first connecting shaft 60 and the second guide roller 68 and does not rotate, the tip rack mounting table 24 is stably supported and the opening amount can be expanded. The first rotating arm 65 faces substantially vertically downward with respect to the first connecting shaft 60, and the first guide roller 67 is at the lowest position with respect to the first connecting shaft 60.

As described above, since the third rotating arm 70 is configured to rotate while maintaining parallel to the first rotating arm 65, the third rotating arm 70 faces substantially the vertically lower side with respect to the second connecting shaft 61, and the fourth spindle 72 is located at the lowest position with respect to the second connecting shaft 61.

Since the tip rack mounting table 24 is supported by the third spindle 71 and the fourth spindle 72 provided coaxially with the first guide roller 67, the tip rack mounting table 24 is located at the lowest position in the fully opened state of the drawer illustrated in FIG. 10A. Herein, the height of the upper ends of the sample dispensing tips/reaction containers 10 and 14 mounted on the tip rack 7 is set to be lower than the upper side of the front-face opening 20 provided on the front surface of the housing 33. It is preferable that the sample dispensing tip/reaction containers 10 and 14 do not come out of contact with the front-face opening 20 or be damaged when the drawer 21 is opened and closed.

Figure 10B:
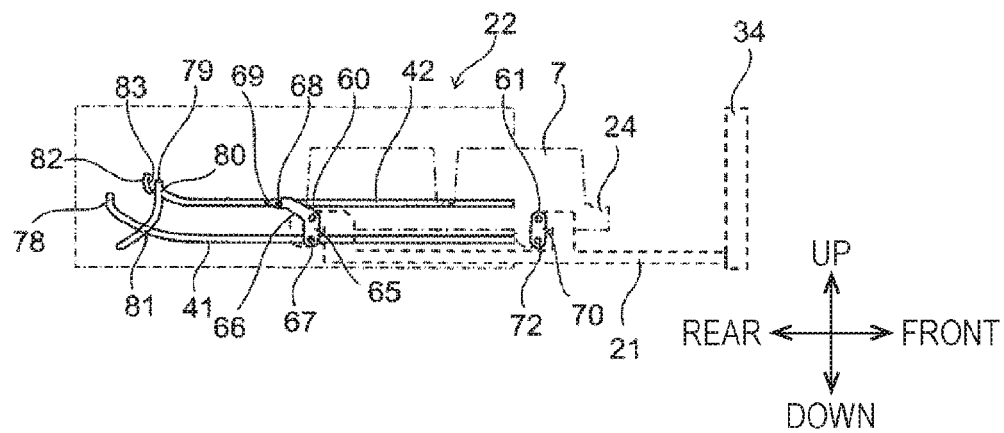
FIG. 10B is a schematic cross-sectional view taken along line A-A of the automated analyzing device according to the first embodiment (a state on the way of the drawer).

FIG. 10B illustrates a state where the drawer 21 is being closed. The rear tip rack 7 has already been inserted into the housing 33 from the front-face opening 20, and the front tip rack 7 is passing through the front-face opening 20.

The second guide roller 68 is fitted to a section where the second guide groove 42 is extended horizontally, and the first guide roller 67 is fitted to a section where the first guide groove 41 is extended horizontally. Therefore, since the tip rack mounting table 24 is at the lowest position, the sample dispensing tips/reaction containers 10 and 14 mounted on the tip rack 7 do not contact the upper side of the front-face opening 20.

Figure 10C:
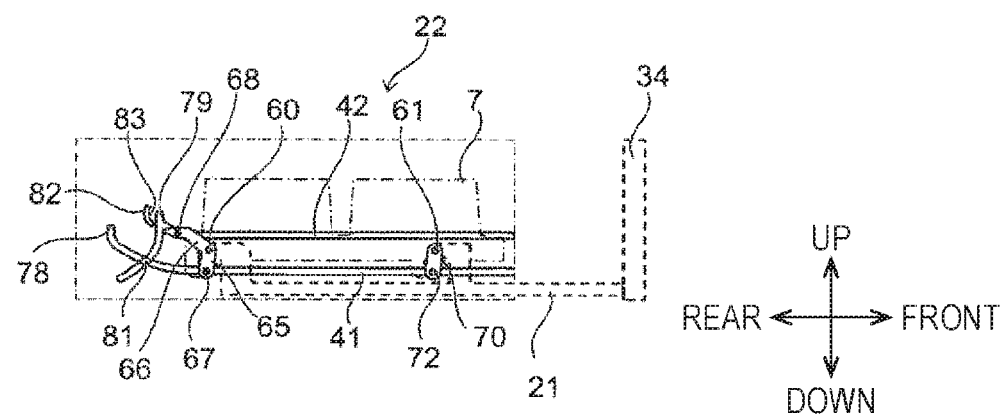
FIG. 10C is a schematic cross-sectional view taken along line A-A of the automated analyzing device according to the first embodiment (a state in which the tip rack starts to rise while the drawer is being closed).

FIG. 10C illustrates a state in which the drawer 21 is further closed, and the tip rack 7 passes through the front-face opening 20 and enters the inside of the housing 33.

The second guide roller 68 shifts the second guide groove 42 from the horizontal portion to the portion curved upward. The second guide roller 68 starts to move upward, and the second rotating arm 66 and the first rotating arm 65 start to turn in the clockwise direction around the first connecting shaft 60 in the figure.

Although the first guide roller 67 slightly moves in the vertical direction, the first guide roller 67 starts to move backward with respect to the first connecting shaft 60. In other words, the tip rack mounting table 24 on which the tip rack 7 is mounted also starts to move backward with respect to the first connecting shaft 60.

Figure 11A:
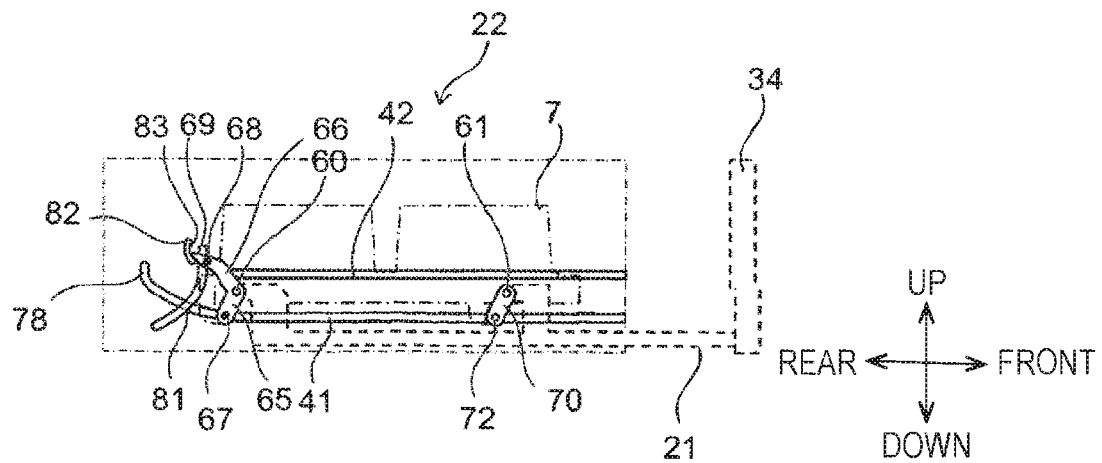
FIG. 11A is a schematic cross-sectional view taken along line A-A of the automated analyzing device according to the first embodiment (a state in which the tip rack is further raised while the drawer is being closed).

FIG. 11A illustrates a state in which the drawer 21 is further closed and the second guide roller 68 is close to the reverse portion 79 of the second guide groove 42.

The guide end 69 provided at the tip portion of the second rotating arm 66 moves substantially upward along the guide surface 83 on the front side of the guide protrusion 82. Since the second guide roller 68 moves further upward, the second rotating arm 66 and the first rotating arm 65 further rotate around the first connecting shaft 60 in the clockwise direction in the figure.

The first guide roller 67 engages with a portion where the first guide groove 41 is curved upward, further moves backward with respect to the first connecting shaft 60, and also moves upward, so that the tip rack mounting table 24 on which the tip rack 7 is mounted is also raised.

Figure 11B:
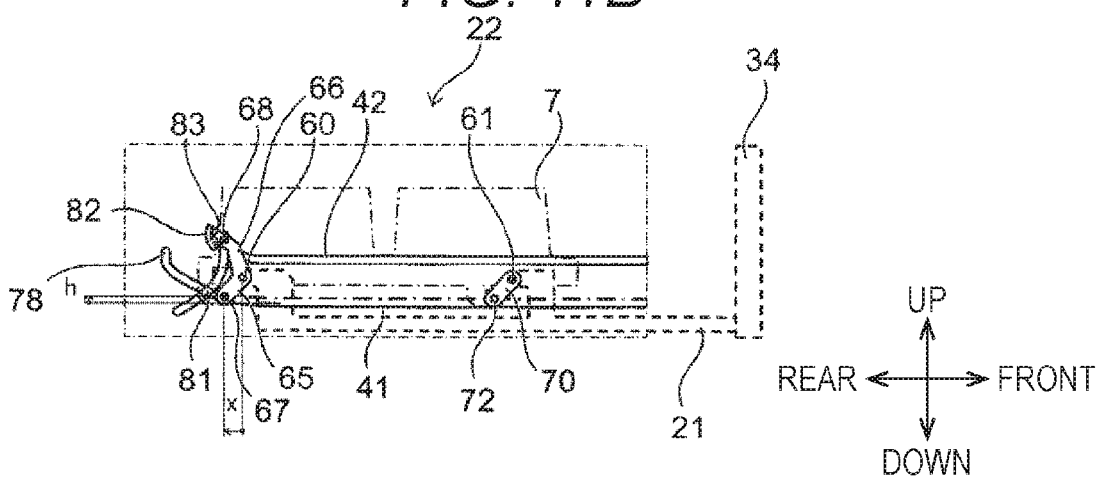
FIG. 11B is a schematic cross-sectional view taken along line A-A of the automated analyzing device according to the first embodiment (a state in which the tip rack is further raised while the drawer is being closed).

FIG. 11B illustrates a state in which the drawer 21 is further closed and the second guide roller 68 is fitted to the reverse portion 79 of the second guide groove 42.

The second guide roller 68 moves substantially upward along the reverse portion 79, and the second rotating arm 66 and the first rotating arm 65 further rotate in the clockwise direction around the first connecting shaft 60 in the figure. The first guide roller 67 is fitted to a portion where the first guide groove 41 is curved upward, further moves backward by a distance x with respect to the first connecting shaft 60, and also moves upward, so that the tip rack mounting table 24 on which the tip rack 7 is mounted is also raised by a height h which it is slight.

Herein, the moving of the tip rack mounting table 24 backward by the distance x means that the tip rack mounting table 24 moves backward by the distance x more than the amount of movement due to the closing operation of the drawer 21. Therefore, in other words, it indicates that the speed of moving backward of the tip rack mounting table 24 is higher than the speed of closing the drawer 21, and the tip rack mounting table 24 is accelerated backward with respect to the drawer.

Figure 11C:
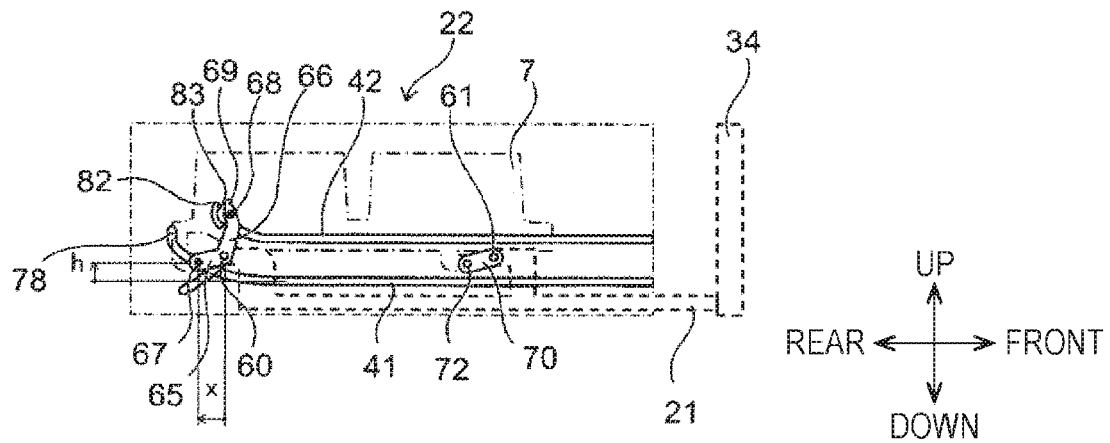
FIG. 11C is a schematic cross-sectional view taken along line A-A of the automated analyzing device according to the first embodiment (a state in which the tip rack is further raised while the drawer is being closed).

FIG. 11C illustrates a state where the drawer 21 is further closed and the second guide roller 68 is fitted to the reverse portion 79 of the second guide groove 42.

The second guide roller 68 moves further upward along the reverse portion 79 and hardly moves in the front-rear direction. The second rotating arm 66 and the first rotating arm 65 further rotate around the first connecting shaft 60 in the clockwise direction in the figure. The first guide roller 67 is fitted to a portion where the first guide groove 41 is curved upward, moves backward by the distance x with respect to the first connecting shaft 60, and also moves upward by the height h, so that the tip rack mounting table 24 on which the tip rack 7 is mounted is also raised by the height h.

Figure 12A:
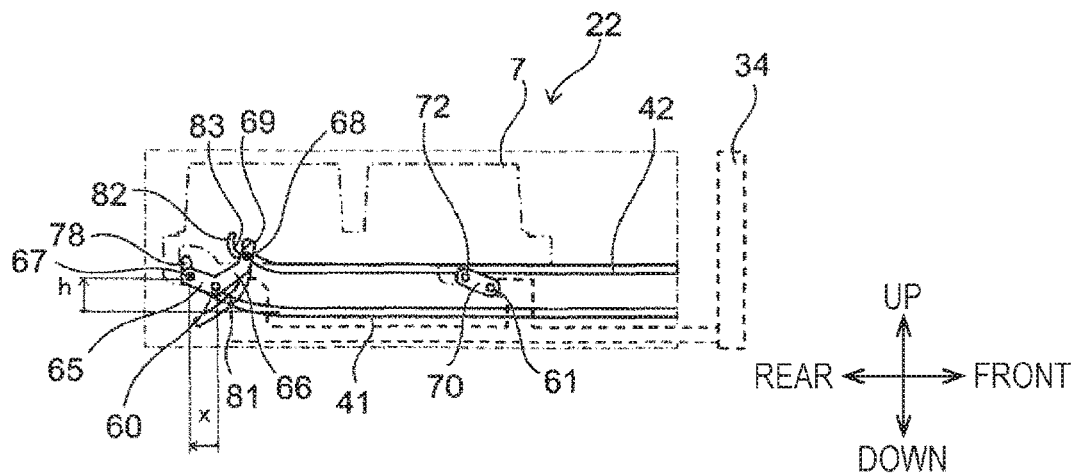
FIG. 12A is a schematic cross-sectional view taken along line A-A of the automated analyzing device according to the first embodiment (a state in which the tip rack is further raised and decelerated backward while the drawer is being closed).

In FIG. 12A, the drawer 21 is further closed, and the second guide roller 68 is being lowered from the reverse portion 79 of the second guide groove 42, and the first guide roller 67 is located close to the vertical groove portion 78 of the first guide groove 41. The second rotating arm 66 and the first rotating arm 65 further rotate around the first connecting shaft 60 in the clockwise direction in the figure. The first guide roller 67 moves backward by the distance x and also moves upward by the height h, and the tip rack mounting table 24 on which the tip rack 7 is mounted is also raised by the height h.

Herein, a maximum value of the moving distance x where the first guide roller 67 precedes the drawer 21 backward is generated when the first guide roller 67 is located at the same height as the first connecting shaft 60, that is, between FIG. 11C and FIG. 12A. The value is equal to the length of the first rotating arm 65, that is, the distance between the first guide roller 67 and the first connecting shaft 60.

Figure 12B:
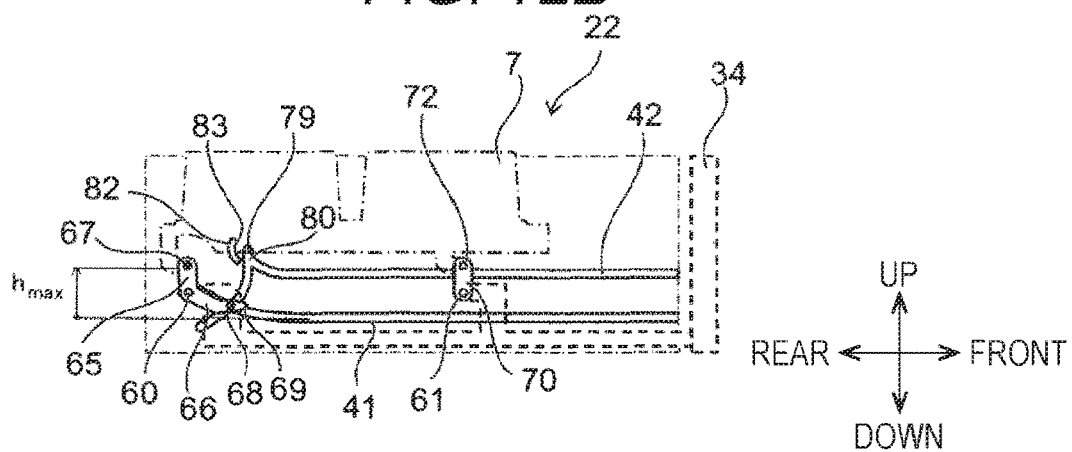
FIG. 12B is a schematic cross-sectional view taken along line A-A of the automated analyzing device according to the first embodiment (a state immediately before the drawer is closed and the tip rack is at the highest top dead center).

In FIG. 12B, the drawer 21 is further closed, the second guide roller 68 is at the intersection portion of the second guide groove 42, and the first guide roller 67 is fitted to the vertical groove portion 78 of the first guide groove 41, and located directly above the first connecting shaft 60. The first rotating arm 65 is at the apex facing directly upward. It is a matter of course that, at this position, the tip rack mounting table 24 is at the position of a maximum value $h_{max}$ that has been raised most.

Herein, from FIGS. 12A to 12B, the first guide roller 67 only moves upward in the vertical groove portion 78 of the first guide groove 41, and thus the tip rack mounting table 24 is stopped at a speed 0 in the front-rear direction. Since the first guide roller 67 is located directly above the first connecting shaft 60, the relation of the distance x=0 is satisfied. The drawer 21 catches up with the tip rack mounting table 24 that precedes backward.

Figure 12C:
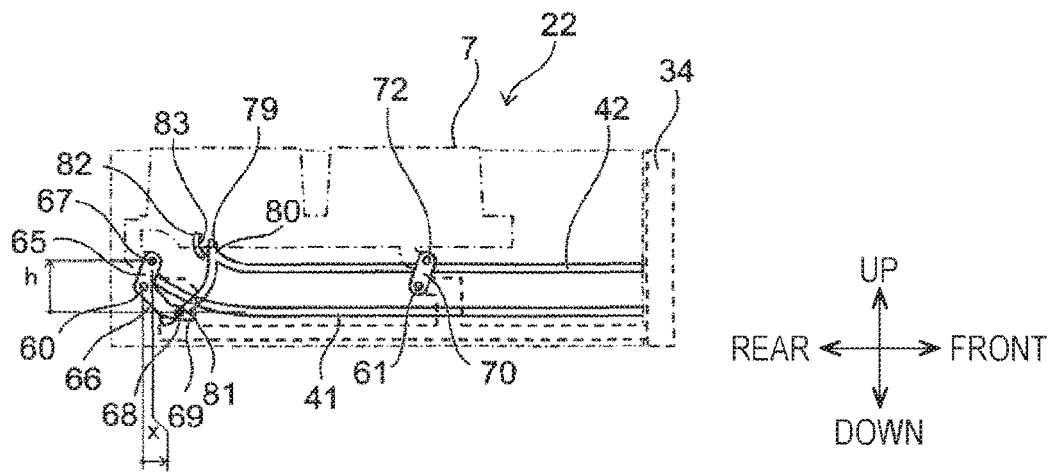
FIG. 12C is a schematic cross-sectional view taken along line A-A of the automated analyzing device according to the first embodiment (a fully closed state of the drawer).

FIG. 12C illustrates the fully closed state of the drawer 21. The first guide roller 67 remains positioned in the vertical groove portion 78 of the first guide groove 41, and the first connecting shaft 60 is positioned behind the first guide roller 67 by the distance x together with the drawer 21. Therefore, the height h of the tip rack mounting table 24 is smaller than the maximum value $h_{max}$, and the tip rack 7 is positioned slightly lower than the maximum value illustrated in FIG. 12B.

The second guide roller 68 is located in the vicinity of the rear end where the second guide groove 42 is curved downward to the rear side.

Herein, in a range where the first guide roller 67 is fitted to the vertical groove portion 78 of the first guide groove 41, the tip rack mounting table 24 does not move back and forth even if the drawer 21 is moved in the front-rear direction.

In addition, in FIG. 12B, since the first rotating arm 65 is at the apex facing upward, even if the drawer 21 is moved in the front-rear direction, the amount of movement in the vertical direction of the tip rack mounting table 24 is very small. As an example, assuming that a radius r of the first rotating arm 65 is 25 mm, an amount a of movement in the front-rear direction of the drawer 21 is 2 mm, an amount Δh of movement in the vertical direction of the tip rack mounting table 24 is $\Delta h = r - [\sqrt{(r^2 - a^2)}] = 0.08$ mm and only ¹⁄₂₅, and even when the relation of a=5 mm is satisfied, Δh is 0.5 mm and only ¹⁄₁₀.

In other words, in this embodiment, in the vicinity of the drawer closed position, the first guide roller 67 coaxial with the third spindle 71 that supports the tip rack mounting table 24 is located directly above the first connecting shaft 60. The first guide roller 67 is fitted to the vertical portion of the first guide groove 41 so that the tip rack stops in the front-rear direction even when the drawer 21 is displaced in the front-rear direction. The amount of movement in the vertical direction can also be reduced. Therefore, even when the fully closed position of the drawer 21 varies, or even when the drawer 21 is shaken back and forth, the tip rack mounting table 24 does not move back and forth, and the tip rack 7 can be stably and accurately mounted.

In this embodiment, the third spindle 71 that supports the tip rack mounting table 24 is coaxial with the first guide roller 67, and the first guide roller 67 moves along the first guide groove 41. With the configuration, the movement locus of the tip rack mounting table 24 in the opening/closing operation of the drawer 21 is the same as the shape of the first guide groove 41.

The tip rack 7 mounted on the tip rack mounting table 24 is moved horizontally to the rear side through the front-face opening 20 and moved to the inside of the housing 33 only by the horizontal movement from the fully opened state of the drawer 21. Then, it is possible to perform an interlocking operation for gradually raising, and in the fully closed position, the sample dispensing tips/reaction containers 10 and 14 mounted on the tip rack 7 are supplied to a position raised above the top-face opening 26.

Further, the above description has been given about the operation when the drawer 21 is closed. However, the operation in the reverse direction can be performed reversibly, and the operation when the drawer 21 is opened is an operation in the reverse direction.

Next, the closing operation of the drawer 21, and the displacement characteristics in the front-rear direction (X direction) and the vertical direction (Y direction) of the tip rack mounting table 24 described with reference to FIGS. 10A to 10C, FIGS. 11A to 11C, and FIGS. 12A to 12C will be described using FIG. 13.

Figure 13:
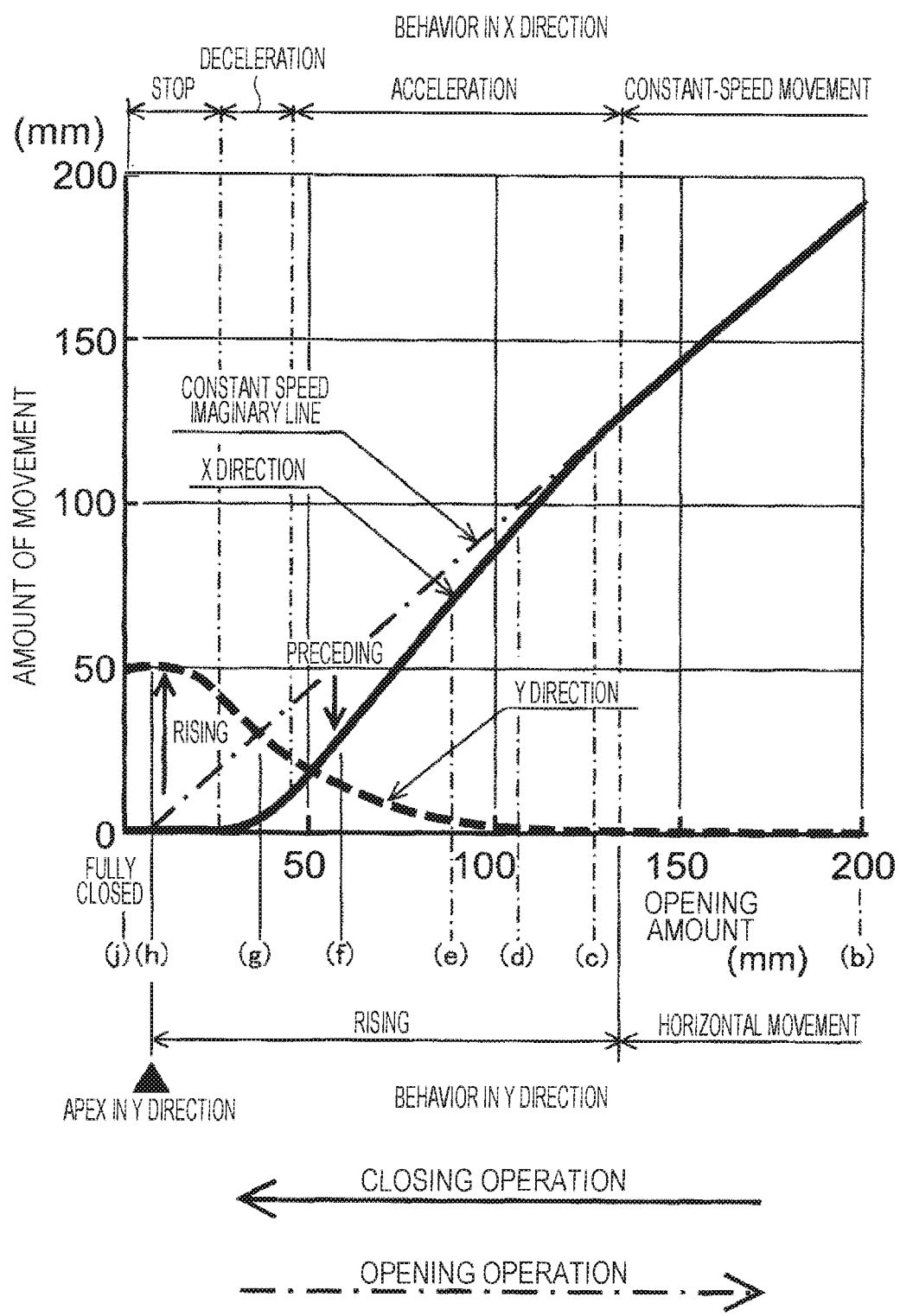
FIG. 13 is a graph illustrating characteristics of the amount of movement in a horizontal direction and a vertical direction of the tip rack when the drawer is closed in the tip rack loading means of the automated analyzing device according to the first embodiment.

FIG. 13 is a graph in which the horizontal axis is the horizontal opening amount taken from the fully closed position of the drawer 21 and the vertical axis is the amount of horizontal movement and the rising amount of the tip rack mounting table 24. The left end is a fully closed position, and the right end is a position opened by 200 mm in this embodiment. In a range larger than 200 mm, the first guide groove 41 and the second guide groove 42 are horizontal, and the opening amount of the drawer 21 and the amount of movement of the tip rack mounting table 24 are 1:1. This embodiment is an example in which the length of the first rotating arm 65 is set to 25 mm, and the rising amount of the tip rack mounting table 24 is a maximum of 50 mm.

The movement from right to left in FIG. 13 is the closing direction, and the movement from left to right is the opening direction. The solid line is indicated as the amount of movement of the tip rack mounting table 24 in the front-rear direction (X direction), and the broken line is indicated as the amount of movement in the vertical direction (Y direction). The chain line described as a constant speed imaginary line is a straight line that virtually indicates the amount of movement in the X direction when the tip rack mounting table 24 is integrated with the drawer 21, and is indicated for comparison with the movement characteristics in the X direction. The reason why the horizontal axis passes through a point of about 10 mm instead of 0 when the vertical axis is 0 is that it becomes a vertex in the Y direction at the position of FIG. 12B. (b) to (j) are symbols corresponding to FIGS. 10B, 10C, and FIGS. 12A to 12C, respectively, and (a) is not illustrated because it is on the right side of the right end of the graph.

The behavior in the X direction described at the upper end of the graph of FIG. 13 and the behavior in the Y direction described at the lower end indicate the behavior during the closing operation. During the opening operation, deceleration and acceleration are reversed, and rising turns to lowering.

Since this is a closing operation, the right side, which is fully opened, will be described. The tip rack mounting table 24 is integrated and moves horizontally with the drawer 21 from the fully opened state (a) (not illustrated) through (b) to the vicinity of (c). Therefore, the X direction has a linear characteristic to be overlapped with the constant speed imaginary line, and the Y direction remains zero.

From (c) to (f), the first guide roller 67 rotates from the position where the first rotating arm 65 is directed vertically downward to the rear side around the first connecting shaft 60. A range where the first guide roller 67 rotates by 90° until facing horizontally backward of the first connecting shaft 60 is a section where the tip rack mounting table 24 is accelerated in the X direction as compared with the drawer 21.

In this section, the tip rack mounting table 24 is raised in the Y direction. From (f) and (g) to (h), that is, a 90° rotation range of the first rotating arm 65 from the position facing backward up to rotating around the first connecting shaft 60 to face upward is a section in which the tip rack mounting table 24 is decelerated and stops in the X direction as compared with the drawer 21. In this section, the tip rack mounting table 24 is raised in the Y direction, reaches the apex at (h), and reaches a maximum rising position.

Further, (h) to (j) is an overrun section after overcoming the apex, and is provided to secure an operation region of the positioning means of the tip rack 7 described below.

Next, the description will be given with reference to FIGS. 14A to 14C and FIGS. 15A to 15C of a configuration for the second guide roller 68 to securely pass through the reverse portion 79 and the branch portion 80 provided in the second guide groove 42.

FIGS. 14A to 14C and FIGS. 15A to 15C are schematic diagrams illustrating the configuration and operation when the second guide roller 68 passes in the vicinity of the reverse portion 79.

In other words, the second guide groove 42 includes the branch portion 80 for bifurcating the groove at the lower portion of the reverse portion 79. As illustrated by hatching in FIG. 14A, the branch portion 80 has a substantially fan-shaped groove shape in which the groove width of the lower side is approximately doubled. Therefore, it is not possible to guide due to backlash when the second guide roller 68 is lowered from the reverse portion 79 and passes through the branch portion 80. Therefore, there is required a configuration for the second guide roller 68 to surely advance to a desired groove among the bifurcated grooves according to the opening operation or the closing operation.

Figure 14A:
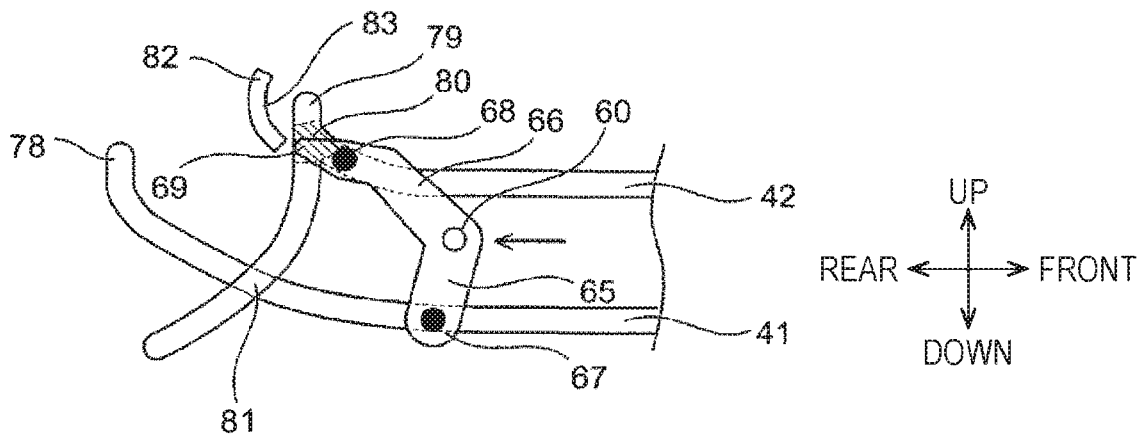
FIG. 14A is an explanatory view illustrating main parts of the tip rack moving direction changing means of the automated analyzing device according to the first embodiment (when a second guide roller is outside a branch portion).

FIG. 14A illustrates a state before the second guide roller 68 moves backward along the second guide groove 42 and enters the branch portion 80 in the closing operation. The second guide roller 68 is fitted to the second guide groove 42 and moves stably.

The guide end 69 provided at the tip of the second rotating arm 66 is not in contact with the guide surface 83 facing the front side of the guide protrusion 82 provided on the guide rail 40.

Figure 14B:
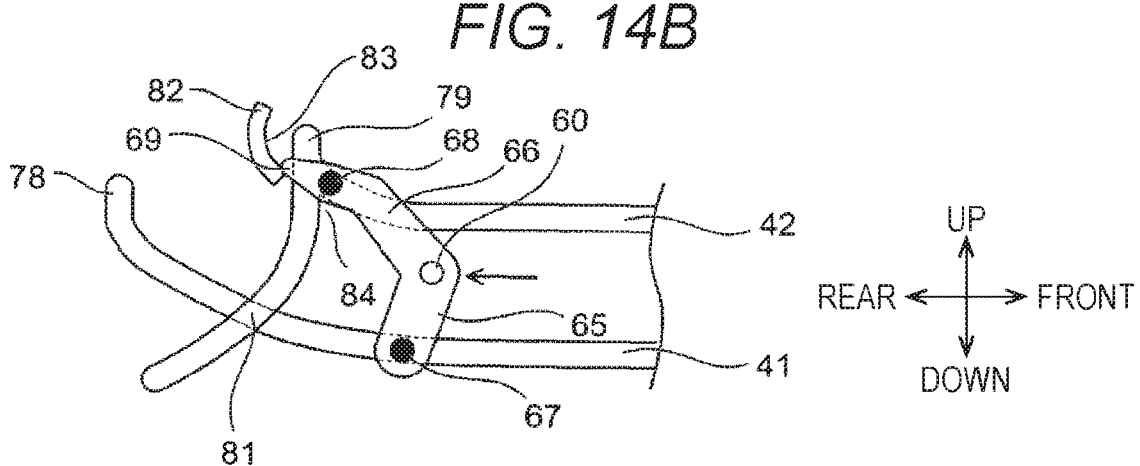
FIG. 14B is an explanatory view illustrating the main parts of the tip rack moving direction changing means of the automated analyzing device according to the first embodiment (when the second guide roller is immediately before the branch portion).

FIG. 14B illustrates a state in which the first connecting shaft 60 has further moved backward, and the guide end 69 comes into contact with the guide surface 83 immediately before the second guide roller 68 enters the branch portion.

Figure 14C:
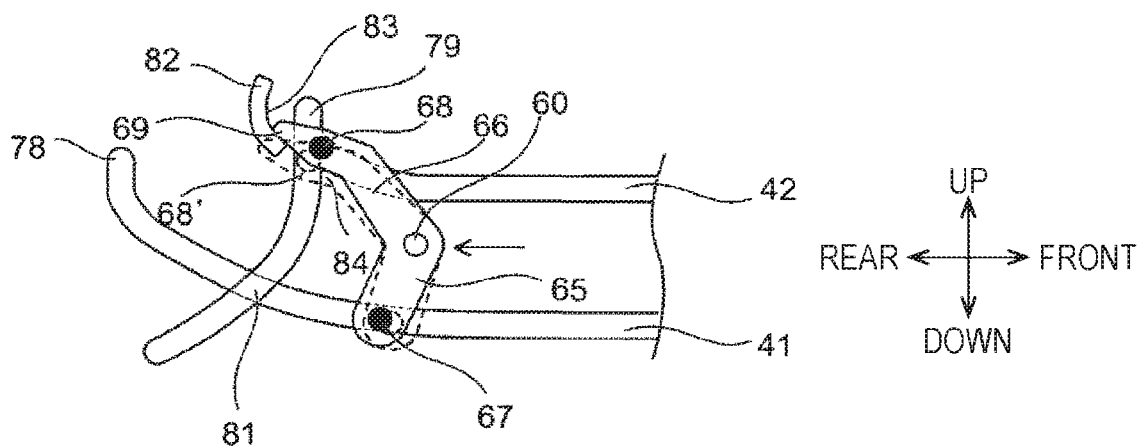
FIG. 14C is an explanatory view illustrating the main parts of the tip rack moving direction changing means of the automated analyzing device according to the first embodiment (when the second guide roller is at the branch portion).

FIG. 14C illustrates a state in which the first connecting shaft 60 has further moved backward and the second guide roller 68 has entered the branch portion 80, and the guide end 69 is in contact with the guide surface 83. Herein, the behavior of the first rotating arm 65 and the second rotating arm 66 when there is no guide surface 83 which is one surface of the guide protrusion 82 is indicated by a broken line. Since the second guide roller 68 has entered the branch portion 80, the position of the second guide roller 68 cannot be accurately guided. In addition, even if the first rotating arm 65 and the first guide roller 67 rotate as indicated by a broken line, the direction in which the first guide roller 67 moves is substantially equal to the tangential direction of the first guide groove 41. Therefore, the rotation of the first rotating arm 65 cannot be prevented. In other words, the second rotating arm 66 can be maintained at a predetermined position by the guide protrusion 82, the guide surface 83, and the guide end 69.

Figure 15A:
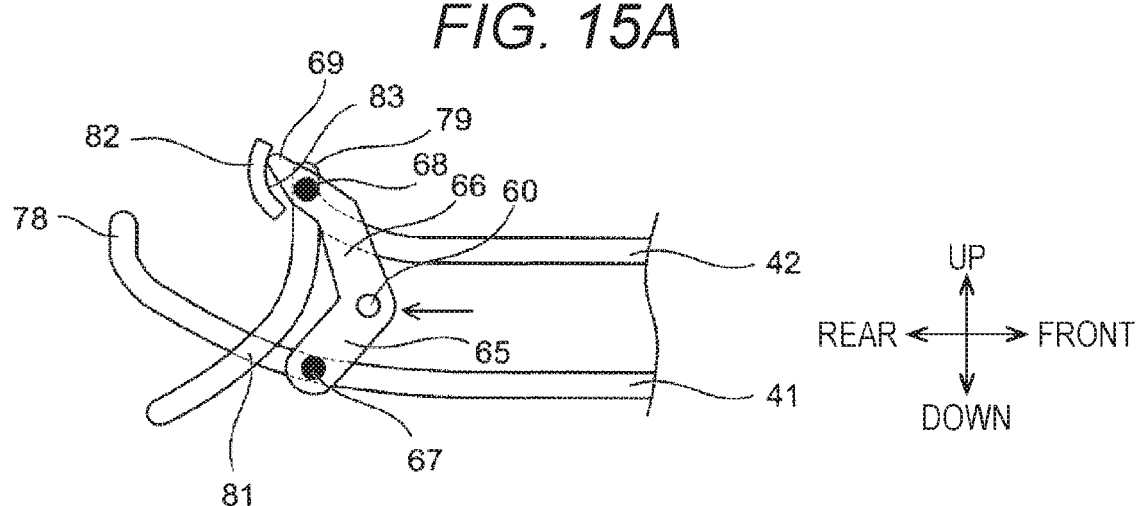
FIG. 15A is an explanatory view illustrating the main parts of the tip rack moving direction changing means of the automated analyzing device according to the first embodiment (when the second guide roller is moving from the branch portion to a reverse portion).

FIG. 15A illustrates a state in which the second guide roller 68 starts to enter the reverse portion 79 from the branch portion 80, and the guide end 69 is in contact with the guide surface 83.

Figure 15B:
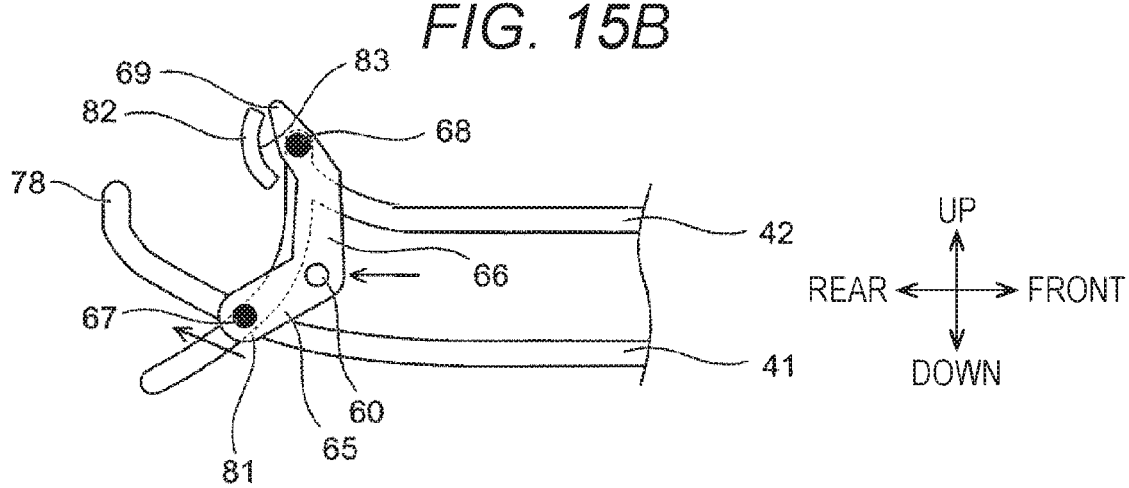
FIG. 15B is an explanatory view illustrating the main parts of the tip rack moving direction changing means of the automated analyzing device according to the first embodiment (when the second guide roller is at the reverse portion).

FIG. 15B illustrates a state in which the second guide roller 68 enters the reverse portion 79 and the guide end 69 moves further upward from the upper end of the guide surface 83 and is separated from the guide surface 83. Even if the guide end 69 is separated from the guide surface 83, if the reverse portion 79 has a groove width that slidably engages with the second guide roller 68, the second guide roller 68 does not rattle but the second rotating arm 66 can be maintained in a predetermined position.

Figure 15C:
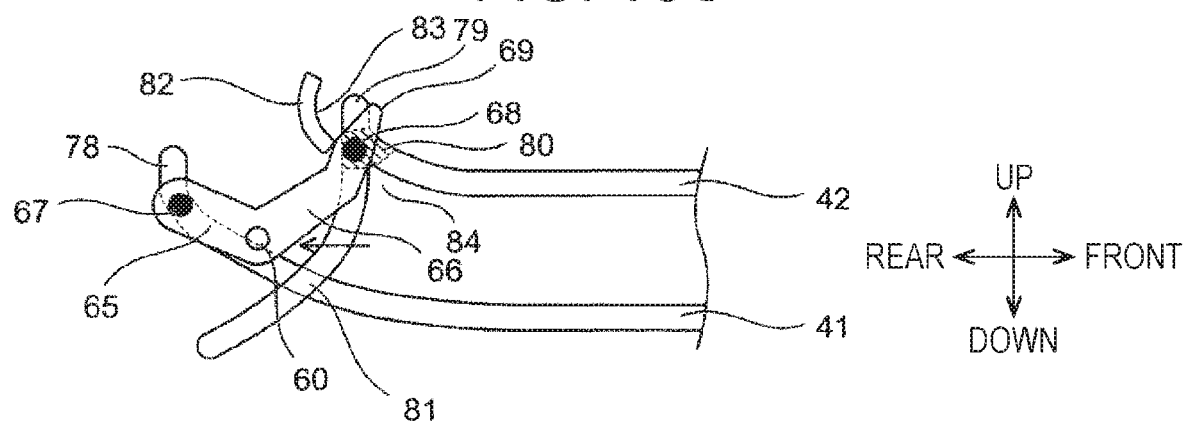
FIG. 15C is an explanatory view illustrating the main parts of the tip rack moving direction changing means of the automated analyzing device according to the first embodiment (when the second guide roller is at the branch portion).

In FIG. 15C, the first connecting shaft 60 further moves backward, the first rotating arm 65 and the second rotating arm 66 rotate clockwise in the figure, and the second guide roller 68 is lowered from the reverse portion 79 and located at the branch portion 80.

At this time, the first guide roller 67 moves backward and upward along the first guide groove 41 and is guided with high accuracy. Therefore, even if the second guide roller 68 is located at the branch portion 80, the first rotating arm 65 and the second rotating arm 66 can be maintained at predetermined positions around the first connecting shaft 60.

The above configuration illustrates the operation when the drawer 21 is closed from the opened state, but the operation when the drawer 21 is opened is in the order (f) to (a) contrary to the above, and the first connecting shaft 60, the first rotating arm 65, and the second rotating arm 66 move toward the front side from the rear side.

Herein, in the case where there is no guide surface 83, the second guide roller 68 may enter the branch portion 80 and enter the state indicated by the broken line in the case of the state illustrated in FIG. 14C during a period when the drawer 21 is opened.

In order for the second guide roller 68 to continue the opening operation of the drawer 21, the second guide roller 68 needs to advance in the direction branched toward the horizontal portion extending forward of the second guide groove 42, but tends to advance in the direction branched downward toward the intersection portion 81 of the second guide groove 42. Then, the second guide roller 68 is caught on an apex portion 84 having an acute upward tip at the lower end of the branch portion 80, and the drawer 21 is not opened.

In other words, the guide surface 83 of the guide protrusion 82 provided close to the rear side of the reverse portion 79 and the guide end 69 that is the tip of the second rotating arm 66 are configured to securely prevent the second guide roller 68 from being caught on the apex portion 84. With this configuration, the second guide roller 68 can pass through the reverse portion 79 and the branch portion 80 stably, and the drawer 21 can be opened and closed.

Herein, since the first guide roller 67 and the second guide roller 68 are rotary guide rollers instead of fixed pins, a frictional resistance is very small when the first guide roller 67 and the second guide roller 68 move along the first guide groove 41 and the second guide groove 42. It is possible to perform a smooth opening/closing operation.

In addition, the first guide roller 67 and the second guide roller 68 are slid along the first guide groove 41 and the second guide groove 42 intersecting with each other, so that the first rotating arm 65 and the second rotating arm 66 rotate. Therefore, the first guide roller 67 is stably guided, and the first rotating arm 65 can rotate by about 180° from the downward direction to the upward direction with respect to the first connecting shaft 60.

Further, the first rotating arm 65 is configured to rotate about 180° from the downward direction to the upward direction with respect to the first connecting shaft 60 from the opened state to the fully closed state of the drawer. The rising amount $h_{max}$ of the tip rack 7 with respect to the radius of the first rotating arm 65 is maximized, and there is an effect of realizing a reduction in the size of the mechanism. In addition, since the first rotating arm 65 rotates between a so-called top dead center and a bottom dead center from when the drawer is opened to when it is fully closed, an error of the rising amount of the tip rack 7 is less likely to occur but high accuracy is secured. Therefore, it is possible to provide an automated analyzing device with high reliability.

When the drawer 21 is closed, the tip rack 7 is raised together with the tip rack mounting table 24, and the sample dispensing tip/reaction containers 10 and 14 mounted on the tip rack 7 are exposed from the top-face opening 26 provided on the upper surface of the housing 33.

Thereafter, the sample dispensing tips/reaction containers 10 and 14 are held one by one by the sample dispensing tip/reaction container conveyance means 8 and moved upward.

Therefore, in order to be surely held by the sample dispensing tip/reaction container conveyance means 8, it is necessary to perform positioning with high accuracy after the tip rack 7 is raised. Alternatively, in a case where the sample dispensing tip/reaction container conveyance means 8 is in operation, the door 34 of the drawer 21 is locked by being interlocked to prevent the drawer 21 from being opened inadvertently. However, in a case where the user pushes and pulls on the door 34 to operate the drawer 21 during operation, and vibration is applied, it is desirable that the vibration is not transmitted to the tip rack 7.

An example of such a positioning configuration will be described below with reference to FIGS. 16 to 22.

Figure 16:
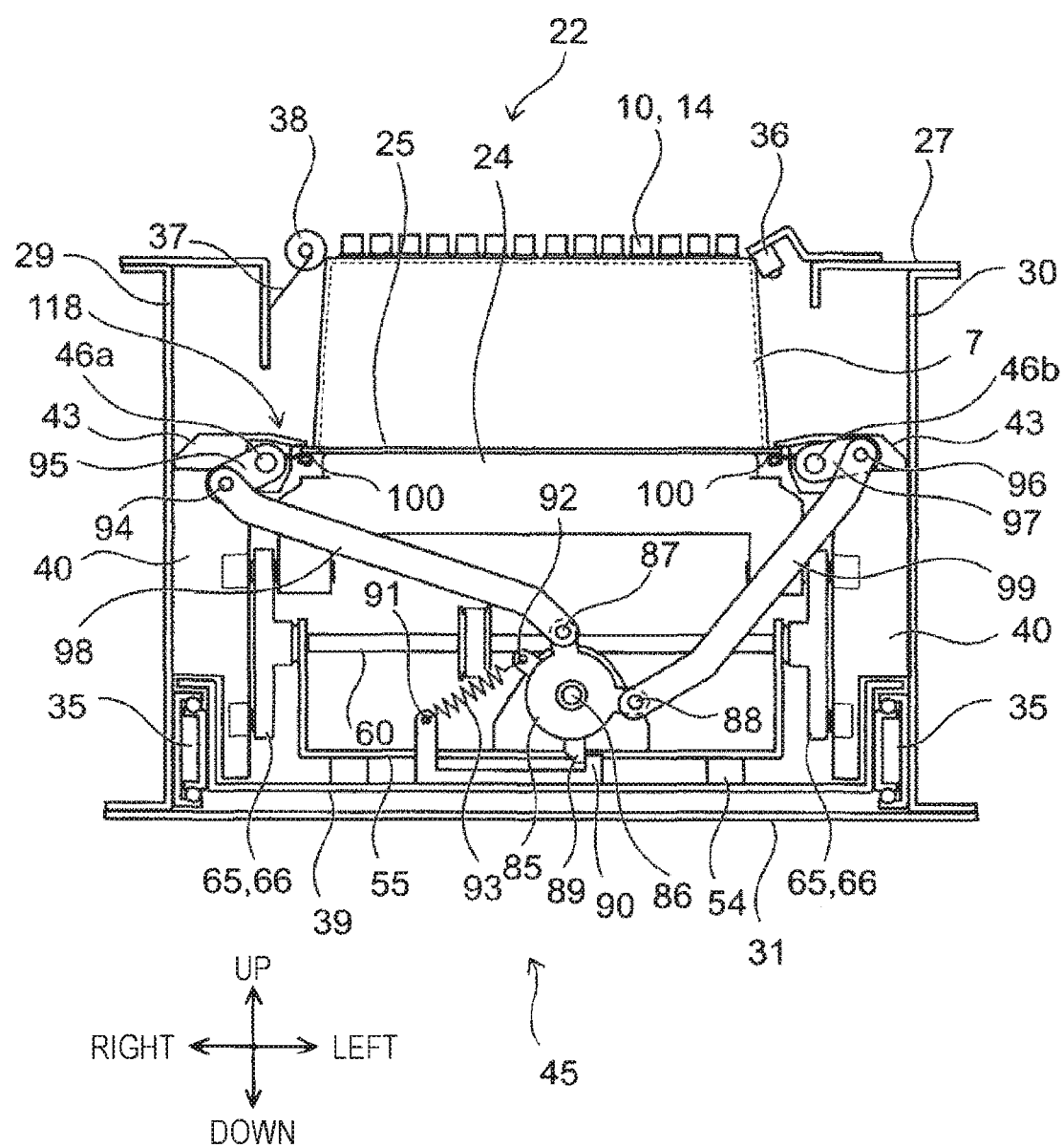
FIG. 16 is a rear view of the tip rack loading means in the automated analyzing device according to the first embodiment.
Figure 17A:
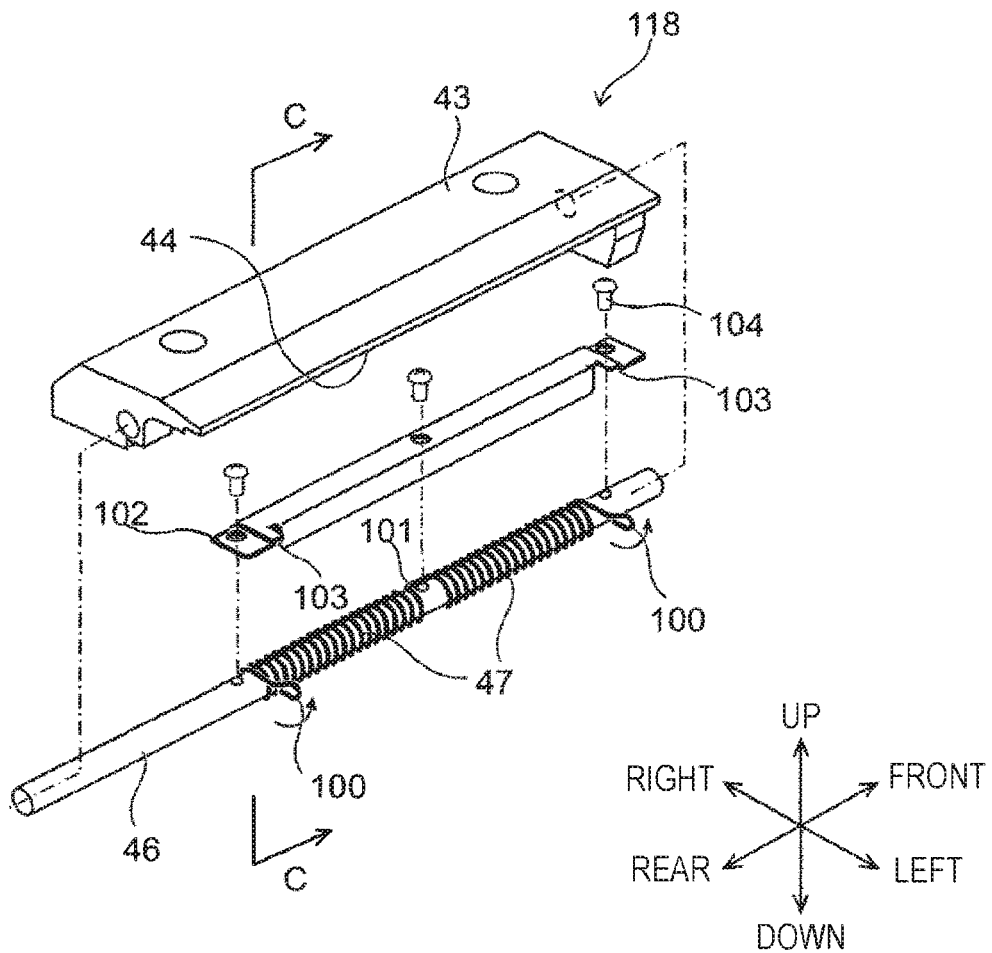
FIG. 17A is a perspective view illustrating the configuration of a tip rack positioning means in the tip rack loading means of the automated analyzing device according to the first embodiment.
Figure 17B:
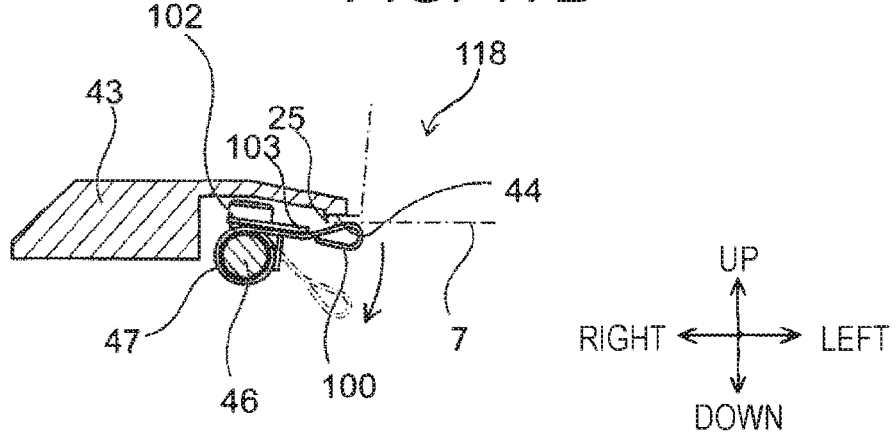
FIG. 17B is a cross-sectional view illustrating the configuration of the tip rack positioning means in the tip rack loading means of the automated analyzing device according to the first embodiment.
Figure 18:
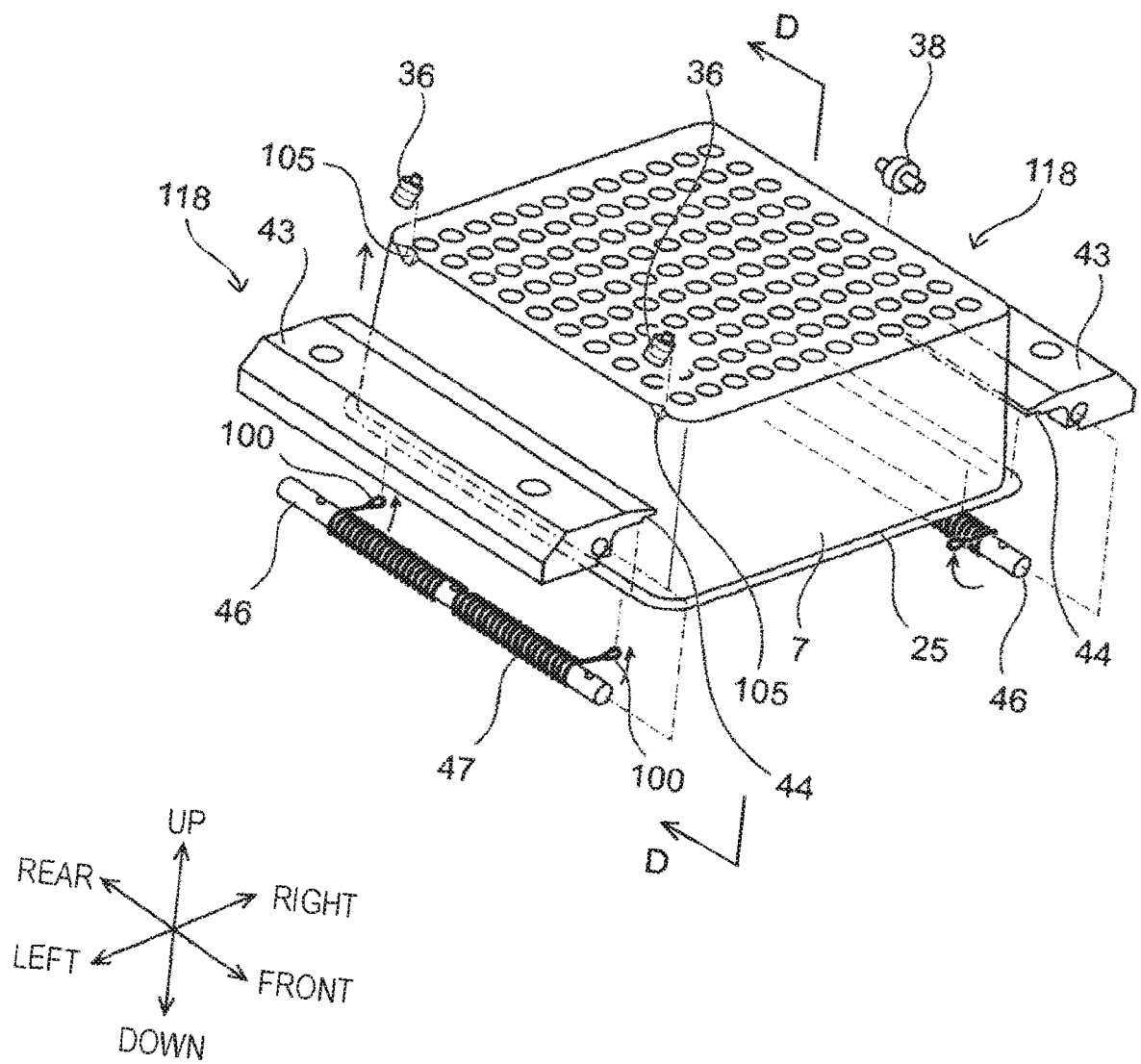
FIG. 18 is a perspective view illustrating the configuration of the tip rack positioning means in the tip rack loading means of the automated analyzing device according to the first embodiment.
Figure 19:
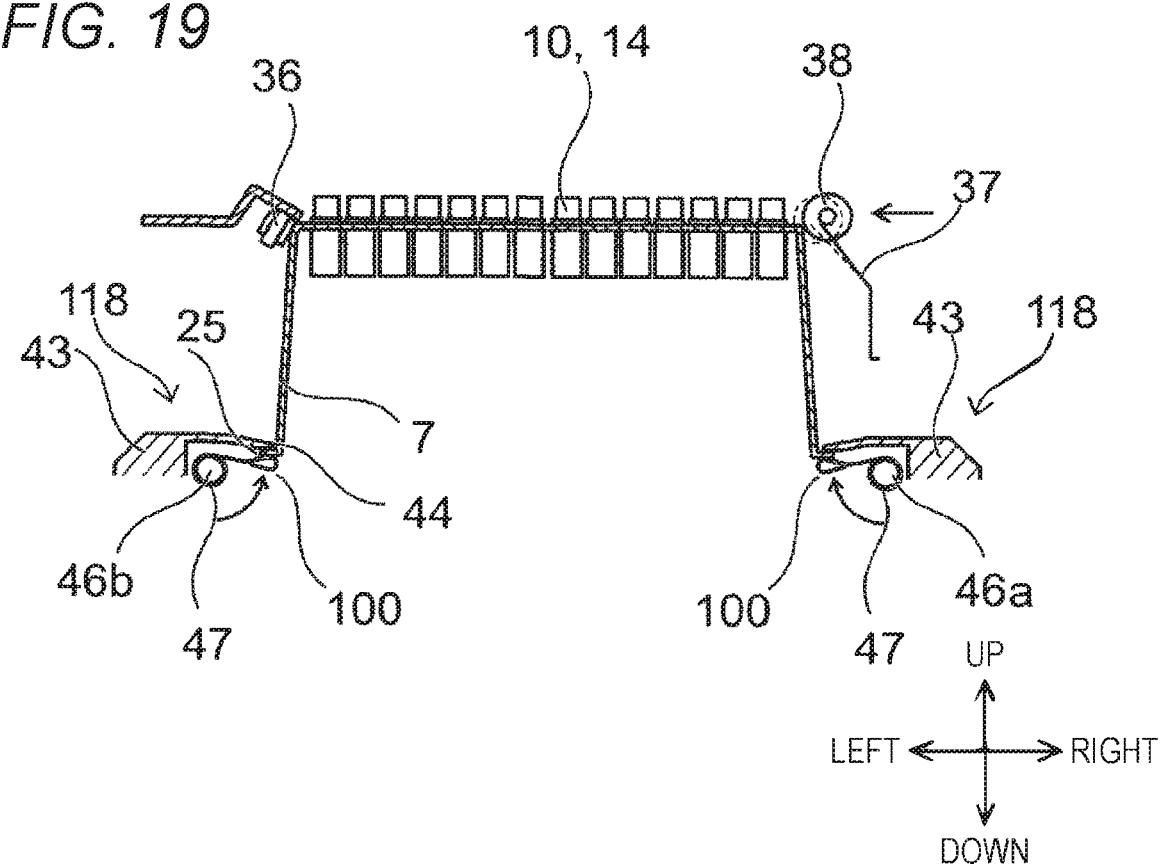
FIG. 19 is a schematic cross-sectional view illustrating the configuration of the tip rack positioning means in the tip rack loading means of the automated analyzing device according to the first embodiment.

FIG. 16 is a rear view of the tip rack loading means 22, illustrating the positioning drive means 45 with the rear plate 32 of the housing hidden. FIGS. 17A and 17B are partial schematic views illustrating the configuration of main parts of a tip rack positioning means 118 which positions the height of the tip rack 7. FIGS. 18 and 19 are perspective views illustrating a configuration in which the tip rack 7 is pressed against the positioning member 43 from below. FIGS. 20A to 20D and FIGS. 21A to 21C illustrate partial cross-sectional views illustrating the operation in which the tip rack 7 comes into contact with the height reference side 44 of the positioning member 43 from below so as to be positioned. FIGS. 22A to 22C are perspective views illustrating the configuration and operation of a cylindrical cam for driving the positioning drive means 45 to perform the positioning operation in conjunction with the opening/closing operation of the drawer 21.

On the upper surface of the pair of left and right guide rails 40, a pair of left and right positioning members 43 and 43 is respectively provided corresponding to the right side and the left side of two tip racks 7 mounted in the longitudinal direction on the tip rack mounting table 24. In the positioning members 43 and 43, the lower side of the tip of the portion extending close to the tip rack 7 is used as the height reference side 44 which comes into contact with the upper surface of the flange portion 25 of the tip rack 7 to position the tip rack 7 at a predetermined height.

A disk-shaped cam plate 85 is rotatably supported around a cylindrical cam center 86 provided along the front-rear direction, and a fifth spindle 87 and a sixth spindle 88 protrude from the outer periphery in a direction away from the cylindrical cam center 86.

A part of the cam plate 85 is a stopper 89 protruding downward, and the rotation angle range of the cam plate 85 is restricted by bringing a stopper receiver 90 into contact with the left end side of the stopper 89 fixed.

A part of the stopper receiver 90 is extended to the opposite side across the center of the rotation cam to form a first spring fulcrum 91.

Another part of the cam plate 85 is a second spring fulcrum 92 protruding outward, and a tensile force when a pulling spring 93 is stretched between the first spring fulcrum 91 and the second spring fulcrum 92 generates a rotational torque to the cam plate 85 in the counterclockwise direction in FIG. 16 around the cylindrical cam center 86 in the figure. A biasing force in a direction where the stopper 89 comes into contact with the stopper receiver 90 by the tensile force of the pulling spring 93.

The pair of left and right positioning drive shafts 46 is disposed so as to pass through the positioning member 43 in the front-rear direction and rotate around a rotation shaft in the front-rear direction.

The vertical height of the positioning drive shaft 46 is disposed at a position slightly lower than the height reference side 44, and the horizontal position of the positioning drive shaft 46 is outside of the outer periphery of the flange portion 25 provided around the lower side of the tip rack 7, and provided on the inside of the left and right plates 29 and 30.

At the rear end of a first positioning drive shaft 46a on the right side, there is provided a third link arm 95 whose one end is rotationally fixed to the first positioning drive shaft 46a and the other end is a seventh spindle 94.

At the rear end of a second positioning drive shaft 46b on the left side, there is provided with a fourth link arm 97 which one end is rotationally fixed to the second positioning drive shaft 46b and the other end is an eighth spindle 96.

One end of a first link arm 98 is rotatably supported on the fifth spindle 87 provided on the cam plate 85, and the other end is rotatably supported to the seventh spindle 94 provided on the third link arm 95.

One end of a second link arm 99 is rotatably supported on the sixth spindle 88 provided on the cam plate 85, and the other end is rotatably supported to the eighth spindle 96 provided on the fourth link arm 97.

When the cam plate 85 rotates around the cylindrical cam center 86, the fifth spindle 87 and the sixth spindle 88 move, and the third link arm 95 rotates through the first link arm 98. The fourth link arm 97 rotates through the second link arm 99.

Next, the configuration of the positioning drive shaft 46, the positioning spring 47, and the positioning member 43 will be described with reference to FIGS. 17A, 17B, and 18.

FIG. 17A is a partially exploded perspective view illustrating the configuration of the positioning drive shaft 46, the positioning spring 47, and the positioning member 43. FIG. 17B is a cross-sectional view taken along line C-C. The positioning spring 47 is a torsion spring provided on the outer periphery of the positioning drive shaft 46 and having a coil portion formed in a cylindrical shape in the front-rear direction. At both ends in the front-rear direction, a pressing portion 100 that comes into contact with the lower surface of the flange portion 25 of the tip rack 7 is extended in a direction approaching the tip rack 7 when the tip rack 7 is completely set. The pressing portion 100 desirably has a shape with a rounded tip portion so as not to be damaged when the tip rack 7 is pressed.

The positioning spring 47 is configured symmetrically in winding direction such that the front side from a locking portion 101 of the center in the front-rear direction is wound right and the rear side is wound left. A positioning spring presser 102 is locked to the positioning drive shaft 46 by a total of three screws at the center and at both ends. A center set screw 104 locks the locking portion 101 of the positioning spring 47 to the positioning drive shaft 46, and the locking portion 101 rotates together with the positioning drive shaft 46.

In the vicinity of both ends of the positioning spring presser 102, pressing portion pressers 103 extending in the direction of the pressing portion 100 are provided. The set screws 104 are provided at both ends on the outer side from the pressing portion presser 103 and are locked to the positioning drive shaft 46.

FIG. 17B is a cross-sectional view taken along line C-C, illustrating a cross section at the position of the pressing portion presser 103. A gap larger than the wire diameter of the positioning spring 47 is provided between the pressing portion presser 103 and the positioning drive shaft 46, and only the torsional displacement of the pressing portion 100 in the arrow direction is allowed by the pressing portion presser 103.

FIG. 18 is an exploded perspective view illustrating the relationship among the positioning drive shaft 46, the positioning spring 47, the positioning member 43, the tip rack 7, the positioning bearing 36, and the positioning facing bearing 38.

FIG. 19 is a cross-sectional view taken along line D-D.

The tip rack 7 is raised through the tip rack mounting table 24, and the height is determined by the upper surface of the flange portion 25 coming into contact with the height reference side 44.

Herein, if the positioning drive shaft 46 rotates so that the pressing portion 100 presses the flange portion 25 of the tip rack 7 from below toward the height reference side 44, the tip rack 7 is separated from the tip rack mounting table 24 upward, and the flange portion 25 comes into contact with the height reference side 44, so that the height of the tip rack 7 can be secured with high accuracy.

Further, when the tip rack 7 is positioned at a predetermined height, the positioning bearing 36 is brought into contact with a positioning V groove 105, which is a V groove provided in two places on the upper left side of the tip rack 7, and is pressurized in advance by the positioning facing bearing 38 supported by the leaf spring 37 from right to left as illustrated in FIG. 19, so that the tip rack 7 can be accurately positioned in the front-rear direction and the left-right direction.

With the positioning configuration as described above, when the drawer 21 is closed and the tip rack 7 is set, the tip rack 7 is separated from the drawer 21 including the tip rack mounting table 24. Therefore, the vibrations from the drawer 21 are not transmitted to the tip rack 7, and the positioning can be made accurately even in the front-rear direction, the left-right direction, and the vertical direction.

Next, the timing of the rising operation of the tip rack 7 and the rotating operation of the positioning spring 47 will be described with reference to FIGS. 20A to 20D, FIGS. 21A to 21C, and FIGS. 22A to 22C.

FIGS. 20A to 20D sequentially illustrate a procedure that the flange portion 25 of the tip rack 7 is brought into contact with the height reference side 44 through the pressing portion 100 as the positioning drive shaft 46 rotates while the tip rack is raised to approach the height reference side 44 in conjunction with the closing operation of the drawer 21, and are enlarged views of the vicinity of the left side of the positioning drive shaft 46 in FIG. 19.

Figure 20A:
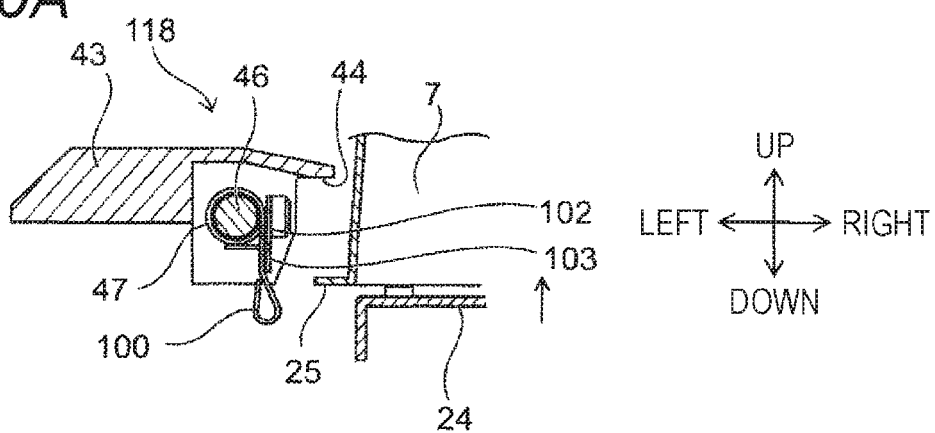
FIG. 20A is a partial cross-sectional view illustrating the operation of the tip rack positioning means in the tip rack loading means of the automated analyzing device according to the first embodiment.

In FIG. 20A, the tip rack 7 is in the middle of being raised in conjunction with the closing operation of the drawer 21, and the positioning drive shaft 46 is at a position rotated so that the pressing portion 100 of the positioning spring 47 faces substantially downward. This state may be referred to as "retracted position" or "retracted state". The flange portion 25 rises up to a position higher than the lower end of the pressing portion 100.

In the section where the drawer 21 is opened and the tip rack 7 is lowered, the positioning spring 47 remains in the "retracted state" until the drawer 21 reaches the fully open position.

Figure 20B:
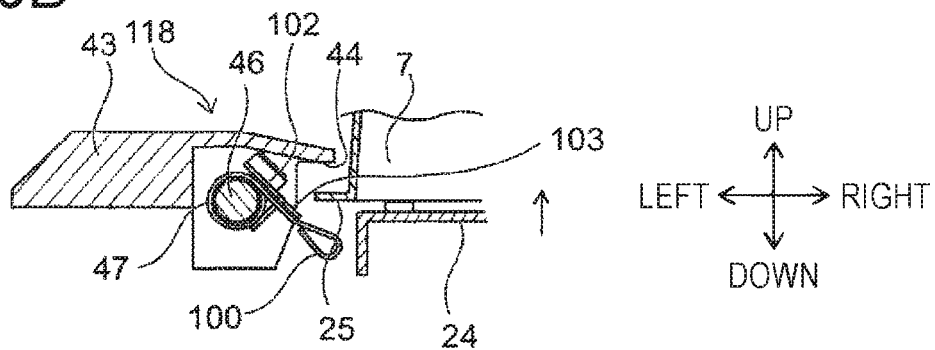
FIG. 20B is a partial cross-sectional view illustrating the operation of the tip rack positioning means in the tip rack loading means of the automated analyzing device according to the first embodiment.

In FIG. 20B, the tip rack 7 further rises, and the height of the flange portion 25 is approximately at the position of the central axis of the positioning drive shaft 46. At this time, the positioning drive shaft 46 is rotating in the direction in which the pressing portion 100 approaches the flange portion 25 from the lower side. This state may be referred to as a "rotation state".

Figure 20C:
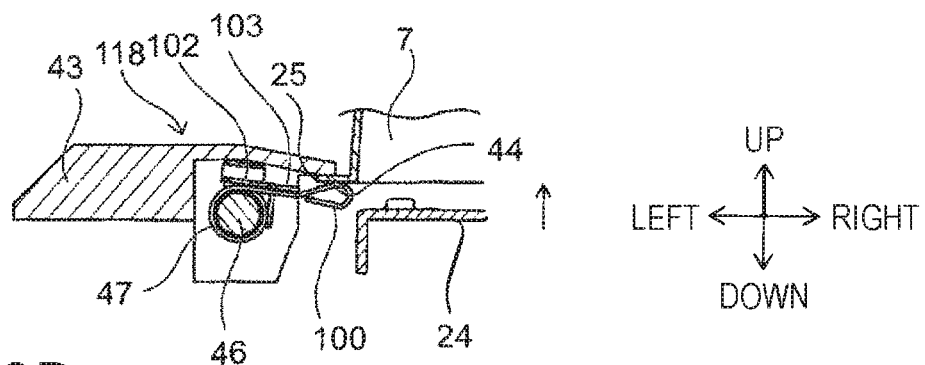
FIG. 20C is a partial cross-sectional view illustrating the operation of the tip rack positioning means in the tip rack loading means of the automated analyzing device according to the first embodiment.

In FIG. 20C, the positioning drive shaft 46 further rotates so that the pressing portion 100 comes into contact with the lower surface of the flange portion 25 to lift the tip rack 7 up, and the tip rack 7 is separated from the tip rack mounting table 24, and the upper surface of the flange portion 25 comes into contact with the height reference side 44 of the positioning member 43, and the tip rack 7 is set to a predetermined height. In other words, the predetermined height is a position higher than the position where the tip rack 7 rises by the maximum $h_{max}$.

Figure 20D:
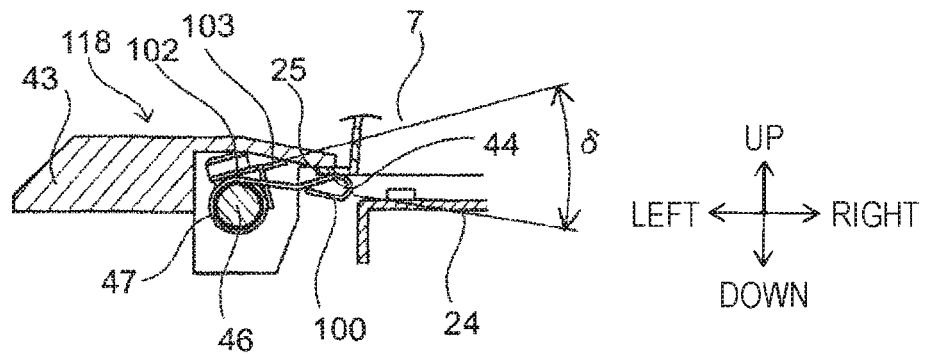
FIG. 20D is a partial cross-sectional view illustrating the operation of the tip rack positioning means in the tip rack loading means of the automated analyzing device according to the first embodiment.

In FIG. 20D, when the positioning drive shaft 46 further rotates by an angle δ, the torsional displacement of the positioning spring 47 increases by that angle, and the force with which the pressing portion 100 presses the flange portion 25 from the lower side increases, so that the tip rack 7 can be securely positioned. This state may be referred to as "positioning position" or "positioning state".

The operation when the drawer 21 is opened and the tip rack 7 is taken out is performed in reverse to the above, and the positioning drive shaft 46 rotates in the order of FIGS. 20D, 20C, 20B, and 20A, and the pressing portion 100 is lowered from the flange portion. At the same time, the tip rack 7 is lowered.

Next, the configuration of the positioning drive means 45 interlocked with the closing operation of the drawer 21 will be described with reference to FIGS. 21A to 21C.

Figure 21A:
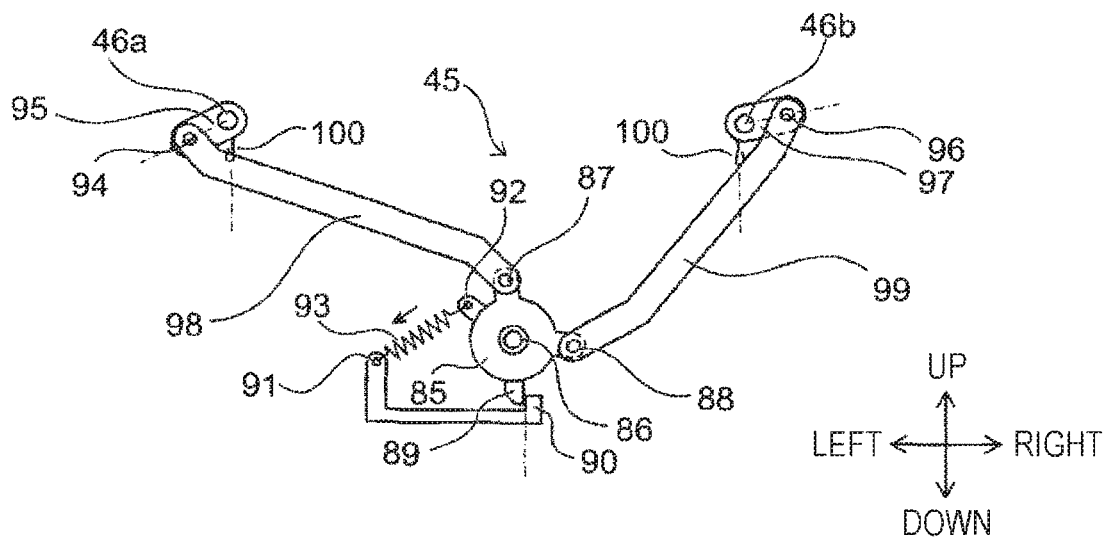
FIG. 21A is a schematic diagram illustrating the configuration and operation of the tip rack positioning means in the tip rack loading means of the automated analyzing device according to the first embodiment.
Figure 22A:
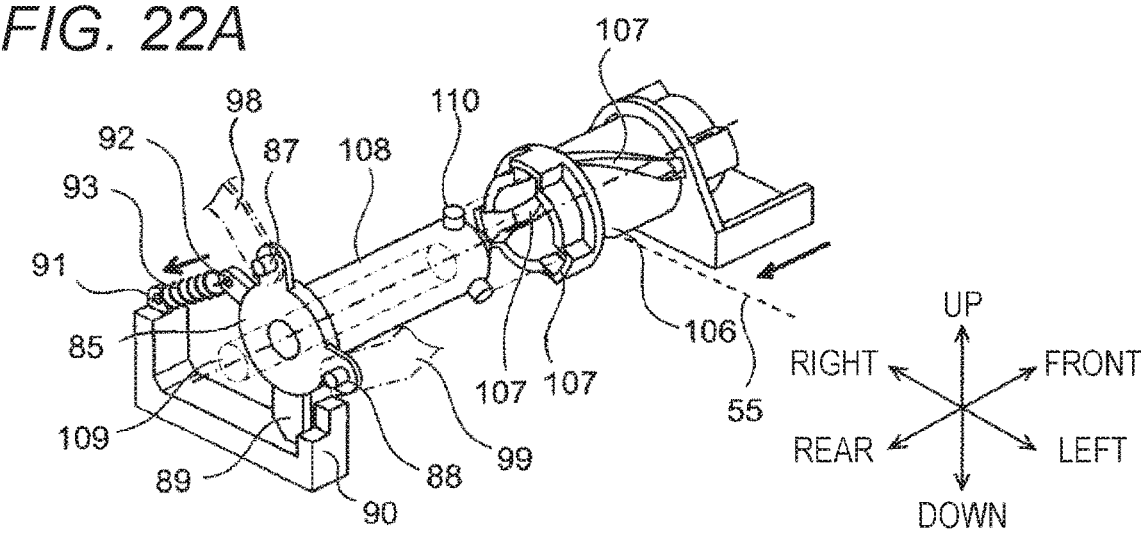
FIG. 22A is a perspective view illustrating the configuration of a rotation cam and the operation of the rotation cam when the drawer is closed in the tip rack loading means of the automated analyzing device according to the first embodiment.
Figure 22B:
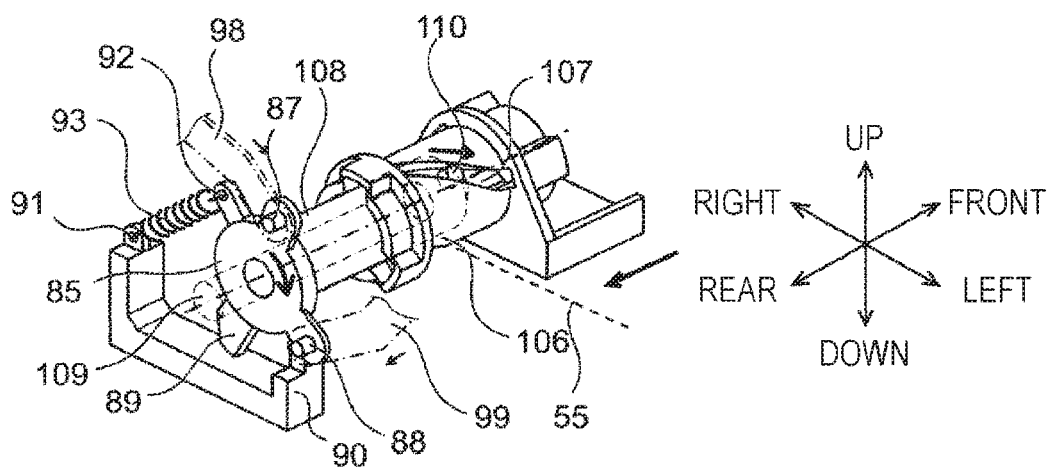
FIG. 22B is a perspective view illustrating the configuration of the rotation cam and the operation of the rotation cam when the drawer is closed in the tip rack loading means of the automated analyzing device according to the first embodiment.
Figure 22C:
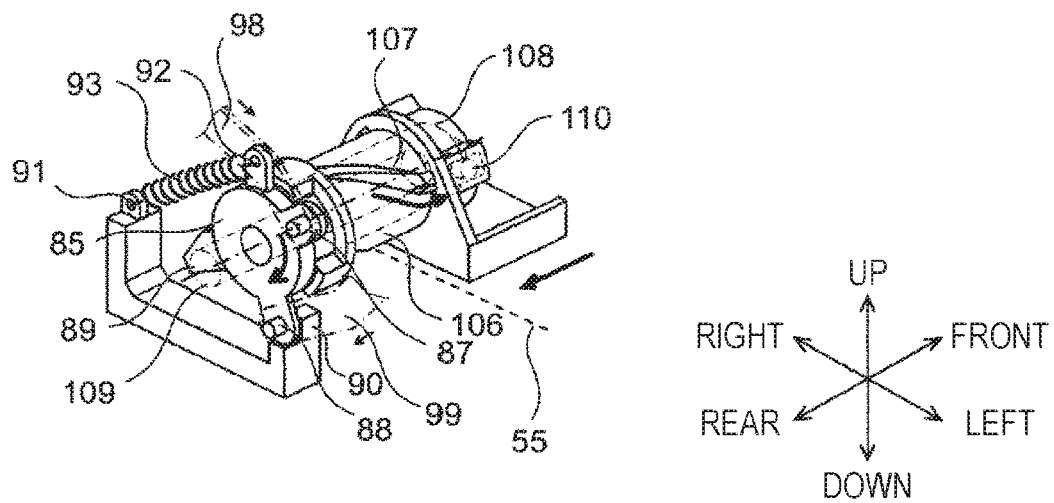
FIG. 22C is a perspective view illustrating the configuration of the rotation cam and the operation of the rotation cam when the drawer is closed in the tip rack loading means of the automated analyzing device according to the first embodiment.

FIG. 21A illustrates a state in which the cam plate 85 fully rotates counterclockwise by the tensile force of the pulling spring 93 and the stopper 89 is in contact with the stopper receiver 90. At this time, the positioning drive shaft 46 and the positioning spring 47 are in the "retracted state" illustrated in FIG. 20A.

In the section where the drawer 21 is opened and the tip rack 7 is lowered, the positioning spring 47 remains in the "retracted state" until the drawer 21 reaches the fully open position.

Figure 21B:
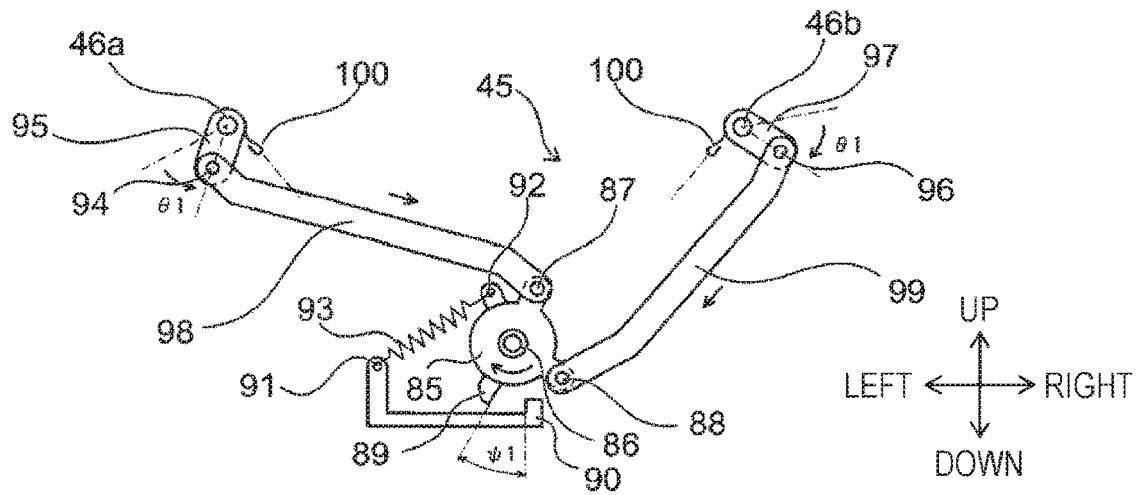
FIG. 21B is a schematic diagram illustrating the configuration and operation of the tip rack positioning means in the tip rack loading means of the automated analyzing device according to the first embodiment.

FIG. 21B illustrates a state in which the cam plate 85 rotates clockwise by ψ1 in the figure against the rotational torque due to the tensile force of the pulling spring 93 in conjunction with the closing operation of the drawer 21.

Since the fifth spindle 87 and the sixth spindle 88 rotate together with the cam plate 85, and the first link arm 98 and the second link arm 99 move in the arrow direction, the third link arm 95 and the first positioning drive shaft 46a rotate by θ1 in the arrow direction through the seventh spindle 94. At the same time, the fourth link arm 97 and the second positioning drive shaft 46b rotate by θ1 in an arrow direction opposite to the first positioning drive shaft 46a through the eighth spindle 96.

In other words, the pressing portions 100 and 100 rotate by 81 so as to approach each other from below with respect to the lower surface of the flange portion 25 of the tip rack 7, which is the "rotation state" illustrated in FIG. 20B.

Figure 21C:
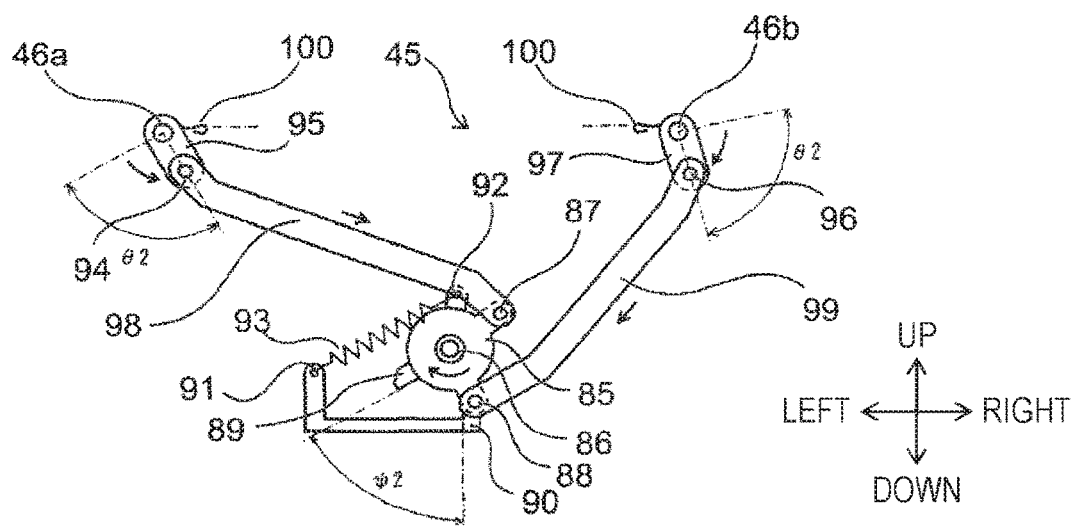
FIG. 21C is a schematic diagram illustrating the configuration and operation of the tip rack positioning means in the tip rack loading means of the automated analyzing device according to the first embodiment.

FIG. 21C illustrates a state in which the cam plate 85 further rotates clockwise by ψ2, which is a maximum rotation angle, in the figure. Herein, the first positioning drive shaft 46a and the second positioning drive shaft 46b each rotate by θ2, and the pressing portions 100 and 100 rotate to press the lower surface of the flange portion 25 of the tip rack 7 by θ2 from below, which is "positioning state" illustrated in FIG. 20D. Herein, the positional relationship between the fifth spindle 87 and the seventh spindle 94, and the positional relationship between the sixth spindle 88 and the eighth spindle 96 are set appropriately, for example, ψ2≈60° and θ2≈90°.

Next, the configuration for appropriately rotating the cam plate 85 in conjunction with the closing operation of the drawer 21 will be described with reference to FIGS. 22A to 22C, and also FIGS. 21A to 21C and FIGS. 20A to 20D.

In the operation of closing the drawer 21, it is desirable that the positioning drive shaft 46 does not rotate but maintains the "retracted state", and the cam plate 85 does not rotate at the position illustrated in FIG. 21A until the drawer is almost closed up to the position of FIG. 12A from the fully open position up to the closed position about 40 mm, and the lower surface of the flange portion 25 of the tip rack 7 is raised to a position higher than the pressing portion 100 in the "retracted state" illustrated in FIG. 20A.

When the closing operation of the drawer 21 is continued and the opening amount is reduced to 40 mm or less, the cam plate 85 rotates in an arrow direction illustrated in FIGS. 21B to 21C, and the pressing portion 100 passes through the "rotation state" and enters "positioning state".

In other words, while the opening amount of the drawer 21 from the closed position to the fully open position is, for example, about 400 mm to 500 mm, the range in which the cam plate 85 rotates is limited to the range of about 40 mm near the closed position.

In this way, an example of a configuration in which the cam plate 85 is rotationally driven only within a limited range of the operation range of the drawer 21 will be described with reference to FIGS. 22A to 22C together with FIGS. 7 and 8 appropriately.

FIGS. 22A to 22C, a hollow cylindrical cam 106 that is cylindrically extended coaxially with the cam plate 85 is fixed in the vicinity of the rear end of the drawer base 55, and moves in the front-rear direction along with the opening/closing operation of the drawer 21. The cylindrical surface of the cylindrical cam 106 is provided with a plurality of spiral grooves 107 penetrating the inner periphery and the outer periphery along the cylindrical surface. The spiral groove 107 is twisted by a predetermined angle between the front end and the rear end of the cylindrical cam 106. This predetermined angle is equal to the rotation angle of the cam plate described in FIGS. 21A to 21C, that is ψ2, and, for example, about 60°.

A rotation cam 108 extending cylindrically from the cam plate 85 toward the front side is integrated with the cam plate 85 so as to be rotatably supported around a rotation cam shaft 109 coaxial with the cylindrical cam center 86. In the vicinity of the tip close to the cylindrical cam 106 of the rotation cam 108, a plurality of cylindrical cam pins 110 projecting radially from the cylindrical surface of the rotation cam 108 are provided. In this embodiment, as an example, three cam pins 110 are provided at an angle of 120°, and each cam pin 110 is configured to be fitted and slid into the spiral groove 107 provided in the cylindrical cam 106.

In the range where the drawer 21 is from the fully open position to a position where the opening amount is close to about 40 mm in the vicinity of the fully closed position, the cylindrical cam 106 and the rotation cam 108 are separated from each other. As illustrated in FIGS. 22A and 21A, in the cam plate 85, the stopper 89 comes into contact with the stopper receiver 90 by a rotational torque generated by the tensile force of the pulling spring 93, and the positioning spring 47 maintains the "retracted state".

When the drawer 21 is further closed and the opening amount becomes smaller than 40 mm, the spiral groove 107 provided in the cylindrical cam 106 is fitted with the cam pin 110 provided in the rotation cam 108. When the drawer 21 further moves backward, the cam pin 110 moves along the spiral groove 107, so that the rotation cam 108 rotates around the rotation cam shaft 109. Since the cam plate 85 rotates together with the rotation cam 108, the positioning drive shaft 46 rotates as illustrated in FIG. 21B, and the pressing portion 100 approaches the lower surface of the flange portion 25 of the tip rack 7 from below as illustrated in FIG. 20B.

When the drawer 21 reaches the fully closed position, the rotation cam 108 is inserted into the cylindrical cam 106, and the cam pin 110 is slid to the vicinity of the front end of the spiral groove 107. The rotation cam 108 provided with the cam pin 110 rotates around the rotation cam shaft 109 by a twist angle of the spiral groove 107 by ψ2≈60°.

In other words, the cam pin 110 provided in the rotation cam 108 slides along the spiral groove 107 provided in the cylindrical cam 106, whereby the rotation cam 108 and the cam plate 85 rotate. Accordingly, if the longitudinal lengths of the cylindrical cam 106 and the rotation cam 108 are increased, the opening amount of the drawer 21 at which the rotation cam 108 starts to rotate can be increased. Alternatively, if the twist angle of the spiral groove 107 provided in the cylindrical cam 106 is increased, the rotation angle φ2 of the rotation cam 108 can be increased.

However, if the twist angle of the spiral groove 107 is excessively large, the rotation cam 108 is to rotate suddenly, the pressure contact force generated between the spiral groove 107 and the cam pin 110 increases, the frictional force increases, and the rotation cam 108 is hard to rotate smoothly. Therefore, the twist angle is, for example, 45° or less, desirably 35° or less.

Since the positioning drive means 45 is disposed between the rear surface of the housing 33 and the rear surface of the drawer 21, the user does not accidentally touch the positioning drive means 45 so as to increase safety.

Figure 23:
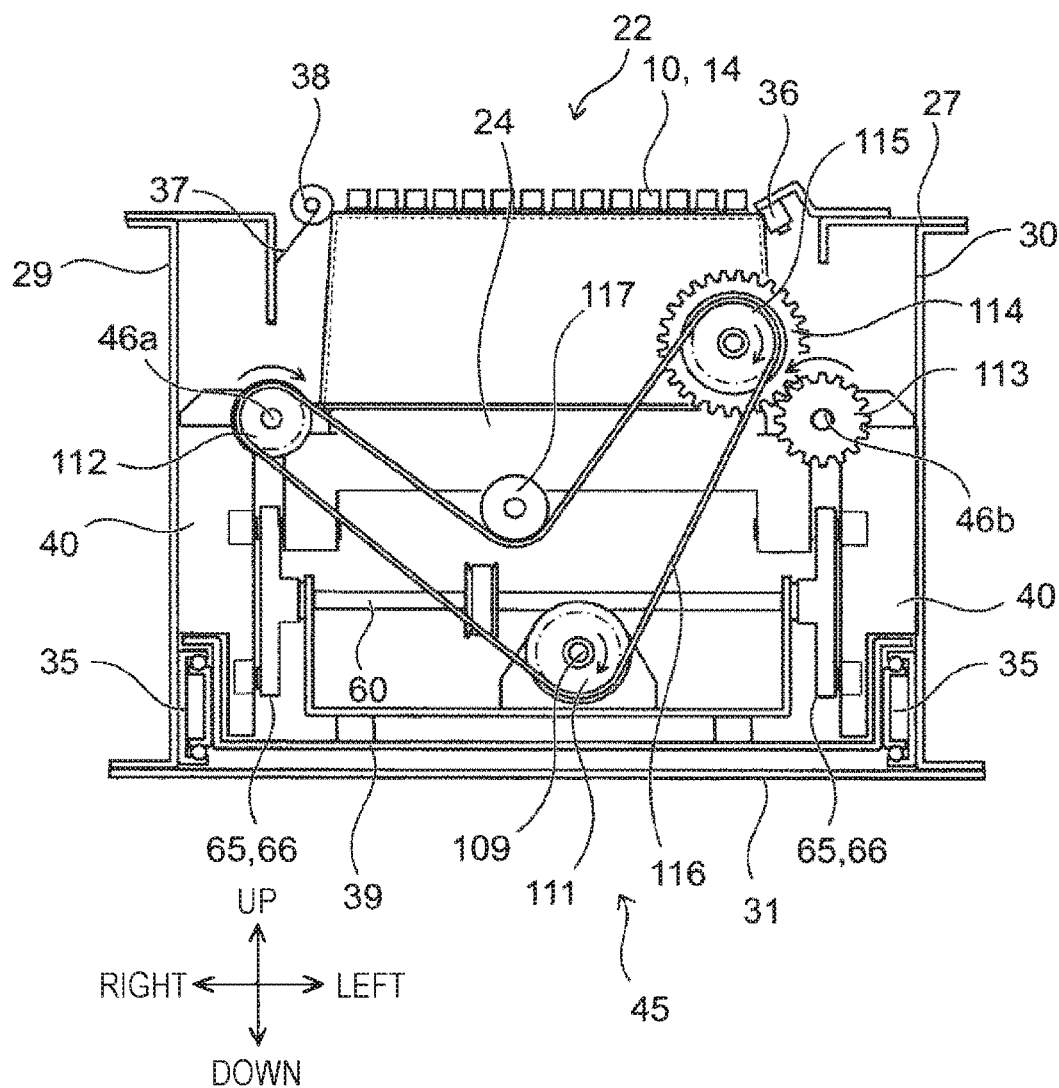
FIG. 23 is a rear view of a tip rack loading means in an automated analyzing device according to a second embodiment.

Next, a second embodiment will be described with reference to FIG. 23. FIG. 23 is a rear view of the tip rack loading means 22 in the second embodiment.

The second embodiment differs from the first embodiment in that the positioning drive means 45 is provided with a first toothed pulley 111 instead of the cam plate 85 that rotates together with the rotation cam 108. A second toothed pulley 112 is provided in the first positioning drive shaft 46a, and a second gear 113 is provided in the second positioning drive shaft 46b instead of the third link arm 95 and fourth link arm 97 that rotate the positioning drive shafts 46a and 46b.

The second embodiment further provides a first gear 114 that meshes with the second gear 113, a third toothed pulley 115 that rotates integrally with the first gear 114, a toothed belt 116 that is stretched to the first toothed pulley 111, the second toothed pulley 112, and the third toothed pulley 115, and a rotatable idler 117 that applies an appropriate tension to the toothed belt 116. When the rotation cam 108 rotates, the second toothed pulley 112 rotates in the same direction to rotate the first positioning drive shaft 46a, and the third toothed pulley 115 also rotates in the same direction as the rotation cam 108. Since the second gear 113 rotates in the direction opposite to the first gear 114, the first gear 114 rotates in the direction opposite to the rotation cam 108, and as a result, the second positioning drive shaft 46b rotates in the direction opposite to the first positioning drive shaft 46a.

The rotation angle of the positioning drive shaft 46 with respect to the rotation angle of the rotation cam 108 can be obtained by appropriately setting the number of teeth of the toothed pulleys 111, 112, and 115 and the number of teeth of the gears 113 and 114.

Figure 24:
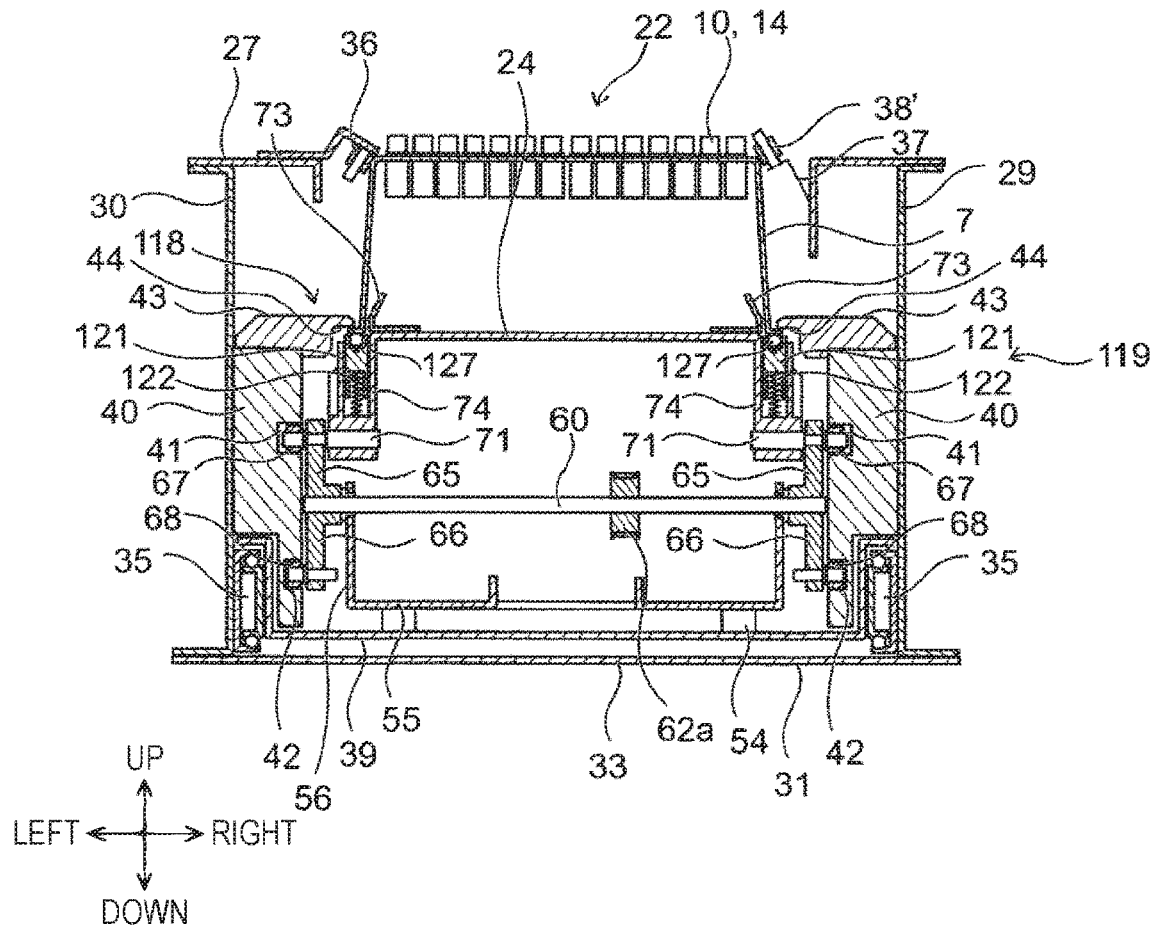
FIG. 24 is a cross-sectional view taken along line B-B of a tip rack loading means in an automated analyzing device according to a third embodiment.
Figure 25A:
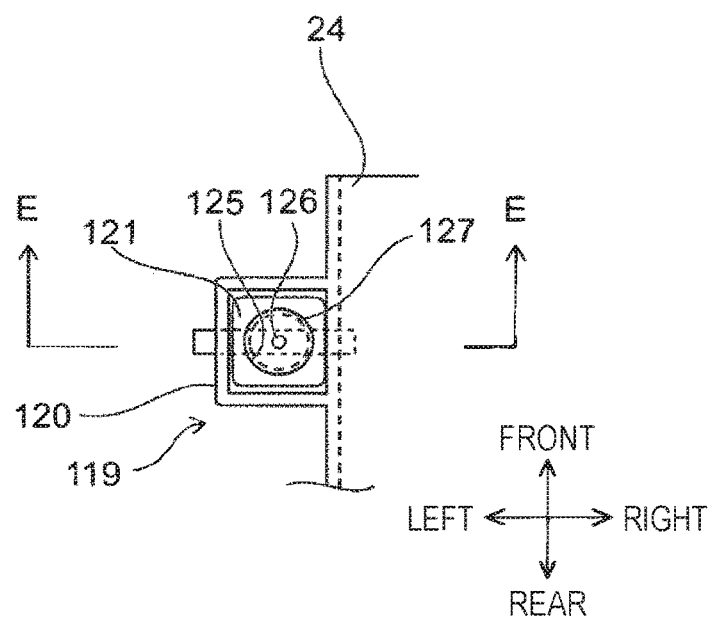
FIG. 25A is a top view illustrating the configuration of a tip rack pressing means in the automated analyzing device according to the third embodiment.
Figure 25B:
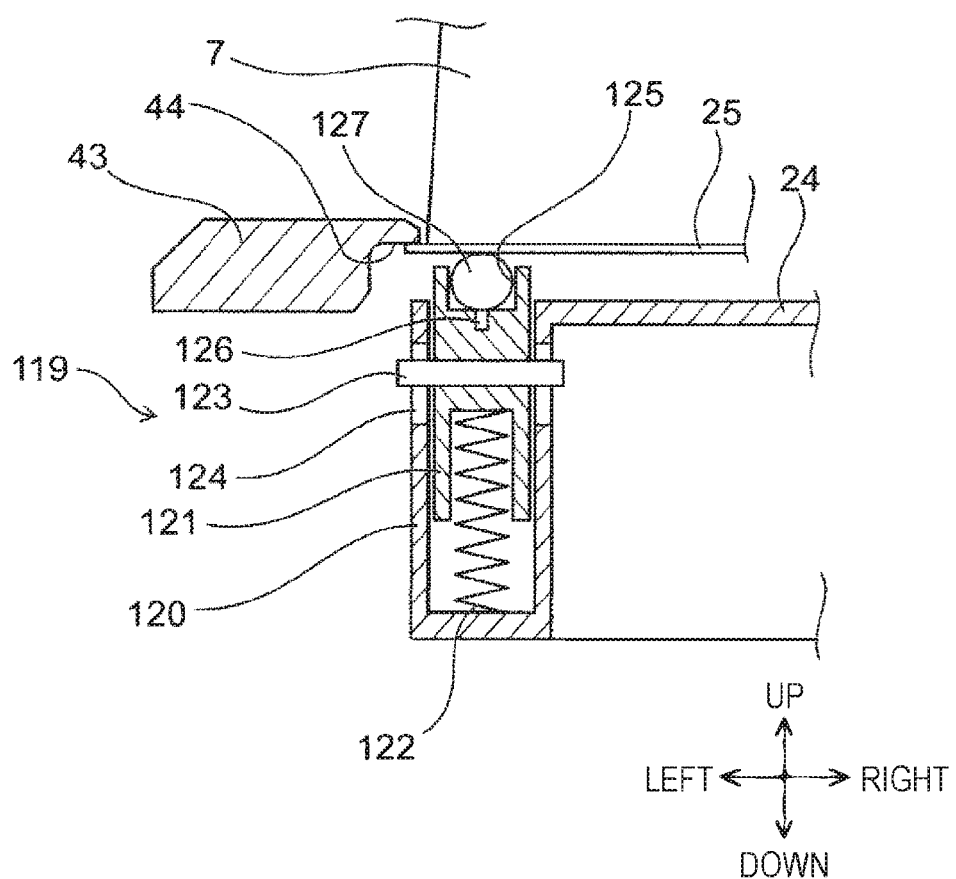
FIG. 25B is a cross-sectional view taken along line E-E illustrating the configuration of the tip rack pressing means in the automated analyzing device according to the third embodiment.

Next, a third embodiment will be described with reference to FIGS. 24, 25A, and 25B. FIG. 24 is a cross-sectional view taken along line B-B similar to FIG. 8 of the tip rack loading means 22 in the third embodiment, FIG. 25A is a top view illustrating the configuration of a tip rack pressing means, and FIG. 25B is a cross-sectional view taken along line E-E.

The third embodiment differs from the first embodiment in that the positioning drive means 45, the positioning drive shaft 46, and the positioning spring 47 are not provided, while a tip rack pressing means 119 (rising means) is provided in the tip rack mounting table 24 to press the tip rack 7 from below to above.

The tip rack pressing means 119 is disposed at a position where the tip rack pressing means 119 comes into contact with the four corners of the lower surface of the tip rack 7 from below, and the tip rack mounting table 24 includes a bottomed frame portion 120 having an open upper surface. Further, a pressing member 121 is supported inside the frame portion 120 so as to be movable in the vertical direction with an appropriate gap. For example, a biasing member 122, which is a compression spring, for example, biases the pressing member 121 from below to above. A pin 123 penetrates and is fixed to the pressing member 121 in the front-rear direction. The pin 123 penetrates a long groove 124 provided in the frame portion 120 in the vertical direction with a gap. The pressing member 121 is configured to move in the vertical direction in a movable range of the pin 123 along the groove 124. Therefore, the pressing member 121 is positioned in a state in which the pin 123 is in contact with the upper end of the groove 124.

A bottomed outer peripheral hole 125 is provided on the upper surface of the pressing member 121, and a central hole 126 having a diameter of, for example, about 1 mm is formed concentrically with the outer peripheral hole 125 on the bottom surface of the outer peripheral hole 125. A pressing ball 127 having a diameter smaller than a diameter of the outer peripheral hole 125 is loosely inserted into the outer peripheral hole 125, and is stably mounted in the edge of the central hole 126 at a concentric position with an appropriate gap of, for example, about 0.5 mm to 1 mm around the outer peripheral hole 125. The pressing ball 127 can roll within the gap with the outer peripheral hole 125 if it receives an external force, but moves so as to be mounted on the edge of the central hole 126 if no external force is applied so as to return to the concentric position with respect to the outer peripheral hole 125.

Further, a stopper (not illustrated) for preventing pulling out may be provided on the upper edge of the outer peripheral hole 125 so that the pressing ball 127 does not jump out.

The upward biasing force by the biasing member 122 is set to be larger than the weight of the tip rack 7. In other words, even if the tip rack mounting table 24 is pulled out and the tip rack 7 is mounted on the upper surface of the pressing ball 127 along the tip rack guide 73, the pin 123 remains at the highest position while being in contact with the upper end of the groove 124.

Next, when the tip rack 7 is raised by performing a series of the closing operations of the drawer as described in FIGS. 10A to 10C, FIGS. 11A to 11C, and FIGS. 12A to 12C, there is satisfied a positional relationship such that the upper surface of the flange portion 25 of the tip rack 7 comes into contact with the reference side 44 of the positioning member 43 from the lower side at a position lower by, for example, about 1 mm before reaching the apex position where the tip rack mounting table 24 illustrated in FIG. 12B rises highest.

In other words, in a state where the drawer is closed as illustrated in FIG. 12C, the upper surface of the flange portion 25 of the tip rack 7 comes into contact with the reference side 44 of the positioning member 43 from the lower side and is positioned as illustrated in FIGS. 24 to 25B. Then, the tip rack mounting table 24 further rises by, for example, about 1 mm so that the biasing member 122 is compressed and the pin 123 is separated from the upper end of the groove 124. In other words, the flange portion 25 of the tip rack 7 maintains the state of being in contact with the positioning member 43 upward through the pressing member 121 and the pressing ball 127 by the biasing force of the biasing member 122. Therefore, even if an error occurs in the height of the tip rack mounting table 24 in a state where the drawer is closed, it can be positioned with high accuracy since the tip rack 7 is in contact with the positioning member 43.

The pressing ball 127 is located at a position with an appropriate gap of, for example, about 0.5 mm to 1 mm from the outer peripheral hole 125, and the tip rack 7 is configured to be mounted on the pressing ball 127 at the four corners of the flange portion 25. The tip rack 7 is configured to be freely movable in the horizontal direction by minute rolling friction within a range where the pressing ball 127 rolls and moves within the range of the gap with the outer peripheral hole 125. The amount of movement of the tip rack 7 is equal to the amount of movement of the upper surface of the pressing ball 127 and is twice the amount of movement at the center of the pressing ball 127, and is twice the outer peripheral gap between the outer peripheral hole 125 and the pressing ball 127. Therefore, the tip rack 7 is movable to an extent of, for example, 1 mm to 2 mm.

On the other hand, if the tip rack 7 is removed after the drawer is pulled out, the pressing ball 127 rolls and is mounted on the edge of the central hole 126 and returns to the concentric position with the outer peripheral hole 125.

In a state where the drawer is closed and the tip rack 7 is biased to the height reference side 44 of the positioning member 43 by the tip rack pressing means 119, the tip rack 7 is positioned by the positioning bearing 36. Herein, for example, when vibration is applied to the door 34 from the outside and the vibration is transmitted to the tip rack mounting table 24, there is a gap between the tip rack mounting table 24 and the frame portion 120 integrated with the pressing member 121. In addition, since the pressing ball 127 is configured to roll between the bottom surface of the flange portion 25 of the tip rack 7 and the bottom surface of the outer peripheral hole 125 of the pressing member 121, the vibration is not transmitted from the tip rack mounting table 24 to the tip rack 7, nor is an external force transmitted to the tip rack 7, so that the tip rack 7 can be positioned stably and with high accuracy.

Further, the difference from the first embodiment is that the rotation axis direction of a positioning facing bearing 38' is provided not in the front-rear direction but substantially in the vertical direction in the same manner as the positioning bearing 36. Therefore, the positioning facing bearing 38' is inclined to approach the tip rack 7 as it goes upward and also the axis of the bearing is extended in the axial direction, so that the positioning facing bearing 38' is disposed to be movable along the axis. Further, the positioning bearing 36 is also disposed so as to be movable along the axis by extending the axis of the bearing in the axial direction.

Since the positioning bearings 36 and 38' are disposed so as to be movable along the axis in this way, after the upper side of the tip rack 7 comes into contact with the positioning bearing 36 or the positioning facing bearing 38', the positioning bearing 36 or the positioning facing bearing 38' can rotate freely in the front-rear direction of the tip rack 7 while rising along the axis until the tip rack 7 comes into contact with the positioning member 43 and rises. Therefore, the frictional resistance in the vertical direction and the front-rear direction of the tip rack 7 is minute. As described above, even if the tip rack 7 moves in the horizontal direction, the pressing ball 127 rolls, and thus the frictional resistance received by the tip rack 7 is minute, and it is possible to make positioning accurately with respect to the positioning bearing 36 fixed at a predetermined position.

In this embodiment, the pressing member 121 moves in the vertical direction, and the biasing member 122 is a compression spring. However, the present invention is not limited to such a configuration, and the pressing member may be an oscillating arm which includes a rotation spindle at one end. The biasing member may be a torsion spring which is provided around the spindle. Further, the pressing ball 125 may be formed integrally with the pressing member 121, and may be molded from a low friction resin material such as a polyacetal resin or a fluorine resin, or may be a combination thereof.

Figure 26:
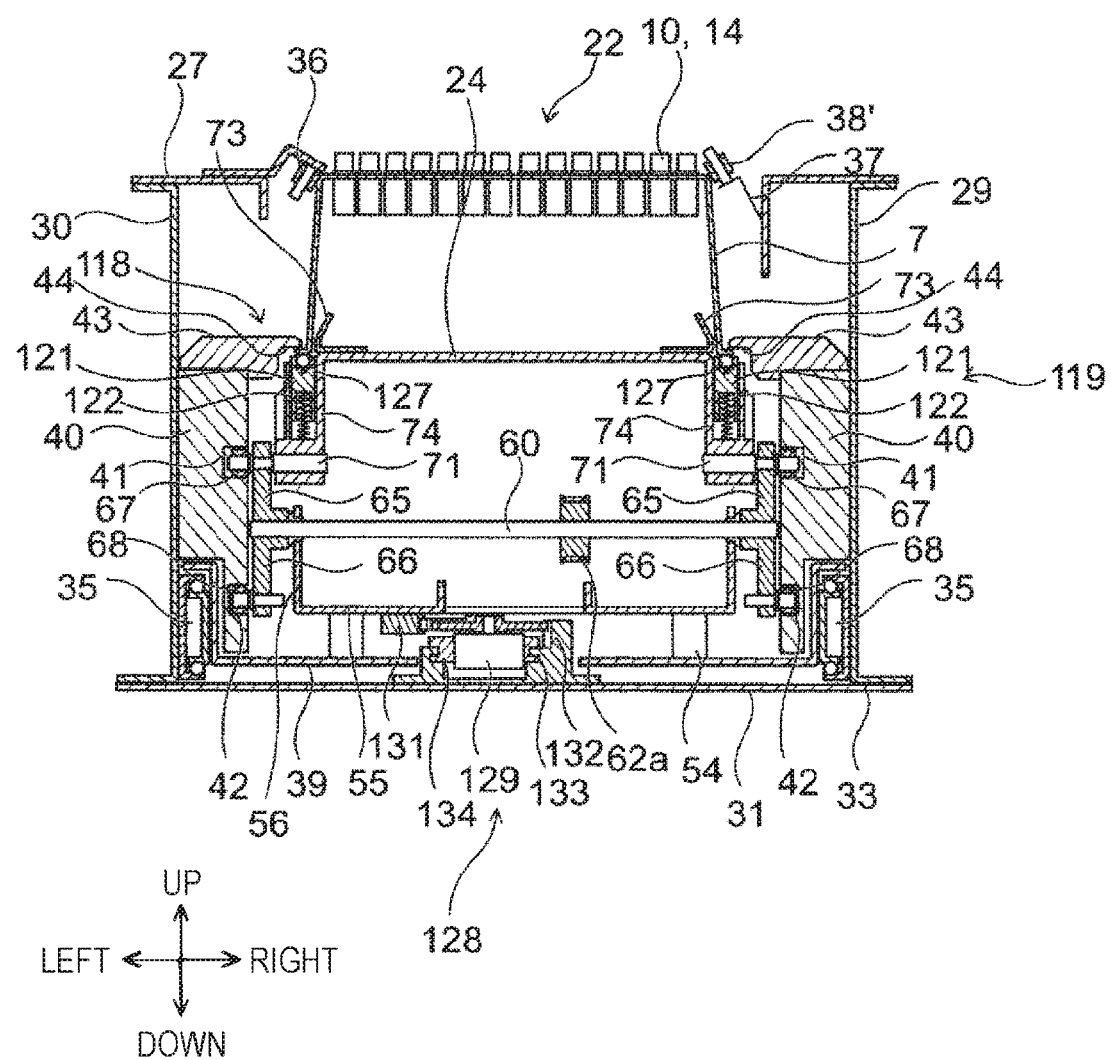
FIG. 26 is a cross-sectional view taken along line B-B of a tip rack loading means in an automated analyzing device according to a fourth embodiment.
Figure 27:
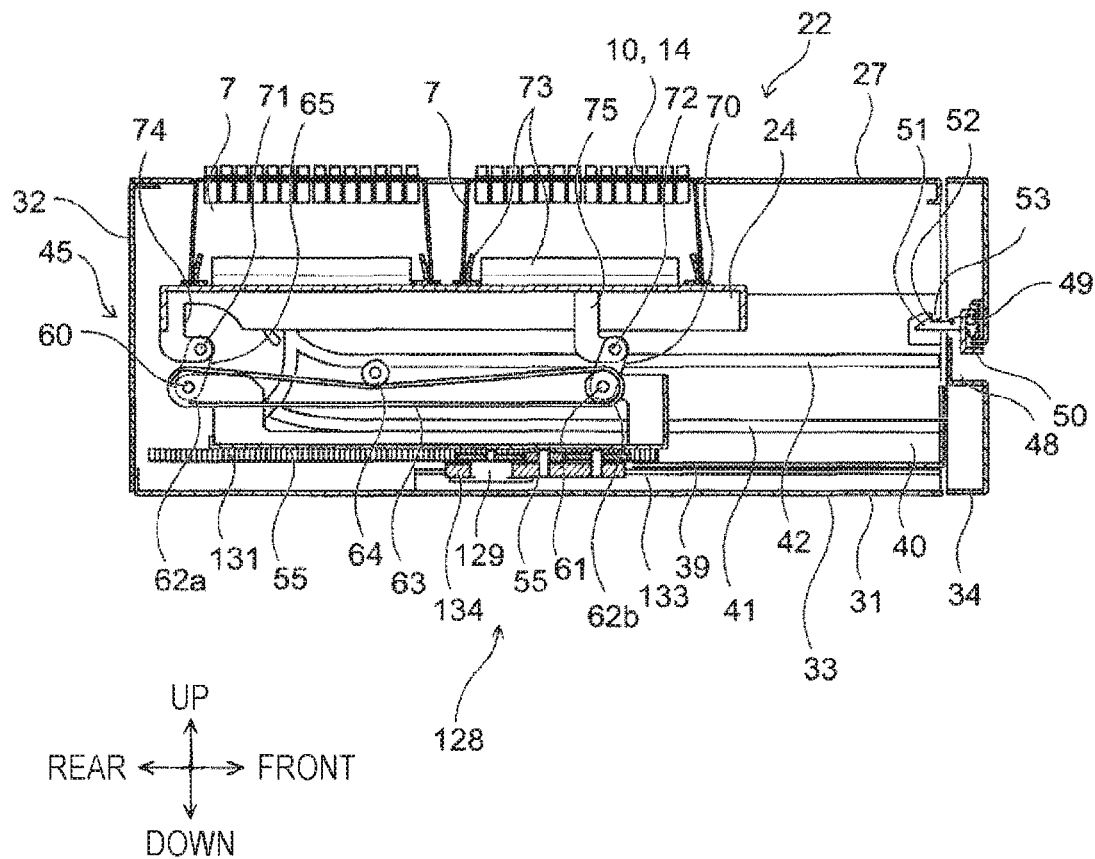
FIG. 27 is a cross-sectional view taken along line A-A of the tip rack loading means in the automated analyzing device according to the fourth embodiment.
Figure 28A:
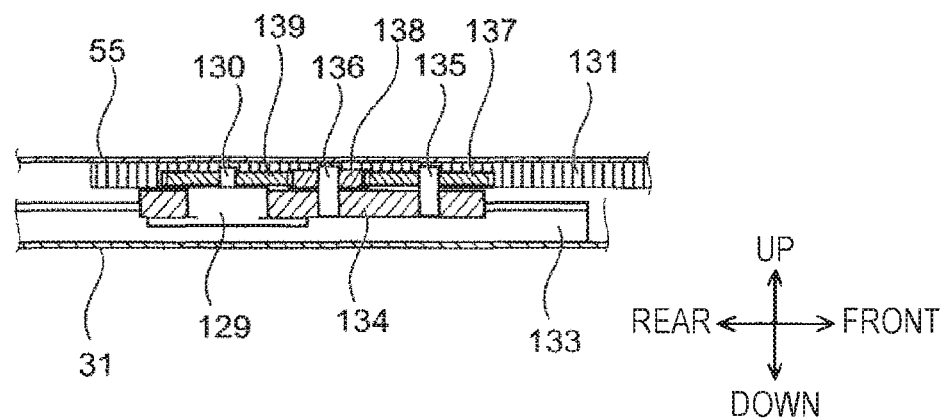
FIG. 28A is a cross-sectional view taken along line F-F illustrating the configuration of a deceleration means in the tip rack loading means of the automated analyzing device according to the fourth embodiment.
Figure 28B:
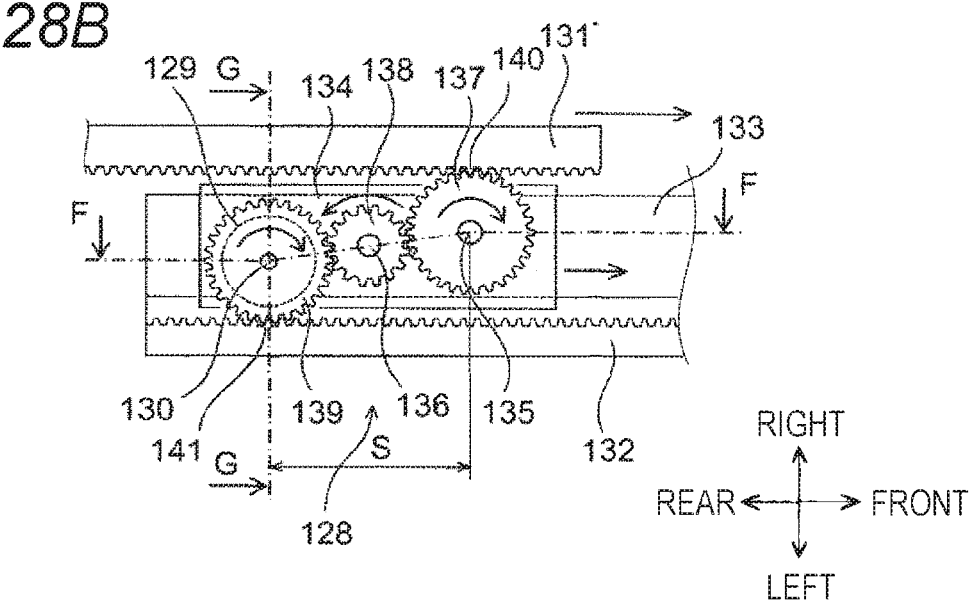
FIG. 28B is a plan view illustrating the configuration of the deceleration means in the tip rack loading means of the automated analyzing device according to the fourth embodiment.
Figure 28C:
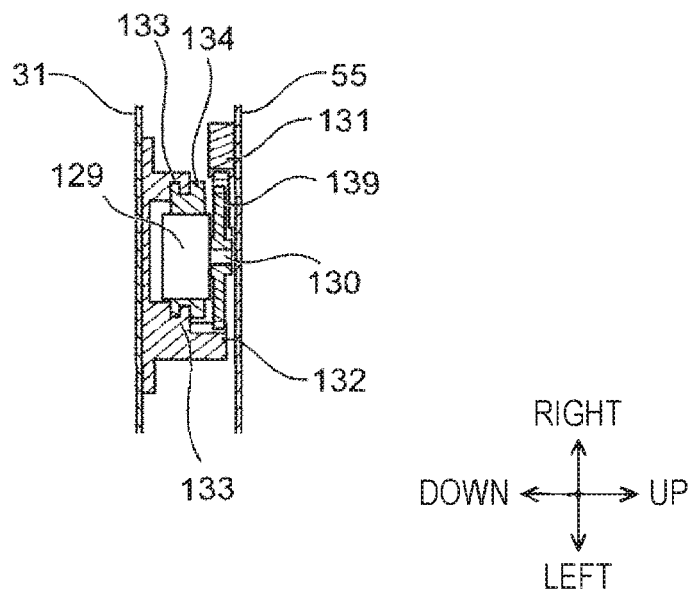
FIG. 28C is a cross-sectional view taken along line G-G illustrating the configuration of the deceleration means in the tip rack loading means of the automated analyzing device according to the fourth embodiment.
Figure 29A:
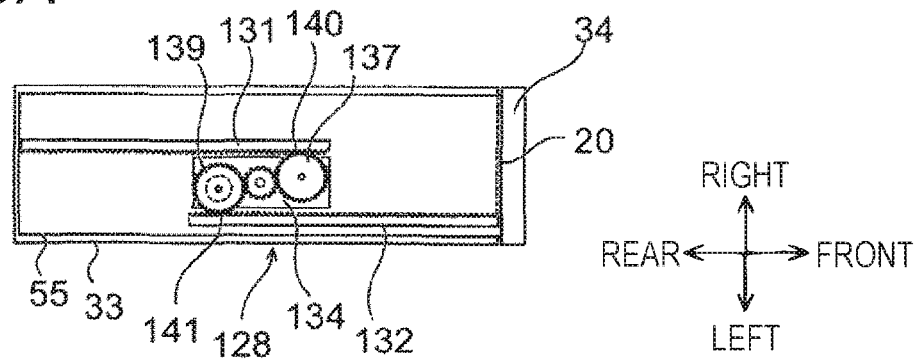
FIG. 29A is a schematic plan view of the tip rack loading means of the automated analyzing device according to the fourth embodiment (fully closed state).
Figure 29B:
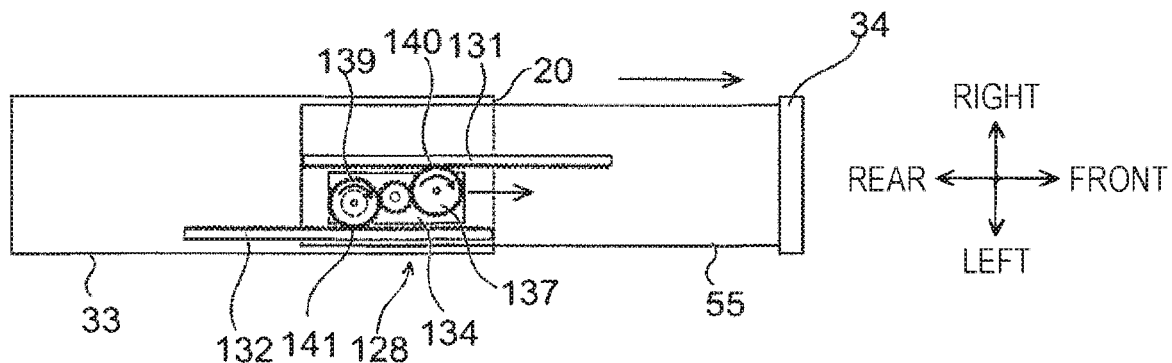
FIG. 29B is a schematic plan view of the tip rack loading means of the automated analyzing device according to the fourth embodiment (a state in the middle of opening and closing).
Figure 29C:
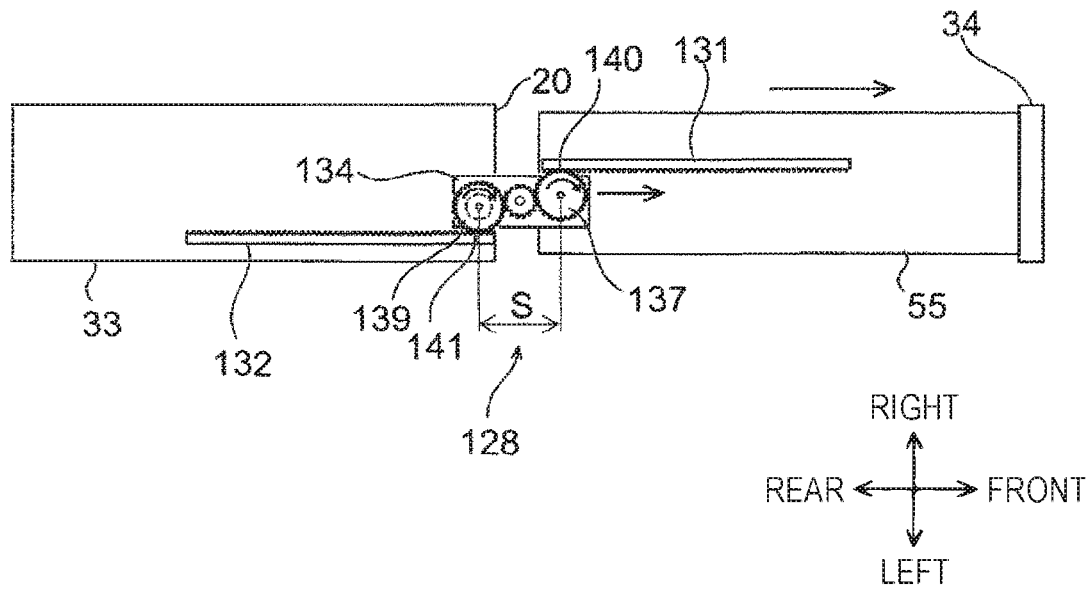
FIG. 29C is a schematic plan view of the tip rack loading means of the automated analyzing device according to the fourth embodiment (fully opened state).

Next, a fourth embodiment will be described with reference to FIG. 26 to FIGS. 29A to 29C. FIG. 26 is a cross-sectional view taken along line B-B of a tip rack loading means in an automated analyzing device according to the fourth embodiment, FIG. 27 is a cross-sectional view taken along line A-A, FIG. 28A is a cross-sectional view taken along line F-F illustrating the configuration of a deceleration means, FIG. 28B is a plan view, and FIG. 28C is a cross-sectional view taken along line G-G. FIG. 29 illustrates a schematic plan view of the tip rack loading means in a fully closed state, FIG. 29B illustrates a state in the middle of opening and closing, and FIG. 29C illustrates a fully opened state.

The fourth embodiment is different from the first to third embodiments in that a deceleration means 128 is provided between the drawer 21 and the bottom plate 31, and a so-called damper 129 is provided to add the viscous resistance force between the drawer 21 and the bottom plate 31. With the deceleration means 128, there is an effect that the speed at the time of opening and closing the drawer 21 can be suppressed, and the impact when fully opened and fully closed can be reduced.

Hereinafter, an example of the configuration of the deceleration means will be described. In FIG. 26 to FIGS. 28A to 28C, the drawer base 55 that forms part of the drawer 21 is provided with a first rack 131 that extends in the front-rear direction in a direction close to the bottom plate 31. The bottom plate 31 is provided with a second rack 132 and a guide rail 133 extending in the front-rear direction close to the drawer base 55.

The damper 129 includes a rotatable damper shaft 130, and a viscous fluid is enclosed in the damper 129 for example. When the damper shaft 130 rotates, a rotor (not illustrated) provided in the damper 129 rotates together with the damper shaft 130, causing shear deformation of the viscous fluid between the damper 129 and viscous resistance torque is generated in the damper shaft 130 by a shear force generated during the shear deformation. Since the viscous resistance tends to increase with an increase in speed, the viscous resistance torque is increased as the rotational speed of the damper shaft 130 increases.

A slider 134 is provided so as to be movable in the front-rear direction along the guide rail 133, and a first gear spindle 135 and a second gear spindle 136 are provided in the slider 134 to extend in a direction close to the drawer base 55. Further, the damper 129 is rotationally fixed, and the damper shaft 130 is provided in a direction close to the drawer base 55.

A first gear 137 is rotatably provided on the first gear spindle 135, and the first gear 137 is configured to mesh with the first rack 131 at a first meshing portion 140. A second gear 138 (hereinafter, sometimes referred to as an idler) is rotatably provided on the second gear spindle 136 and is configured to mesh with the first gear 137.

The damper shaft 130 is provided with a third gear 139 (hereinafter sometimes referred to as a damper gear), and the damper gear 139 is configured to rotate together with the damper shaft 130. In other words, when the damper gear 139 rotates, the viscous resistance torque is generated. The damper gear 139 is configured to mesh with the idler 138, and the damper gear 139 is configured to mesh with the second rack 132 at a second meshing portion 141.

The first meshing portion 140 and the second meshing portion 141 are configured to be separated in the front-rear direction by a distance S that is equal to the distance in the front-rear direction of the center of each of the first gear 137 and the damper gear 139.

When the drawer 21 is moved forward and opened, the first rack 131 provided on the drawer base 55 moves forward, and the first gear 137 rotates clockwise in the plan view of FIG. 28B through the first meshing portion 140.

Since the idler 138 meshes with the first gear 137, it rotates counterclockwise, the damper gear 139 meshed with the idler 138 rotates clockwise, and the damper gear 139 meshes with the second rack 132. Since the first gear 137, the idler 138, and the damper gear 139 are mounted on the slider 134, the slider 134 moves forward as the damper gear 139 rotates. Herein, as an example, if the number of teeth of the first gear 137 is equal to the number of teeth of the damper gear 139, the slider 134 moves forward by a half of the amount of forward movement of the first rack 131. As described above, when the damper gear 139 rotates, the damper shaft 130 rotates together to generate the viscous resistance torque. If the drawer 21 is moved forward, the damper shaft rotates to generate the viscous resistance force. The resistance force can be applied when the drawer 21 is opened.

When the drawer 21 is closed, the first rack 131 moves backward. Therefore, the rotation direction of each gear illustrated in FIG. 28B is reversed, but the damper shaft 130 rotates, so that viscous resistance is generated. Even when the drawer 21 is closed, resistance can also be applied.

The operation of the deceleration means 128 during the opening operation of the drawer 21 will be described with reference to FIGS. 29A to 29C. In the fully closed state illustrated in FIG. 29A, the rear end of the first rack 131 is positioned near the rear end of the drawer base 55. The first meshing portion 140 between the first gear 137 and the first rack 131 is near the front end of the first rack 131. The first meshing portion 140 is also located slightly forward from the center in the front-rear direction of the housing 33 or the drawer base 55. The front end of the second rack 132 is located in the vicinity of the front-face opening 20 of the housing 33 or slightly behind the front-face opening 20, and the second meshing portion 141 between the damper gear 139 and the second rack 132 is near the rear end of the second rack 132. The second meshing portion 141 is behind the distance S of the first meshing portion 140 and near the rear end of the second rack 132. The second meshing portion 141 is also located slightly backward from the center in the front-rear direction of the housing 33 or the drawer base 55.

When the drawer 21 is moved forward, the state in the middle of opening and closing illustrated in FIG. 29B is obtained. Since the first rack 131 moves forward together with the drawer 21, the first gear 137, the idler 138, and the damper gear 139 rotate, and the slider 134 moves forward by a half of the amount of movement of the drawer 21.

Further, when the drawer 21 is further moved forward to reach the fully opened state illustrated in FIG. 29C, the rear end of the drawer base 55 is moved further forward with respect to the front-face opening 20 of the housing 33, and the tip rack 7 mounted on the drawer 21 moves forward from the front-face opening 20. Therefore, it is easy to take out an empty tip rack 7 and load the tip rack 7 on which expendables are mounted. Herein, since the first meshing portion 140 and the second meshing portion 141 are separated by the distance S in the front-rear direction, the meshing between the first gear 137 and the first rack 131 and the meshing between the second gear 138 and the second rack 132 can both be maintained even in a state where the rear end of the drawer base 55 is moved in a range smaller than the distance S forward from the front-face opening 20 of the housing 33 when fully opened. In other words, when the drawer 21 is moved in the front-rear direction from the fully closed state to the fully opened state of the drawer 21, the damper gear 139 rotates to generate the viscous resistance torque, and resistance can be added to the opening/closing operation of the drawer 21. Therefore, it is preferable that the opening and closing speed of the drawer 21 can be suppressed and the impact when fully opened or fully closed can be reduced.

Figure 30A:
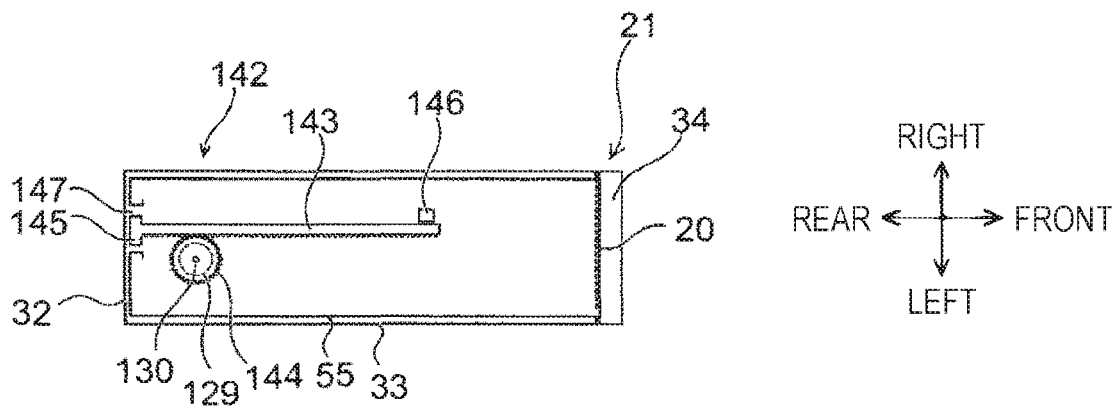
FIG. 30A is a schematic plan view for describing opening operation of a tip rack loading means of an automated analyzing device according to a fifth embodiment (fully closed state).
Figure 30B:
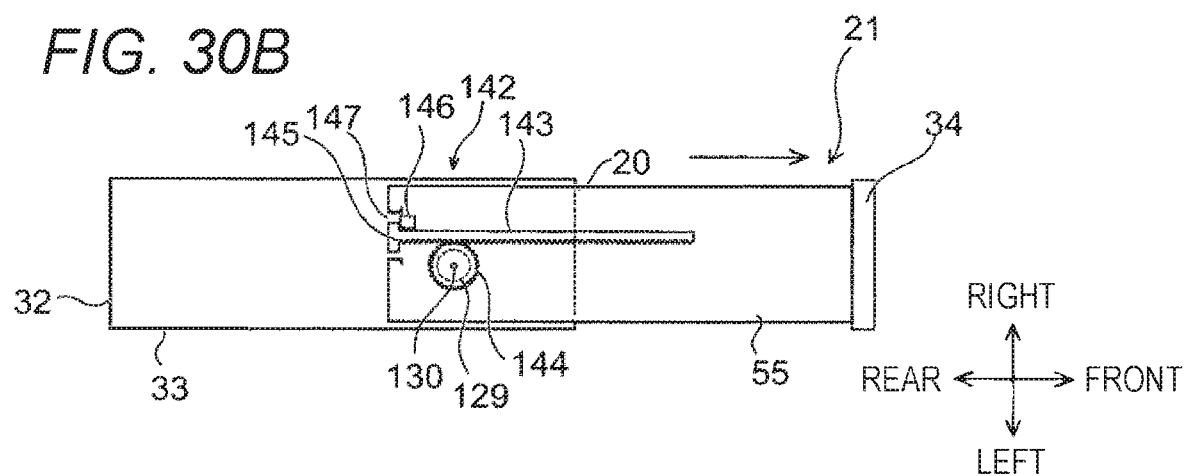
FIG. 30B is a schematic plan view for describing the opening operation of the tip rack loading means of the automated analyzing device according to the fifth embodiment (in the middle of opening).
Figure 30C:
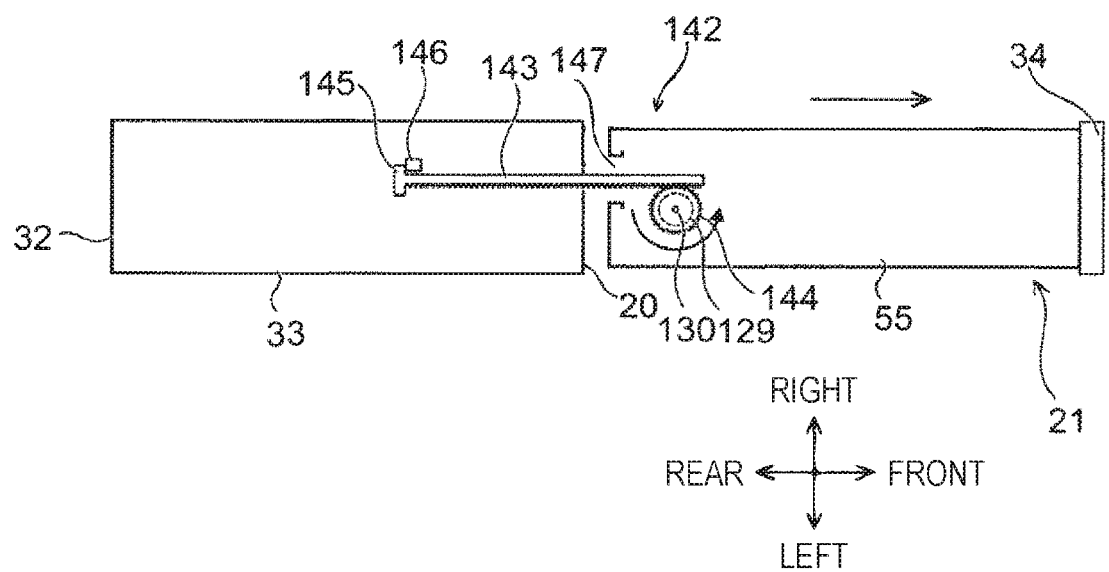
FIG. 30C is a schematic plan view for describing the opening operation of the tip rack loading means of the automated analyzing device according to the fifth embodiment (fully opened state).
Figure 31A:
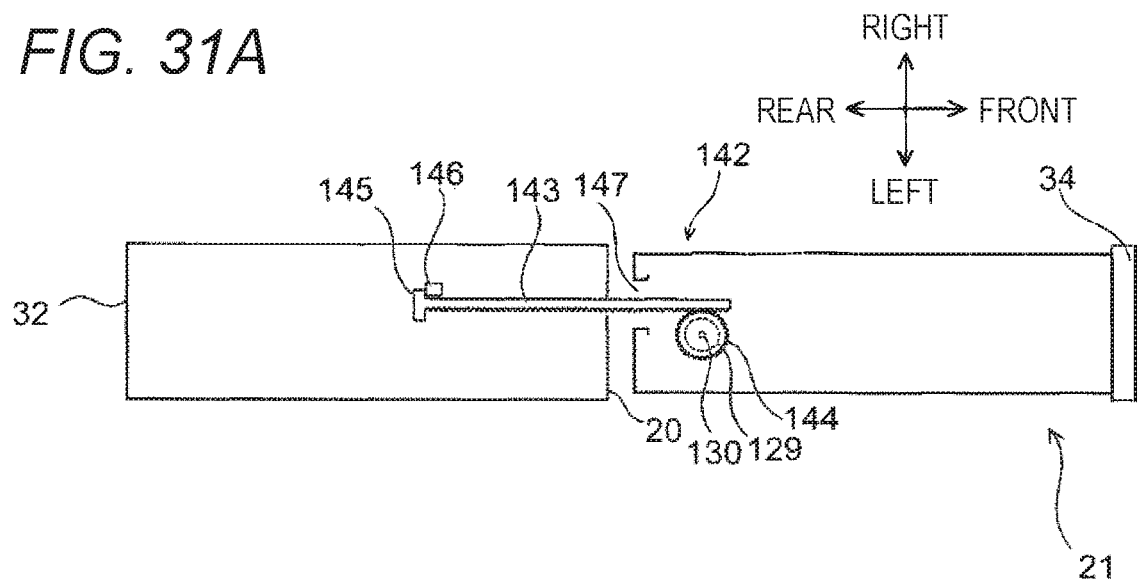
FIG. 31A is a schematic plan view illustrating closing operation of the tip rack loading means of the automated analyzing device according to the fifth embodiment (fully opened state).
Figure 31B:
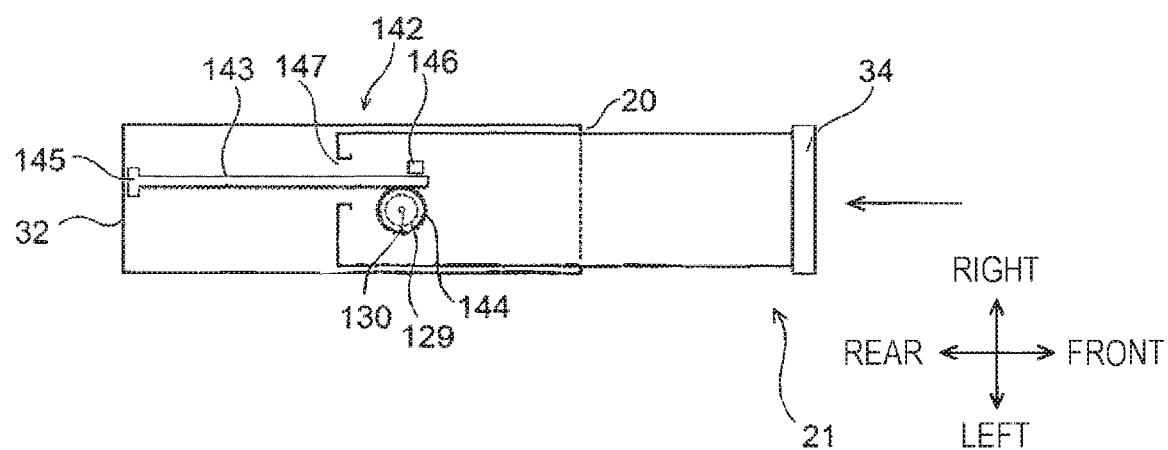
FIG. 31B is a schematic plan view for describing the closing operation of the tip rack loading means of the automated analyzing device according to the fifth embodiment (in the middle of closing).
Figure 31C:
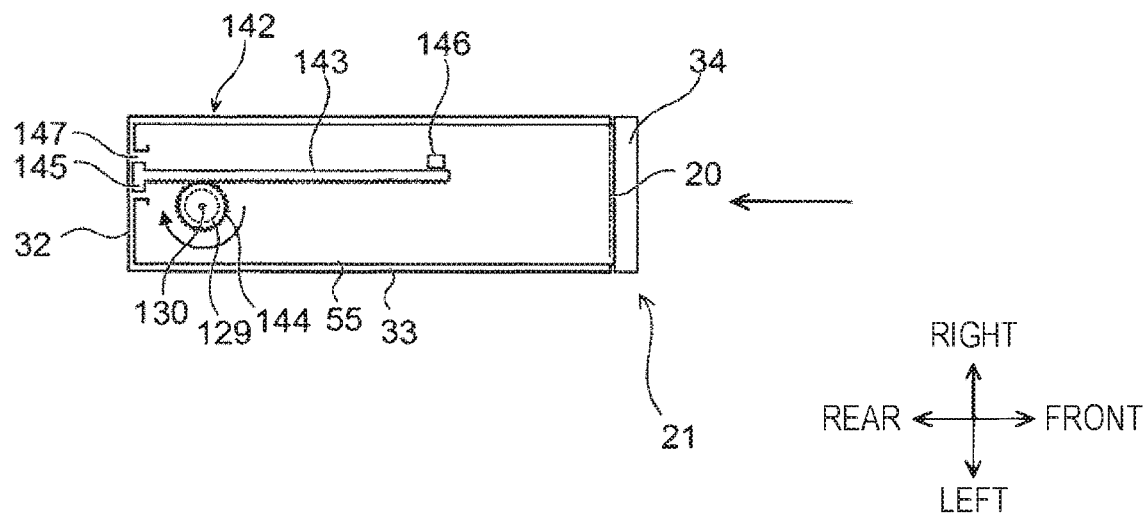
FIG. 31C is a schematic plan view for describing the closing operation of the tip rack loading means of the automated analyzing device according to the fifth embodiment (fully closed state).

Next, a fifth embodiment will be described with reference to FIGS. 30A to 30C and FIGS. 31A to 31C. FIG. 30A is a schematic plan view for describing the opening operation of the tip rack loading means, in a fully closed state, FIG. 30B illustrates a state in the middle of opening, FIG. 30C illustrates a state in a fully opened state, FIG. 31A is a schematic plan view for describing the closing operation, in a fully opened state, FIG. 31B illustrates a state in the middle of closing, and FIG. 31C illustrates a fully closed state.

The fifth embodiment is different from the fourth embodiment in that a second deceleration means 142 is provided between the drawer 21 and the bottom plate 31, and the so-called damper 129 to add the viscous resistance force between the drawer 21 and the bottom plate 31 and a third rack 143 that moves back and forth are provided. With the second deceleration means 142, there is an effect that the speed at the time of opening and closing the drawer 21 can be suppressed, and the impact when fully opened and fully closed can be reduced.

Hereinafter, an example of the configuration of the second deceleration means 142 will be described. In FIGS. 30A to 30C and FIG. 31A to FIG. 31C, the drawer base 55 forming a part of the drawer 21 has the damper 129 fixed in a direction close to the bottom plate 31, and a rotatable damper shaft 130 provided on the damper 129 is provided with a fourth gear 144 (hereinafter, also referred to as a damper gear) that is rotatable together with the damper shaft 130. The third rack 143 is supported so as to be slidable in the front-rear direction with respect to the housing 33 and the drawer base 55. The rear end of the third rack 143 is widened in the left-right direction to form a rack rear end stopper 145. The housing 33 is provided with a stopper portion 146 that is adjacent to the third rack 143 and comes into contact with the rack rear end stopper 145 at the position where the third rack 143 has moved most forward.

The rack rear end stopper 145 of the third rack 143 can be moved in the front-rear direction through a void 147 provided at the rear end of the drawer base 55. When the third rack 143 moves most backward, the rear end of the rack rear end stopper 145 comes into contact with the rear plate 32 of the housing 33. When the third rack 143 moves most forward, the front end of the rack rear end stopper 145 comes into contact with the stopper portion 146, and the third rack 143 is slidably supported in the front-rear direction within the range.

When the third rack 143 moves in the front-rear direction, the fourth gear 144 meshed with the third rack 143 rotates, whereby the damper 129 acts to generate the viscous resistance force.

Next, the opening operation of the drawer 21 provided with the second deceleration means 142 will be described with reference to FIGS. 30A to 30C. In the fully closed position illustrated in FIG. 30A, the third rack 143 is located at the rearmost position, and the rack rear end stopper 145 is in contact with the rear plate 32 of the housing 33. When the drawer 21 is moved forward from the fully closed position, the damper 129 moves forward together with the drawer base 55, and the third rack 143 receives the viscous resistance force by the damper 129, and thus moves forward together with the drawer 21. In other words, the fourth gear 144 does not rotate, and no viscous resistance force acts when the drawer 21 is moved forward.

Further, when the drawer 21 is further moved forward, as illustrated in FIG. 30B, for example, the rack rear end stopper 145 comes into contact with the stopper portion 146 of the housing 33 in the vicinity of the middle between the fully closed position and the fully open position. When the drawer 21 is further moved forward from the state of FIG. 30B, the third rack 143 cannot move forward because the rack rear end stopper 145 is in contact with the stopper portion 146. On the other hand, since the damper 129 and the fourth gear 144 move forward together with the drawer base 55, the fourth gear 144 rotates along the third rack 143 until reaching the fully open position illustrated in FIG. 30C. The damper 129 generates the viscous resistance force to generate the resistance force against the opening force of the drawer 21.

In other words, when the drawer 21 is opened from the fully closed position to the fully open position, the damper 129 does not act until the rack rear end stopper 145 comes into contact with the stopper portion 146 from the fully closed position. However, the viscous damping force by the damper 129 acts from the contact of the rack rear end stopper 145 to the stopper portion 146 to the fully open position, which has an effect of reducing the opening speed and reducing the impact when fully opened.

Next, the closing operation of the drawer 21 provided with the second deceleration means 142 will be described with reference to FIGS. 31A to 31C. The fully open position illustrated in FIG. 31A is the same as FIG. 30C, the drawer 21 is at the fully open position, the third rack 143 is located at the foremost position, and the rack rear end stopper 145 comes into contact with the stopper portion 146 provided on the housing 33. When the drawer 21 is moved backward from the fully open position, the third rack 143 receives the viscous resistance force by the damper 129 and therefore moves backward together with the drawer 21. In other words, the fourth gear 144 does not rotate, and no viscous resistance force acts when the drawer 21 is moved backward.

When the drawer 21 is further moved backward, as illustrated in FIG. 31B, for example, the rear end of the rack rear end stopper 145 comes into contact with the rear plate 32 of the housing 33 in the vicinity of the middle between the fully open position and the fully closed position. When the drawer 21 is further moved backward from the state of FIG. 31B, the third rack 143 cannot move backward because the rack rear end stopper 145 is in contact with the rear plate 32. On the other hand, since the damper 129 and the fourth gear 144 move backward together with the drawer base 55, the fourth gear 144 rotates along the third rack 143 until reaching the fully closed position illustrated in FIG. 31C. The damper 129 generates the viscous resistance force to generate the resistance force against the closing force of the drawer 21.

In other words, when the drawer 21 is closed from the fully open position to the fully closed position, the damper 129 does not act until the rack rear end stopper 145 comes into contact with the rear plate 32 from the fully open position. However, the viscous damping force by the damper 129 acts from the contact of the rack rear end stopper 145 to the rear plate 32 to the fully closed position, which has an effect of reducing the closing speed and reducing the impact when fully closed.

In other words, in the drawer 21 provided with the second deceleration means 142, the viscous damping force by the damper 129 acts when fully opened and when fully closed, which has an effect of reducing the impact when fully opened and fully closed.

As described above, the viscous resistance tends to increase with an increase in speed, so that the resistance is increased as the drawer is pulled out at a high speed, and the deceleration effect of the drawer 21 is increased and the impact reduction effect is increased, which is preferable.

Further, herein, the damper 129 has been described with respect to the form in which the viscous resistance torque is applied. However, the damper 129 is not limited to the viscous resistance torque, and may be configured to generate frictional resistance torque.

Effects

By simply pulling the handle 50 provided on the door 34 forward, the drawer 21 is opened from the front-face opening 20 provided on the front surface of the automated analyzing device 1, and the tip rack mounting table 24 on which the tip rack 7 can be mounted can be pulled out from the automated analyzing device 1. After mounting the tip rack 7 on which the expendables are mounted on the tip rack mounting table 24, the expendables can be easily supplied into the automated analyzing device 1 by closing the drawer 21. Alternatively, since it is possible to easily take out the tip rack 7 in which the expendables are empty, there is an effect that it is possible to provide the automated analyzing device 1 in which the tip rack 7 can be easily replaced.

Further, since the lock claw 52 and the claw receiving portion 53 are engaged when the drawer 21 is closed, there is an effect that the drawer 21 can be reliably closed at a predetermined position.

Further, since the door 34 or the drawer 21 can be interlocked, there is an effect that the drawer 21 is prohibited from being opened during the period when the sample dispensing tip/reaction container conveyance means 8 is operating and the tip rack 7 cannot be removed.

In conjunction with the opening/closing operation of moving the drawer 21 in the front-rear direction, the tip rack 7 also moves in the vertical direction, and thus the operator only needs to move the drawer 21 in the front-rear direction. No special operation is required to move the tip rack 7 up and down, and no special moving mechanism is required to move the tip rack 7 in the vertical direction. Therefore, it is possible to provide the automated analyzing device of which the structure is simple and operability is good.

Since the tip rack mounting table 24 is configured to move in parallel with the upper surface being horizontal, it is possible to provide an automated analyzing device with high reliability in which the orientation of the tip rack 7 is stable during the opening/closing operation and positioning of the drawer 21.

In the tip rack mounting table 24, when the drawer 21 is at the closed position, the tip rack 7 rises in conjunction with the backward closing operation of the drawer 21, and the plurality of sample dispensing tips mounted on the upper surface of the tip rack 7 and the upper ends of the reaction containers are exposed from the top-face opening 26, or raised and positioned to a position higher than the top-face opening 26 and set. Therefore, the sample dispensing tip or the reaction container can be reliably gripped by the sample dispensing tip/reaction container conveyance means 8 and easily conveyed upward, thereby providing the automated analyzing device with high reliability.

Since the drawer 21 is configured to enter and exit from the front-face opening 20, the safety cover 4 may be kept closed by operating the drawer 21 to replace the tip rack 7, and the automated analyzing device 1 may be in operation if the sample dispensing tip/reaction container conveyance means 8 is not in operation. Therefore, the analysis throughput of the automated analyzing device 1 can be increased.

When the drawer 21 is closed, the tip rack mounting table 24 does not operate and close integrally with the drawer 21, but has a characteristic of smoothly stopping while slowly decelerating both in the front-rear direction and in the vertical direction. When the drawer 21 is closed, the plurality of sample dispensing tips mounted on the tip rack 7 and the reaction container do not vibrate or jump out due to impact, so that it is possible to provide an automated analyzing device with high reliability and good operability.

When the tip rack 7 is positioned by closing the drawer 21, the tip rack 7 is separated from the tip rack mounting table 24, and interposed by a spring force between the pressing portion 100 of the positioning spring 47 driven by the positioning drive means 45 and the positioning member 43 fixed to the housing 33 so as to be positioned in the height direction. Therefore, the tip rack 7 is positioned with high accuracy and is not affected by vibrations from the drawer 21. Therefore, it is possible to provide an automated analyzing device with high reliability.

By positioning the tip rack 7 at a predetermined height, the tip rack 7 is configured to be accurately positioned at a predetermined position in the front-rear and left-right directions through the positioning bearing 36. Therefore, if the drawer 21 is closed, the tip rack 7 is configured to be accurately positioned in the vertical, front-rear, and left-right directions. The sample dispensing tip/reaction container conveyance means 8 securely grips the plurality of sample dispensing tips mounted on the upper surface of the tip rack 7 and the reaction container and conveys upward easily. Therefore, it is possible to provide an automated analyzing device with high reliability.

The tip rack positioning means 118 is driven in conjunction with the positioning drive shaft 46 extending in the front-rear direction even when two sets of tip racks 7 are disposed in the front-rear direction on the tip rack mounting table 24. Therefore, the positioning drive means 45 having a cam and a link may be a set, and an automated analyzing device with high reliability can be provided with a simple configuration.

In addition, since the positioning drive means 45 is provided in the vicinity of the rear surface of the housing 33, the user does not touch by mistake, and safety is high.

In the tip rack positioning means 118, the cam pin 110 provided in the rotation cam 108 is fitted to the spiral groove 107 of the cylindrical cam 106 after the tip rack 7 is lifted to approach the positioning member 43 and until the drawer 21 is closed. Thereafter, the rotation cam 108 rotates, and the positioning drive shaft 46 rotates such that the pressing portion 100 of the positioning spring 47 comes into contact with the lower surface of the flange portion 25 of the tip rack 7. Therefore, the tip rack positioning means 118 is driven in synchronization with the rising operation of the tip rack 7, so that the operation is reliable and an automated analyzing device with high reliability can be provided.

Since the tip rack pressing means 119 is provided to position the tip rack 7 by bringing the tip rack 7 into contact with the positioning member 43 from below, it is possible to perform positioning with accuracy with respect to the positioning bearing 36 which is fixed at a predetermined position. Further, since vibration is not transmitted from the tip rack mounting table 24 to the tip rack 7 or an external force is not transmitted to the tip rack 7, it is possible to provide an automated analyzing device with high reliability which can stably position the tip rack 7 with high accuracy.

In the drawer 21 provided with the deceleration means 128 or the second deceleration means 142, the viscous damping force by the damper 129 acts when fully opened and fully closed, and the opening and closing speed of the drawer 21 is suppressed, so that the impact at the time of fully opened or fully closed can be reduced.

Modifications

Further, the present invention is not limited to the above embodiments, and various modifications may be contained.

For example, the above-described embodiments of the present invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of a certain embodiment. In addition, some of the configurations of each embodiment may be added, omitted, replaced with other configurations.

REFERENCE SIGNS LIST 1 automated analyzing device
2 reagent disk
3 reagent bottle
4 safety cover
5 sample conveyance means
6 sample dispensing means
7 tip rack (sample dispensing tip/reaction container supply means)
8 sample dispensing tip/reaction container conveyance means
9 incubator
10 sample dispensing tip
11 sample dispensing tip buffer
12 sample dispensing tip/reaction container discard hole
13 reaction solution stirring means
14 reaction container
15 reagent dispensing pipette
15a reagent dispensing position
16 stirring means
16a reagent stirring position
17 cleaning means
18 reaction solution suction nozzle
19 detection means
20 front-face opening
21 drawer
22 tip rack loading means
23 reagent bottle loading port
24 tip rack mounting table
25 flange portion
26 top-face opening
27 top plate
28 front plate
29 right plate
30 left plate
31 bottom plate
32 rear plate
33 housing
34 door
35 drawer rail
36 positioning bearing
37 leaf spring
38 positioning facing bearing
39 drawer bottom plate
40 guide rail
41 first guide groove
42 second guide groove
43 positioning member
44 height reference side
45 positioning drive means
46 positioning drive shaft
46a first positioning drive shaft
46b second positioning drive shaft
47 positioning spring
48 grip 49 handle shaft
50 handle
51 lock lever
52 lock claw
53 claw receiving portion
54 spacer
55 drawer base
56 first drawer arm
57 second drawer arm
58 first spindle hole
59 second spindle hole
60 first connecting shaft
61 second connecting shaft
62a toothed pulley
62b toothed pulley
63 toothed belt
64 idler
65 first rotating arm
66 second rotating arm
67 first guide roller
68 second guide roller
69 guide end
70 third rotating arm
71 third spindle
72 fourth spindle
73 tip rack guide
74 first support arm
75 second support arm
76 third spindle hole
77 fourth spindle hole
78 vertical groove portion
79 reverse portion
80 branch portion
81 intersection portion
82 guide protrusion
83 guide surface
84 apex portion
85 cam plate
86 cylindrical cam center
87 fifth spindle
88 sixth spindle
89 stopper
90 stopper receiver
91 first spring fulcrum
92 second spring fulcrum
93 pulling spring
94 seventh spindle
95 third link arm
96 eighth spindle
97 fourth link arm
98 first link arm
99 second link arm
100 pressing portion
101 locking portion
102 positioning spring presser
103 pressing portion presser
104 set screw
105 positioning V groove
106 cylindrical cam
107 spiral groove
108 rotation cam
109 rotation cam shaft
110 cam pin
111 first toothed pulley
112 second toothed pulley
113 second gear
114 first gear
115 third toothed pulley
116 toothed belt
117 idler
118 tip rack positioning means
119 tip rack pressing means
120 frame portion
121 pressing member
122 biasing member
123 pin
124 groove
125 outer peripheral hole
126 central hole
127 pressing ball
128 deceleration means
129 damper
130 damper shaft
131 first rack
132 second rack
133 guide rail
134 slider
135 first gear spindle
136 second gear spindle
137 first gear
138 second gear (idler)
139 third gear (damper gear)
140 first meshing portion
141 second meshing portion
142 second deceleration means
143 third rack
144 fourth gear
145 rack rear end stopper
146 stopper portion
147 void
200 host computer

The invention claimed is:

1. An automated analyzing device, comprising:
a reagent vessel container that is capable of holding a plurality of reagent vessels;
a detection means that performs a predetermined analysis of a sample in a reaction solution including a reagent; and
a tip rack loading means that supplies an expendable used for analysis of the sample,
wherein the tip rack loading means includes:
a drawer that is supported so as to be horizontally movable in a front-rear direction between an open position and a closed position, wherein a position of the drawer in the closed position is variable,
a front-face opening through which the drawer is movable between the open position and the closed position,
a table that allows the expendable used for analysis to be mounted in the drawer,
a guide rail that, while the drawer is moved toward a rear side from the open position to the closed position, moves horizontally until the expendable mounted on the table passes through the front-face opening from a front side to the rear side and moves the table toward an upper side of the front-face opening in synchronization with horizontal movement of the drawer toward the rear side after the expendable mounted on the table passes through the front-face opening, and
a first guide roller positioned in the guide rail;
wherein the guide rail includes a first guide groove that includes a vertical groove portion at an innermost end of the first guide groove corresponding to the closed position, and the first guide roller is arranged to support the table via interaction with the first guide groove;

wherein a greater curvature portion of the first guide groove with a greater curvature than the vertical groove portion is provided adjacent to the vertical groove portion;

wherein the position of the table is constrained by fitting the first guide roller in the vertical groove portion on a closed position side of the greater curvature portion; and wherein, based on a configuration of the vertical groove portion, the table stops in the front-rear direction even when the drawer is displaced in the front-rear direction.

2. The automated analyzing device according to claim 1, wherein the expendable includes one or a plurality of tip racks that include a plurality of nozzle tips mounted on an upper surface of the table.

3. The automated analyzing device according to claim 2, wherein the tip rack loading means includes a housing and a tip rack pressing means to position the tip rack at a predetermined position in the housing, and wherein the tip rack is positioned after separating upward from the table by the tip rack pressing means.

4. The automated analyzing device according to claim 1, wherein the guide rail includes a first arm and a second arm that rotate parallel to and in synchronization with each other to rotate and support the table, the first arm being pivotally supported by a first connecting shaft provided close to a rear portion of the drawer, and the second arm being pivotally supported by a second connecting shaft provided in front of the first connecting shaft, a third arm that extends in a direction different from the first arm from the first connecting shaft and rotates together with the first arm, wherein the first guide roller is provided at a tip of the first arm, a second guide roller that is provided at a tip of the third arm, wherein the first guide groove guides the first guide roller as the drawer is opened or closed, and a second guide groove that guides the second guide roller, wherein the first guide groove and the second guide groove intersect between a fully open position and a fully closed position of the drawer.

5. The automated analyzing device according to claim 1, wherein the tip rack loading means further includes a deceleration means that adds an operation viscous resistance force to the drawer when the drawer is moved between the open position and the closed position.

6. An automated analyzing device, comprising:

a reagent vessel container that is capable of holding a plurality of reagent vessels;

a detector that performs a predetermined analysis of a sample in a reaction solution including a reagent; and a tip rack loading apparatus that supplies an expendable used for analysis of the sample, wherein the tip rack loading apparatus includes:

a drawer that is supported so as to be horizontally movable in a front-rear direction between an open position and a closed position, wherein a position of the drawer in the closed position is variable, a front-face opening through which the drawer is movable between the open position and the closed position, a table that allows an expendable used for analysis to be mounted in the drawer, a guide rail structure that, while the drawer is moved toward a rear side from the open position to the closed position, moves horizontally until the expendable mounted on the table passes through the front-face opening from a front side to the rear side and moves the table toward an upper side of the front-face opening in synchronization with horizontal movement of the drawer toward the rear side after the expendable mounted on the table passes through the front-face opening, and a positioning structure, including a first guide roller positioned in the guide rail;

wherein the guide rail structure includes a first guide groove that includes a vertical groove portion at an innermost end of the first guide groove corresponding to the closed position, and the positioning structure is arranged to support the table via interaction with the first guide groove;

wherein a greater curvature portion of the first guide groove with a greater curvature than the vertical groove portion is provided adjacent to the vertical groove portion;

wherein the position of the table is constrained by fitting the positioning structure in the vertical groove portion on a closed position side of the greater curvature portion; and wherein, based on a configuration of the vertical groove portion, the table stops in the front-rear direction even when the drawer is displaced in the front-rear direction.

* * * * *

UNITED STATES PATENT AND TRADEMARK OFFICE
CERTIFICATE OF CORRECTION

PATENT NO. : 11,933,800 B2  
APPLICATION NO. : 16/644753  
DATED : March 19, 2024  
INVENTOR(S) : Yamashita et al.

Page 1 of 1

It is certified that error appears in the above-identified patent and that said Letters Patent is hereby corrected as shown below:

On the Title Page

Item (73) Assignee, Please change "HITACHI HIGH-TECHNOLOGIES CORPORATION" to --HITACHI HIGH-TECH CORPORATION--.

Signed and Sealed this
Twenty-first Day of May, 2024

Katherine Kelly Vidal  
*Director of the United States Patent and Trademark Office*